US009001914B2

(12) United States Patent
Ruan et al.

(10) Patent No.: US 9,001,914 B2
(45) Date of Patent: Apr. 7, 2015

(54) DYNAMIC INTERFERENCE ALIGNMENT FOR PARTIALLY CONNECTED QUASI-STATIC MIMO INTERFERENCE CHANNEL

(75) Inventors: Liangzhong Ruan, Hong Kong (CN); Vincent Kin Nang Lau, Hong Kong (CN)

(73) Assignee: Dynamic Invention LLC, Mahe (SC)

( * ) Notice: Subject to any disclaimer, the term of this patent is extended or adjusted under 35 U.S.C. 154(b) by 630 days.

(21) Appl. No.: 13/247,629

(22) Filed: Sep. 28, 2011

(65) Prior Publication Data

US 2012/0281778 A1 Nov. 8, 2012

Related U.S. Application Data

(60) Provisional application No. 61/483,517, filed on May 6, 2011.

(51) Int. Cl.
*H04B 7/02* (2006.01)
*H04B 7/06* (2006.01)
(Continued)

(52) U.S. Cl.
CPC ............... *H04B 7/0617* (2013.01); *H04B 7/02* (2013.01); *H04B 1/1081* (2013.01); *H04B 7/024* (2013.01);
(Continued)

(58) Field of Classification Search
CPC .... H04B 7/0456; H04B 15/00; H04B 1/1081; H04B 1/7115; H04B 7/02; H04B 7/024; H04B 7/0413; H04B 7/0417; H04B 7/0452; H04B 7/0478; H04B 7/0697; H04B 7/0817; H04B 7/15592; H04B 7/0617; H04B 7/0628; H04B 1/7097; H04B 1/7105; H04B 1/71052; H04B 1/71057; H04B 7/0848; H04W 52/244; H04W 72/04; H04L 1/0003; H04L 27/2646; H04L 2025/03426; H04L 5/001; H04L 5/0048
See application file for complete search history.

(56) References Cited

U.S. PATENT DOCUMENTS

2010/0232528 A1 9/2010 Li et al.
2010/0265813 A1* 10/2010 Pereira et al. ................. 370/201
(Continued)

FOREIGN PATENT DOCUMENTS

CN 101908948 A 12/2010
WO 2011096747 A2 8/2011

OTHER PUBLICATIONS

Yetis et al."On feasibility of interference alignment in MIMO interference networks";Sep. 2010; IEEE transaction on signal processing; vol. 58 No. 9 ;pp. 4771-4782.*

(Continued)

*Primary Examiner* — Rahel Guarino
(74) *Attorney, Agent, or Firm* — Amin, Turocy & Watson, LLP

(57) ABSTRACT

Systems, methods, and apparatus are described that employ specially designed interference patterns to build an in-band side channel without degrading the effective throughput of the main channel. Transmitter and receiver pairs implement a two-stage dynamic interference mitigation scheme based on the partial connections in limited dimension MIMO interference channels. The first stage determines the stream assignments and the subspace constraints for beamforming vectors and zero-forcing vectors based on the partially connected topology such as the path loss, shadowing and spatial correlation. The second stage determines the beamforming vectors and the zero-forcing vectors based on the instantaneous channel state information over the subspaces obtained from the first stage. In an aspect, a controller device implements the first and second stage and assigns the transmitter and receiver pairs to perform interference alignment using the stream assignments and beamforming and zero-forcing vectors respectively.

45 Claims, 23 Drawing Sheets

(51) Int. Cl.
    *H04B 7/08*     (2006.01)
    *H04L 25/03*     (2006.01)
    *H04B 1/10*     (2006.01)
    *H04B 15/00*     (2006.01)
    *H04B 7/04*     (2006.01)
    *H04B 7/155*     (2006.01)
    *H04W 72/08*     (2009.01)
    *H04W 52/24*     (2009.01)

(52) U.S. Cl.
    CPC ............... *H04B 15/00* (2013.01); *H04B 7/0452* (2013.01); *H04B 7/15592* (2013.01); *H04B 7/0478* (2013.01); *H04B 7/0413* (2013.01); *H04W 72/082* (2013.01); *H04W 52/244* (2013.01); *H04B 7/0456* (2013.01); *H04B 7/0848* (2013.01); *H04L 25/03891* (2013.01)

(56) References Cited

U.S. PATENT DOCUMENTS

2012/0289267 A1* 11/2012 Seo et al. ............... 455/501
2013/0010840 A1* 1/2013 Maddah-Ali et al. ......... 375/211

OTHER PUBLICATIONS

Lee et al. Degrees of freedom on the K-user MIMO interference channel with constant channel coefficients for downlink communication;IEEE globecom, 2009.*

Maddah-Ali, et al., "Signaling over MIMO multi-base systems-combination of multi-access and broadcast schemes", in Proc. of IEEE ISIT, pp. 2104-2108, 2006, 5 pages.

Maddah-Ali, et al., "Communication over MIMO X channels: Interference alignment, decomposition, and performance analysis", IEEE Trans. on Information Theory, vol. 54, No. 8, pp. 3457-3470, Aug. 2008, 14 pages.

Cadambe, et al., "Interference alignment and the degrees of freedom of wireless X networks", IEEE Trans. on Information Theory vol. 55, Issue 9, Sep. 2009 pp. 3893-3908, 25 pages.

Cadambe, et al.,"Interference alignment and degrees of freedom of the K-user interference channel", IEEE Trans. on Information Theory vol. 54, No. 8, Aug. 2008.

Nazer, et al., "Ergodic interference alignment" in Proc. ISIT 2009 Jun. 28, 2009-Jul. 3, 2009, pp. 1769-1773, 5 pages.

Yetis, et al., "Feasibility Conditions for Interference Alignment", Proceedings of IEEE GLOBECOM 2009, 6 pages.

Gomadam, et al., "Approaching the capacity of wireless networks through distributed interference alignment" IEEE GLOBECOM 2008 Nov. 30, 2008-Dec. 4, 2008 pp. 1-6, 10 pages.

Lee, et al., "Degrees of freedom on the K-user MIMO interference channel with constant channel coefficients for downlink communications", IEEE GLOBECOM 2009, pp. 1-6, 6 pages.

Tresch, et al., "On the achievability of interference alignment in the K-user constant MIMO interference channel", IEEE/SP 15th Workshop on Statistical Signal Processing, 2009, pp. 277-280, 4 pages.

Tse, et al., "Fundamentals of wireless communication". Cambridge University Press, 2005, 646 pages.

Sayeed, "Deconstructing multi antenna fading channels", IEEE Trans. on Signal Processing, vol. 50, No. 10, Oct. 2002, 25 pages.

Fuhl, et al., "Unified channel model for mobile radio systems with smart antennas", Proc. Inst. Elect. Eng., Radar, Sonar Navig., vol. 145, pp. 32-41, Feb. 1998, 5 pages.

Asztely, et al., "Generalized array manifold model for wireless communication channels with local scattering", Proc. Inst. Elect. Eng., Radar, Sonar Navig., vol. 145, pp. 51-57, Feb. 1998, 20 pages.

Steinbauer, et al., "The double-directional radio channel", IEEE Antennas and Propagation Magazine vol. 43, No. 4, Aug. 2001.

Huang, et al., "Angular domain processing for MIMO wireless systems with non-uniform antenna arrays", 42nd Asilomar Conference on Signals, Systems and Computers, Oct. 26-29, 2008, pp. 2043-2047, 5 pages.

Zheng, et al., "Communication on the Grassmann manifold: A geometric approach to the noncoherent multiple-antenna channel", IEEE Trans. Inf. Theory, vol. 48, No. 2, pp. 359-383, Feb. 2002, 25 pages.

Conway, et al., "Packing lines, planes, etc.: Packings in Grassmannian spaces", Exper. Math., vol. 5, pp. 139-159, 1996, 21 pages.

Cheng, et al., "A new mathematical approach for linear array analysis", IRE Trans. on Antennas and Propagation, vol. 8, Issue 3, pp. 255-259, 1960.

Nourani, et al. "Relay-aided interference alignment for the quasi-static X channel" IEEE International Symposium on Information Theory, Jun. 28, 2009. ISIT 2009, Piscataway, NJ, USA, pp. 1764-1768.

International Search Report for PCT Application No. PCT/CN2012/000605, mailed Aug. 16, 2012, 2 pages.

European Search Report for European Patent Application No. 12782644.4, mailed Sep. 29, 2014, 6 pages.

* cited by examiner

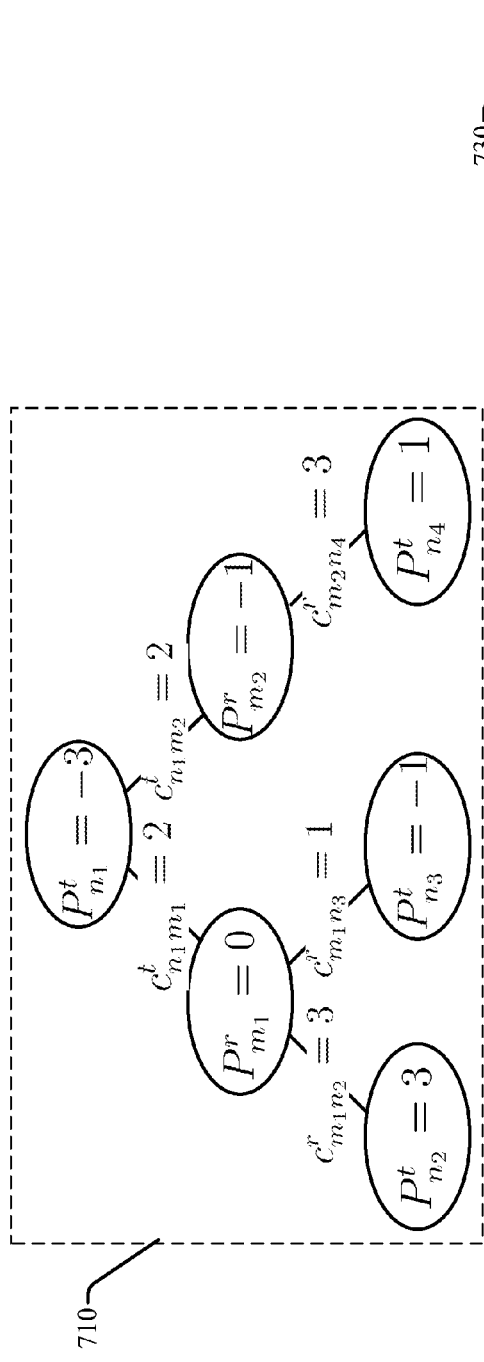
FIG. 7A
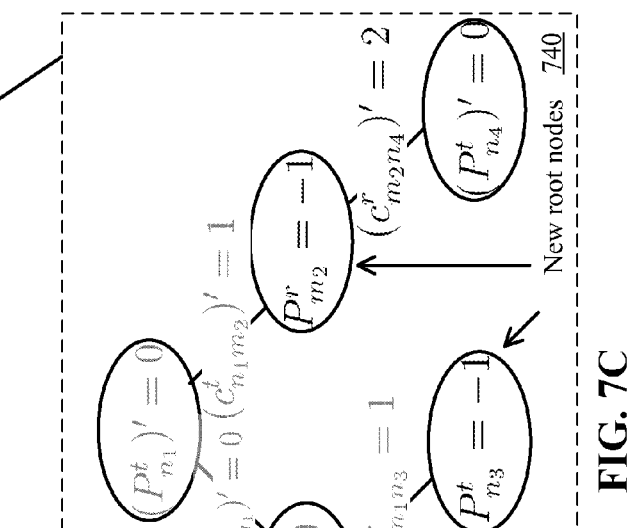
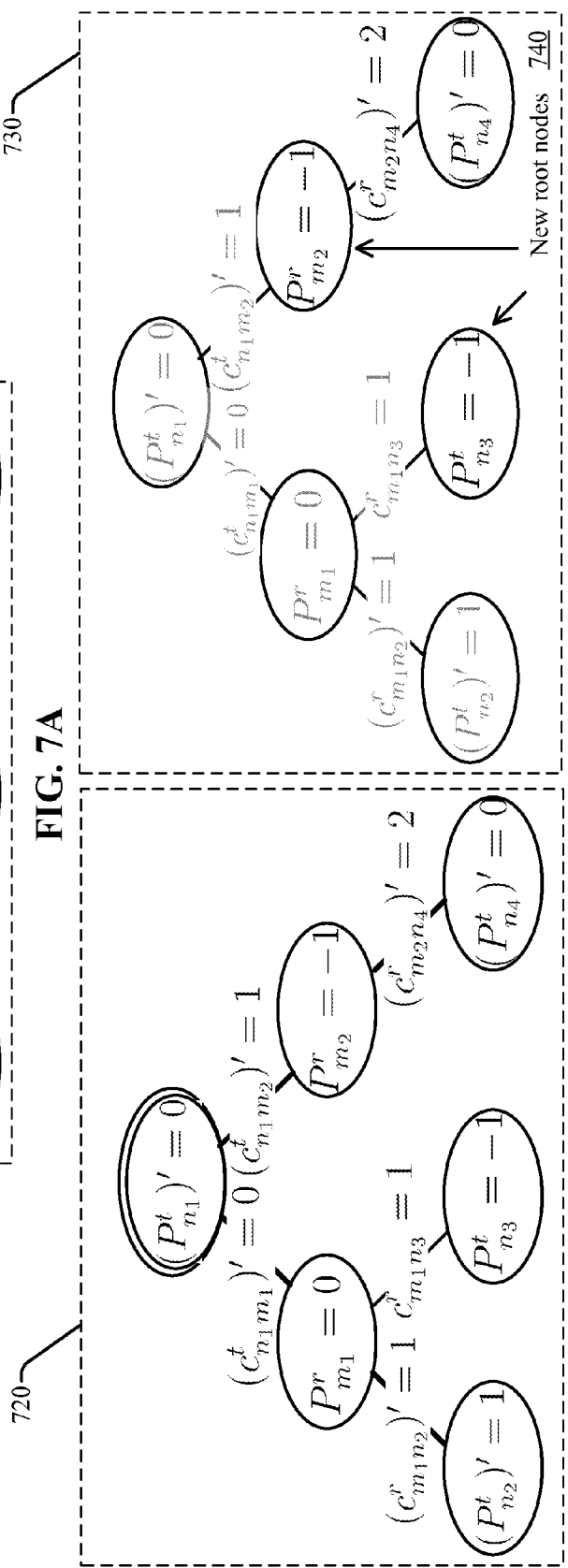
FIG. 7B
FIG. 7C

DYNAMIC INTERFERENCE ALIGNMENT FOR PARTIALLY CONNECTED QUASI-STATIC MIMO INTERFERENCE CHANNEL

PRIORITY CLAIM

This application claims priority to U.S. Provisional Patent Application Ser. No. 61/483,517 filed on May 6, 2011, entitled "DYNAMIC INTERFERENCE ALIGNMENT FOR GENERALIZED PARTIALLY CONNECTED QUASI-STATIC MIMO INTERFERENCE CHANNEL." The entirety of the aforementioned application is incorporated by reference herein.

TECHNICAL FIELD

This disclosure relates generally to wireless communications in connection with a multiple input multiple output systems, including mitigating interference.

BACKGROUND

Interference is difficult problem in wireless communications. For instance, the capacity region of two-user Gaussian interference channels has been an open problem for over thirty years. Recently, there has been some progress in understanding interference and extensive studies have been done regarding interference alignment (IA) techniques. Interference alignment (IA) was proposed in M. A. Maddah-Ali, A. S. Motahari, and A. K. Khandani, "Signaling over MIMO multi-base systems-combination of multi-access and broadcast schemes," in Proc. of IEEE ISIT, Page(s) 2104-2108, 2006., and M. A. Maddah-Ali, A. S. Motahari, and A. K. Khandani, "Communication over MIMO X channels: Interference alignment, decomposition, and performance analysis," IEEE Trans. on Information Theory, Vol. 54, no. 8, Page(s) 3457-3470, Aug. 2008, to reduce the effect of multi-user interference. IA was extended to deal with K pairs interference channels in Cadambe, V. R.; Jafar, S. A.; Shamai, S.; "Interference alignment and degrees of freedom of the K-user interference channel," IEEE Trans. on Information Theory Vol. 54, No. 8, August 2008.

The key idea of IA is to reduce the dimension of the aggregated interference by aligning interference from different transmitters into a lower dimension subspace at each receiver. Using infinite dimension extension on the time dimension (time selective fading), it has been shown that the IA can achieve the optimal Degrees-of-Freedom (DoF) of $$\frac{KN}{2}$$

in K-pair multiple input multiple output (MIMO) ergodic interference channels with N antennas at each node.

One important challenge of IA schemes is the feasibility condition. For instance, the IA schemes in Cadambe require $O((KN)^{2K^2N^2})$ dimensions of signal space to achieve the $$\frac{KN}{2}$$

total DoF. To avoid such huge dimensions of signal space, some researchers have studied IA designs for quasi-static (or constant) MIMO interference channels. With limited signal space dimensions, the achievable DoF of each transmitter-receiver pair in MIMO interference channels is upper bounded by $$\frac{N_t + N_r}{K+1}$$

(where K is the number of transmitter-receiver pairs, $N_t$, $N_r$ are the number of antennas at each transmitter and receiver, respectively). Unlike the time-selective or frequency-selective MIMO interference channels, total DoF of quasi-static MIMO interference channels do not scale with K. Furthermore, it is challenging to design precoders and decorrelators (i.e beamforming vectors and zero-forcing vectors respectively) that satisfy the IA requirements in limited dimension MIMO interference channels due to feasibility problems.

In fact, the technical challenge on the feasibility issue in limited dimension MIMO interference channels is highly related to the full connectivity in the interference graph. However, in practice, the interference channels are usually partially connected due to path loss, shadowing as well as spatial correlation.

The above-described deficiencies of conventional IA techniques are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later. To correct for the above noted deficiencies of conventional interference management techniques and other drawbacks of current interference alignment technologies, various systems, methods, and apparatus described employ specially designed precoders and decoders in consideration of the partial connectivity of the MIMO interference channel. For example, a device is provided comprising a data stream assignment component configured to assign data streams to a plurality of pairs of transmitters and receivers operating in a quasi-static multiple input multiple output channel having a partially connected state, and a subspace restriction component configured to determine restrictions for signal subspaces associated with beamforming filters for the transmitters and zero-forcing filters of the receivers based on the data streams being assigned to respective ones of the plurality of pairs of the transmitters and receivers and the partially connected state of the channel. In an aspect, the subspace restriction component is further configured to determine the restrictions to reduce a number of constraints associated with performance of an interference alignment scheme.

In another embodiment, a device is provided comprising antennas configured to transmit a signal in subspaces through a quasi-static multiple input multiple output channel having a partially connected state, wherein the antennas are further configured to receive a beamforming filter comprising restrictions for the subspaces under a data stream assignment, and the restrictions for the subspaces are determined based on the partially connected state of the channel, and an encoder configured to encode the signal with the beamforming filter. In an aspect, the restrictions for the subspaces reduce a number of constraints associated with performance of an interference alignment scheme.

According to another aspect, a device is provided comprising antennas configured receive a signal in subspaces through a quasi-static multiple input multiple output channel having a partially connected state, wherein the antennas are further configured to receive a decoding filter comprising restrictions for the subspaces under a data stream assignment, and the restrictions for the subspaces are determined based on the partially connected state of the channel, and a decoder configured to decode the signal with the beamforming filter. In another aspect, the restrictions for the subspaces reduce a number of constraints associated with performance of an interference alignment scheme.

In another embodiment, a method is provided comprising assigning data streams to a plurality of pairs of transmitters and receivers operating in a quasi-static multiple input multiple output channel having a partially connected state, and determining restrictions for signal subspaces associated with beamforming filters for the transmitters and zero-forcing filters of the receivers based on the data streams assigned to respective ones of transmitter and receiver pairs of the plurality of pairs of transmitters and receivers and the partially connected state of the channel. In an aspect, the determining the restrictions further comprises determining the restrictions to reduce a number of constraints associated with performing an interference alignment scheme.

Still in yet another aspect, a method is provided comprising receiving by a device, a beamforming filter comprising restrictions for subspaces under a data stream assignment for the device, transmitting a signal in the subspaces through a quasi-static multiple input multiple output channel having a partially connected state, determining the restrictions for the subspaces based on the partially connected state of the channel, and encoding the signal with the beamforming filter. In an aspect, the determining the restrictions for the subspaces includes reducing a number of constraints associated with performing an interference alignment scheme.

Further, a method is provided comprising receiving, by a device, a zero-forcing filter comprising restrictions for subspaces under a data stream assignment for the device receiving a signal in the subspaces through a quasi-static multiple input multiple output channel having a partially connected state, determining the restrictions for the subspaces based on the partially connected state of the channel, and encoding the signal with the zero-forcing filter. In an aspect, the determining the restrictions for the subspaces includes reducing a number of constraints associated with performing an interference alignment scheme.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 7A-7C presents an examples of a pressure transfer tree in various stages employed by the feasibility component 608 to update the constraint assignment in accordance with an embodiment.

FIGS. 10A-10C illustrate the number of freedoms in the precoder and decorrelator design verses the number of remaining constraints in the five pair 2×2 interference network before and after subspace design.

FIGS. 12A-12D present charts representing the number of freedoms minus the variable pressure at each node before and after adjusting constraint assignments.

DETAILED DESCRIPTION

Figure 1:
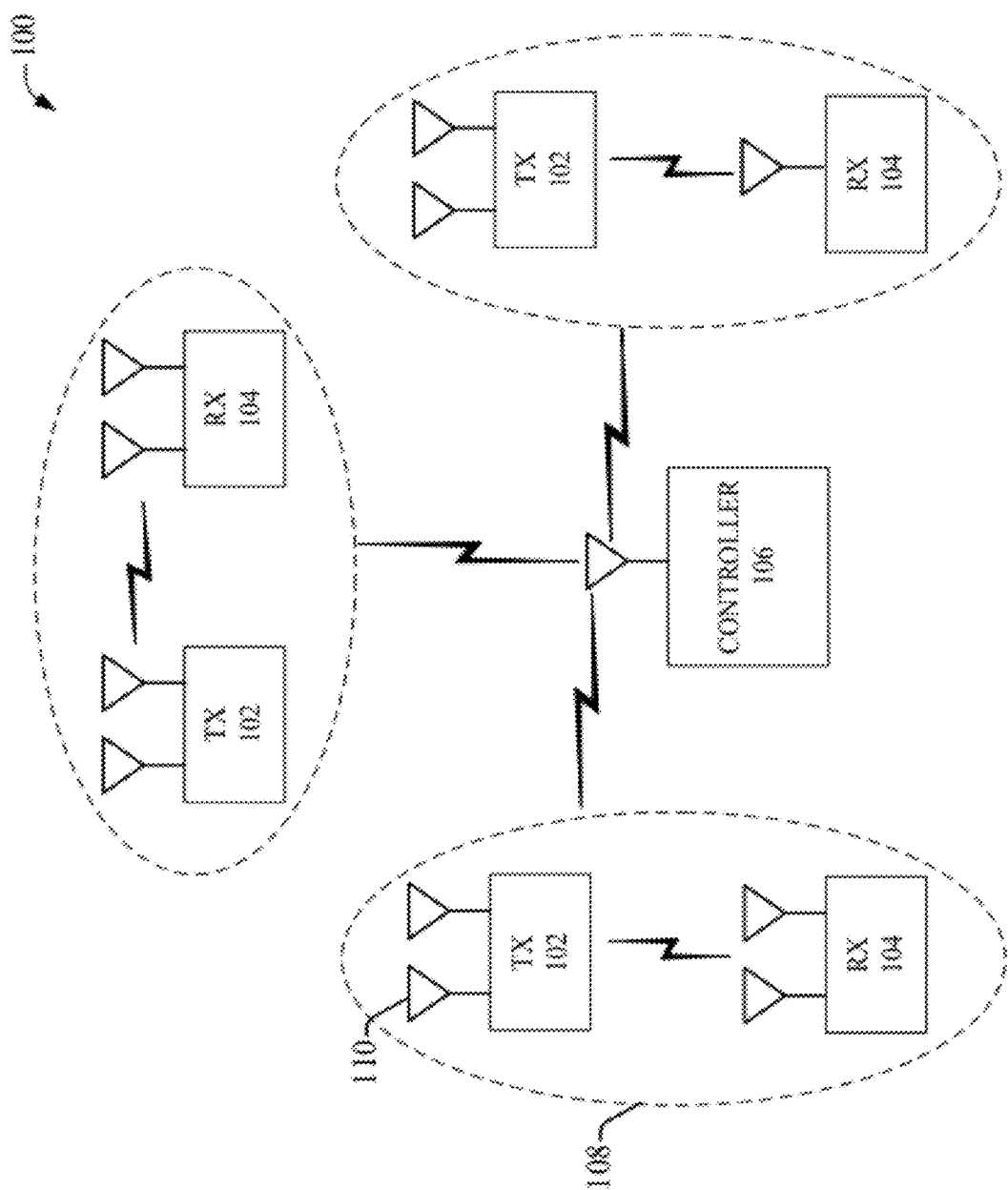
FIG. 1 illustrates a distributed wireless network 100, in accordance an some embodiments.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by channel state monitoring component to interpret partially connected channel states and factors contributing thereto.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

FIG. 1 illustrates a distributed wireless network 100, in accordance with some embodiments. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described.

In an aspect, wireless network 100 is a multiple input multiple output (MIMO) network. The distributed wireless network illustrated in FIG. 1 includes a plurality of transmitters (Tx) 102, a plurality of receivers (Rx) 104 and a central controller 106. Transmitters 102 and receivers 104 may form transmitter-receiver pairs 108 that communicate directly with each other in accordance with a MIMO communications techniques. Transmitters 102 and receivers 104 may represent any type of wireless communication device which may have both transmit and receive capabilities. The controller 106 may be a stand-alone wireless communication device configured to communicate wirelessly with transmitters 102 and receivers 104, or may be located within one of transmitters 102 or receivers 104. For, example, the transmitters and receiver can include base stations, access point, and/or user devices. The term node as used herein is used to refer to any apparatus which functions as a transmitter or receiver.

Although FIG. 1 depicts three transmitter (Tx) and receiver (Rx) pairs, it should be appreciated that any number of transmitter and receiver pairs can operate in network 100 in accordance with the subject disclosure. As user herein, the network 100 contitutes a MIMO system with K transmitter (Tx) and receiver (Rx) pairs. Each transmitter and each receiver has $N_t$ and $N_r$ antennas 110, respectively. Tx and Rx pairs are configured to communicate via partially connected, quasi-static MIMO interference channels. The term "fully-connected" refers to the condition that all channel coefficients are non-zero. In other words, all receivers see interference from all transmitters. MIMO interference channels are generally defined by channel state matrices including a number of coefficients. Fully connected interference channels have a full rank. However, in reality, MIMO interference channels are partially connected due to path loss, shadowing, as well as partial correlation. Accordingly, embodiments of the subject disclosure involve a partially connected interference channel where some channel coefficients are zero, and the channel is not full rank. In addition, the term quasi-static as used herein indicates that the interference channels are substatinally constant.

In accordance with embodiments, the controller is 106 is configured to implement a novel interference mitigation scheme to extend the feasibility region of the interference alignment alignment techniques. The interference mitigation scheme is designed to significantly increase system degrees of freedom (DoF) in symmetric, partially connected, multiple input multiple output (MIMO) interference networks. The D of wireless interference networks represents the number of interference-free signaling dimensions in the network 100. The interference mitigation scheme exploits the potential benefit of general partial connections in limited dimension MIMO interference channels so as to improve the network total DoF.

Figure 2:
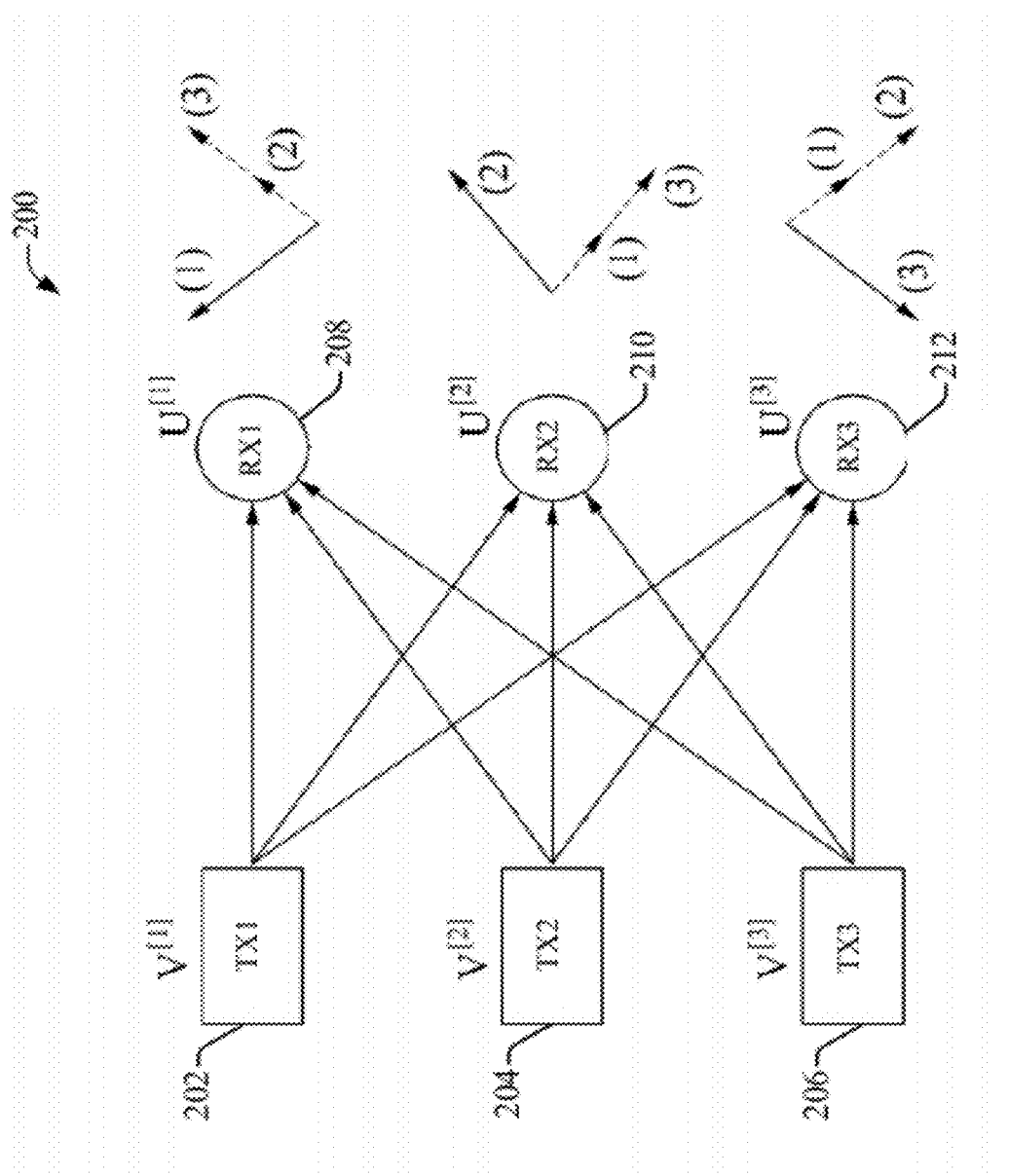
FIG. 2 illustrates an example of an interference alignment scheme in accordance with and embodiment.

FIG. 2 illustrates an example of an interference alignment scheme that can be employed in accordance with embodiments. For example, referring to FIG. 2, a MIMO communication system 200 includes transmission nodes (Tx1, Tx2, and Tx3) 202, 204, and 206. Each of the transmission nodes (Tx1, Tx2, and Tx3) 202, 204, and 206 corresponds to each of destination receiver nodes (Rx1, Rx2, and Rx3) 208, 210, and 212 respectively. It should be appreciated that three transmitters and receivers are depicted for ease of explanation. Additional K transmitter (Tx) and receiver (Rx) pairs can be employed. Each of the transmission nodes (Tx1, Tx2, and Tx3) 202, 204, and 206 denotes a data transmission device that includes, for example, a fixed base station, a mobile base station, a miniature base station such as a femto base station, a relay station, and the like. Each of the receiver nodes (Rx1, Rx2, and Rx3) 208, 210, and 212 denotes a data reception device that includes, for example, a relay station, a fixed terminal, a mobile terminal, and the like.

When each of the transmission nodes (Tx1, Tx2, and Tx3) 202, 204, and 206 transmits data using the same MIMO channel, interference may occur in each of the receiver nodes (Rx1, Rx2, and Rx3) 208, 210, and 212. For example, in receiver node (Rx1) 208, a signal of the transmission node (Rx1) 202 corresponds to a desired signal and signals of the transmission nodes (Tx2, Tx3) 204 and 206 correspond to interference. Similarly, interference may occur even in the receiver nodes (Rx2, Rx3) 210 and 212. The above described interference may decrease a throughput of the communication system. The decrease in the throughput caused by the interference may be prevented or reduced by using an interference alignment scheme. For example, the transmission nodes (Tx1, Tx2, and Tx3) 202, 204, and 206 may adjust a phase of a signal reasonably designed beamforming matrices V[1], V[2], and V[3], respectively. (As used herein, the term beamforming matrix, beamforming filter, precoder, precoding matrix, and precoding filter, are used interchangeably). A signal of each of the transmission nodes (Tx1, Tx2, and Tx3) 202, 204, and 206 with the adjusted phase may be transmitted via MIMO channels. A received signal of each of the receiver nodes (Rx1, Rx2, Rx3) 208, 210 and 212 may be separated into a desired signal and unwanted interference. For example, presume that arrow indicators (1), (2), and (3) of FIG. 2 denote a desire signal of the receiver nodes (Rx1, Rx2, Rx3) 208, 210 and 212 respectively. A received signal of the receiver node (Rx1) 208 may be separated into a desired signal (1) of the receiver node (Rx1) 208, and interference (2) and (3). A received signal of the receiver node (Rx2) 210 may be separated into a desired signal (2) of the receiver node (Rx2) 210, and interference (1) and (3). A received signal of the receiver node (Rx3) 212 may be separated into a desired signal (3) of the receiver node (Rx3) 212, and interference (1) and (2).

The receiver nodes (Rx1, Rx2, Rx3) 208, 210 and 212 may cancel or reduce the interference in the received signal to extract the desired signal using reasonably designed decoding matrices U[1], U[2], and U[3], respectively. (As used herein, the terms decoding matrix, decoding filter, decorrelator, and zero-forcing matrix/filter, are used interchangeably). For example, the transmission nodes (Tx1, Tx2, and Tx3) 202, 204, and 206 may use the reasonably designed beamforming matrices V[1], V[2], and V[3], respectively. The receiver nodes (Rx1, Rx2, Rx3) 208, 210 and 212 may use the reasonably designed decoding matrices U[1], U[2], and U[3], respectively. Through use of these matrices, it is possible to enhance the efficiency of the use of radio retransmissions and to prevent or reduce a decrease in throughput of the communication system caused by interference.

Although an expression of the beamforming matrices V[1], V[2], and V[3] and the decoding matrices U[1], U[2], and U[3] is used here for ease of description, the beamforming matrices V[1], V[2], and V[3] and the decoding matrices U[1], U[2], and U[3] may be in a matrix or a vector form. For example, the beamforming matrices V[1], V[2], and V[3] and the decoding matrices U[1], U[2], and U[3] may have the form of a matrix or a vector according to a number of data streams of each of the transmission nodes (Tx1, Tx2, and Tx3) 202, 204, and 206.

The subject disclosure presents a novel two-stage dynamic interference mitigation scheme to exploit the potential benefit of general partial connections in limited dimension MIMO interference channels so as to improve the network total DoF. The proposed dynamic interference mitigation solution has two stages. The first stage determines the stream assignment and the subspace constraints for the beamforming matrices and the decoding matrices based on the partially connected topology such as the path loss, shadowing and spatial correlation. The second stage determines the beamforming matrices and the decoding matrices (based on the instantaneous channel state information) over the subspaces obtained from the first stage.

According to embodiments, all MIMO communication systems of the subject disclosure, including systems 100 and 200 are configured as follows. The Tx/Rx the channel from fading coefficients from the Tx n to the Rx m are denoted as $H_{mn} \in \mathbb{C}^{N_r \times N_t}$. The number of data streams transmitted by Tx-Rx pair m is $d_m$ ($\leq \min(N_t, N_r)$), and the signal $y_m \in \mathbb{C}^{d_m}$ received at the Rx m is given by:

$$y_m = U_m(H_{mn}V_m x_m + \Sigma_{n=m \in \{1,2,\ldots,K\}} H_{mn}V_n x_n + z) \quad \text{(Eq. 1)}$$

where $X_m \in \mathbb{C}^{d_m}$ is the encoded information symbol for Rx m, $U_m \in \mathbb{C}^{d_m \times N_r}$ is the decorrelator of Rx m, and $V_m \in \mathbb{C}^{N_t \times d_m}$ is the transmit precoding matrix at the Tx m. $z \in \mathbb{C}^{N_r \times 1}$ is the white Gaussian noise with unit variance. The transmit power at the Tx n is $\mathbb{E}(\|V_n x_n\|^2) = P_n$.

According to an embodiment, the partial channel connectivity of the K-pair interference channels $\{H_{mn}\}$ is specified by the following model assumptions, the elements of the channel states matrices $\{H_{mn} \in \mathbb{C}^{N_r \times N_t}\}$, n, m $\in \{1, 2, \ldots, K\}$ are random variables following certain distribution and have the following properties: a.) independence, wherein random matrices $\{H_{mn}\}$ n, m$\in \{1, 2, \ldots, K\}$ are mutually independent; b.) partial connectivity at the transmitter side, wherein the Tx side partial connectivity is defined as the null space of $H_{mn}$, e.g: $\mathcal{N}(H_{mn}) = \{v \in \mathbb{C}^{N_t \times 1}: H_{mn}v = 0\}$; and c.) connectivity at the receiver side, the Rx side partial connectivity is defined as the "transposed" null space of $H_{mn}$, e.g: $\mathcal{N}^H(H_{mn}) = \{u \in \mathbb{C}^{1 \times N_r}: H_{mn}^H u^H = 0\} = \{u \in \mathbb{C}^{1 \times N_r}: uH_{mn} = 0\}$.

As a result of the assumptions above, $\{\mathcal{N}(H_{mn})\}$ and $\{\mathcal{N}^H(H_{mn})\}$ m, n$\in \{1, 2, \ldots, K\}$ are the connection topological parameters of the general partially connected channel model employe according to aspects of the subject disclosure. This is a general model as no specific structure is imposed on $\{\mathcal{N}(H_{mn})\}$ and $\{\mathcal{N}^H(H_{mn})\}$.

As noted above, according to aspect of the subject disclosure, MIMO interference channels are employed that are partially connected. Partial connectivity denotes that some channel coefficients are such that channel matrices are less than full rank. Partial connectivity is attributable to various physical scenarios, including but not limited to, path loss and shadowing, unequal transmit and receive antennas, and spatial correlation.

In practice, different Txs may contribute differently to aggregate interference due to the heterogeneous path loss and shadowing effects. For example, in a K-pair MIMO interference network such where $N_t = N_r$, some Txs and Rxs may be far away from each other when the difference between their node indices $|n-m| > L$, the path loss and shadowing from Tx n to Rx m, is 60 dB higher than that of the direct link (from Tx n to Rx n, n$\in \{1, 2, \ldots, K\}$). As a result, effectively $H_{mn} = 0$, $\forall |n-m| > L$. This corresponds to a partially connected MIMO interference channel (induced by path loss and shadowing effects) with the connection topology given by $$\mathcal{N}(H_{mn}) = \begin{cases} \mathbb{C}^{N_t \times 1} & \text{if } |n-m| > L \\ \{0\} & \text{otherwise} \end{cases},$$

$$\mathcal{N}^H(H_{mn}) = \begin{cases} \mathbb{C}^{1 \times N_r} & \text{if } |n-m| > L \\ \{0\} & \text{otherwise} \end{cases}.$$

In instances where there are unequal transmit and receive antennas, i.e $N_t \neq N_r$, there is a rank $|N_t - N_r|$ null space on the side with more antennas. For example, when $N_t = 4$, $N_r = 2$, denote $$H_{mn} = \begin{bmatrix} h_{mn}(1) \\ h_{mn}(2) \end{bmatrix},$$

where $h_{mn}(p)$ are 1×4 vectors. Hence, this corresponds to a partially connected MIMO interference channel (induced by non-square fading matrices) with the connection topology given by: $\mathcal{N}(H_{mn}) = (\text{span}(h_{mn}^T(1), h_{mn}^T(2)))^\perp$, $\mathcal{N}^H(H_{mn}) = \{0\}$, $\forall m, n \in \{1, 2, \ldots, K\}$.

Figure 3A:
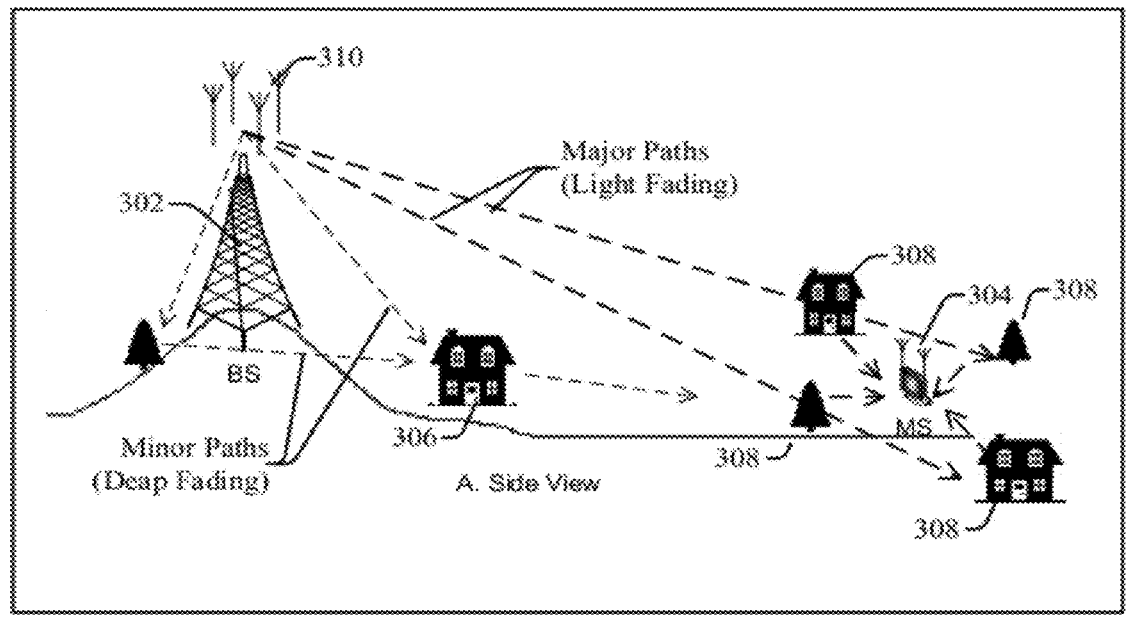
FIGS. 3A and 3B present illustrations of a local scattering effect in a MMO system.
Figure 3B:
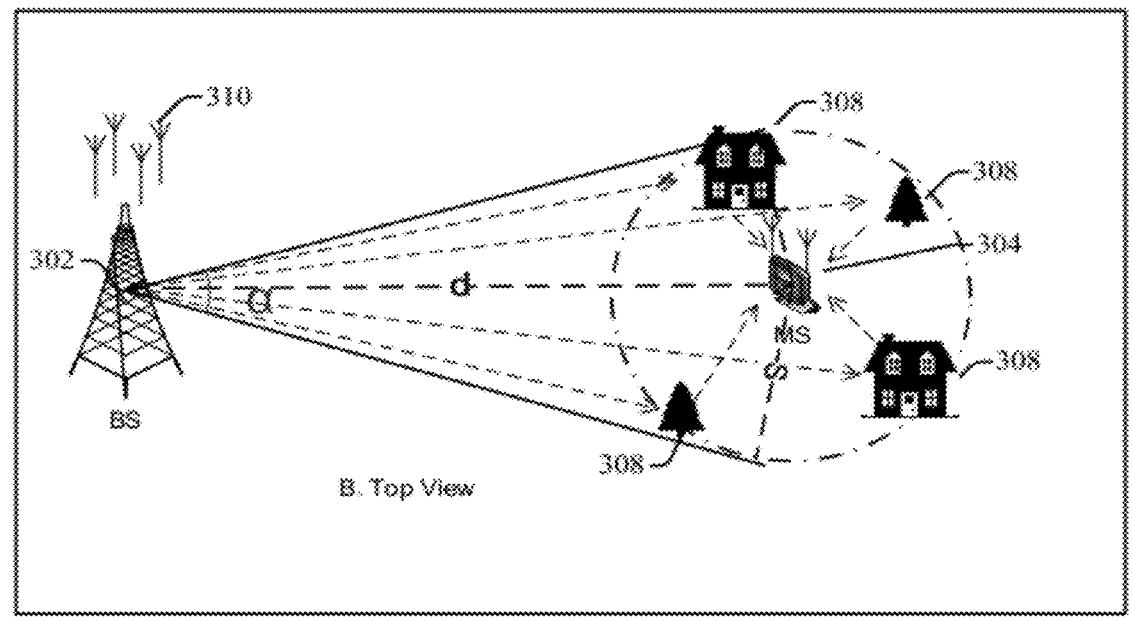

FIGS. 3A and 3B present an illustration of a local scattering effect in a MMO system wherein an asymetric propagation environment leads to spatial channel correlation. The statistical property of the channel states in a MIMO system is strongly affected by the physical propagation environment. In FIG. 3A (side view) and 3B (top view), the Txs 302 are positioned at high elevations above the scatterers 306 and 308 while the Rxs 304 are positioned at low altitude with rich scattering. Hence, only the scattering objects 308 surrounding a Rx 304 could effectively reflect signals from the Tx 302 to the Rx 304 as illustrated in FIG. 3B. When employing a double directional channel response from the n-th Tx to the m-th Rx (n, m$\in \{1, 2, \ldots, K\}$): $H_{mn}^a = \{h_{mn}^a(\theta_t, \theta_r), \theta_t, \theta_r \in [-\pi, \pi]\}$ has the following property:

$$h_{mn}^a(\theta_t, \theta_r) = 0 \text{ if } |\theta_t| > \frac{\alpha}{2}; \quad \text{(Eq. 2)}$$

$$\text{where } \alpha = \begin{cases} 2\arcsin\left(\frac{S}{d_{mn}}\right) & \text{when: } S \leq d_{mn} \\ 2\pi & \text{else.} \end{cases} \quad \text{(Eq. 3)}$$

where $d_{mn}$ is the distance between Tx n and to Rx m, S is the local effective scattering radius. Assume the Txs 302 are equipped with uniform linear antenna array (ULA) 310. Hence the virtual angular channel representation [11] is given by:

$$h_{mn}^v(p, q) = \int_{-\pi}^{\pi} \int_{-\pi}^{\pi} h_{mn}(\theta_t, \theta_r) \quad \text{(Eq. 4)}$$

$$f_{N_r}\left(\frac{\sin(\theta_r - \varphi_{mn})r}{\lambda} - \frac{p}{N_r}\right) f_{N_t}\left(\frac{\sin(\theta_t - \theta_{mn})r}{\lambda} - \frac{q}{N_t}\right) d\theta_r d\theta_t$$

where r is the antenna separation, $\lambda$ is the wavelength, $\theta_{mn}$ is the angle between the transmit array normal direction and the direction from Tx n to Rx m, $\varphi_{mn}$ is the angle between receive array normal direction and the direction from Tx n to Rx m, assume the antenna array is critically spaced, i.e.

$$\frac{r}{\lambda} = \frac{1}{2} \cdot f_N(\omega)$$

$$= e_N^H(0) e_N(\omega)$$

$$= \frac{1}{N} e^{-j\pi\omega(N-1)} \frac{\sin(\pi N \omega)}{\sin(\pi \omega)}.$$

Figure 4A:
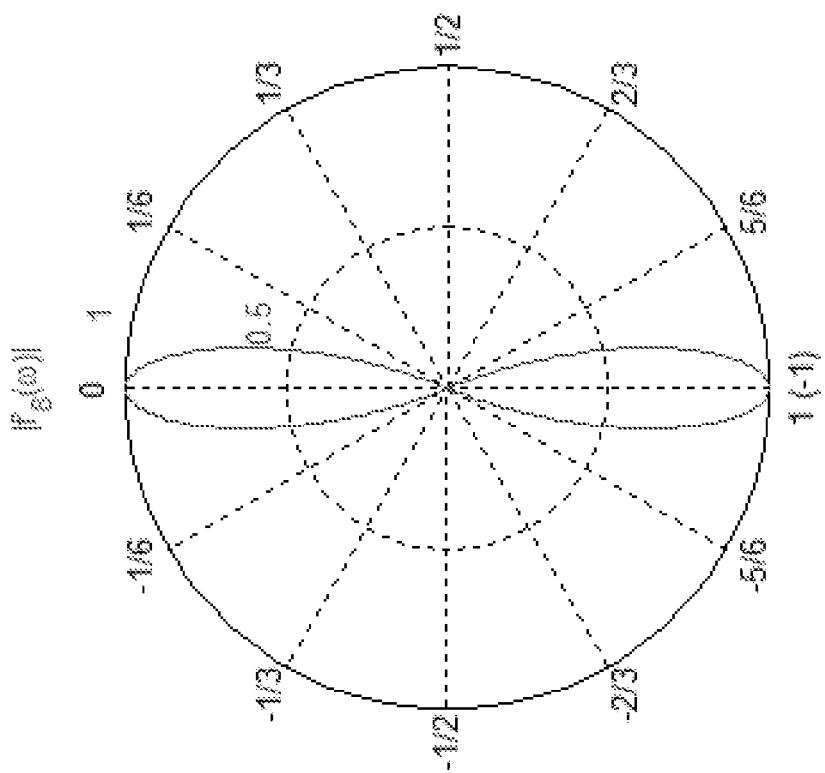
FIG. 4A illustrates the original radiation pattern of a linear antenna array (ULA).
Figure 4B:
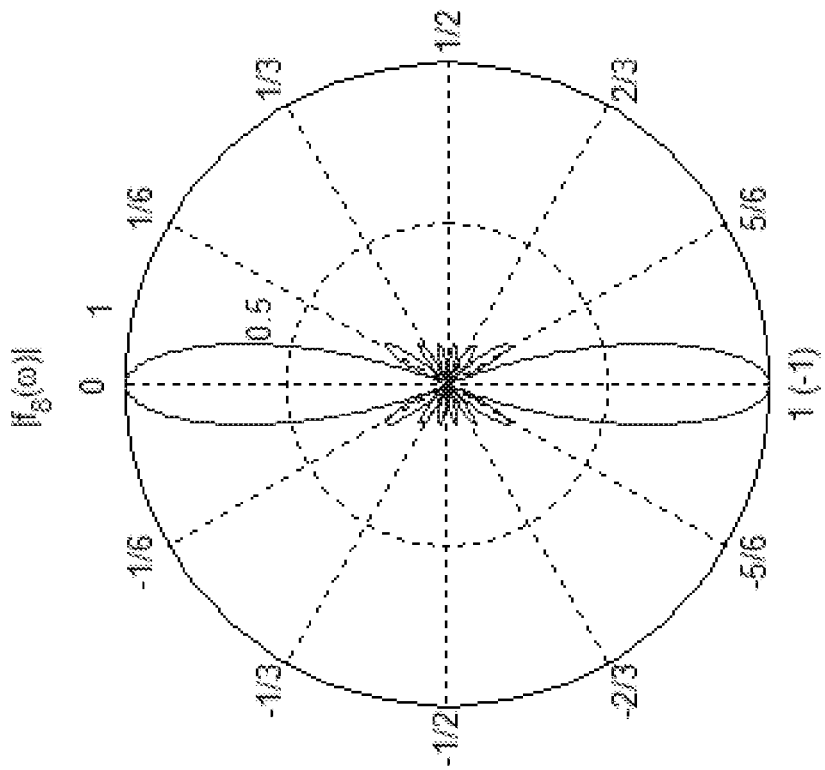
FIG. 4B illustrates the radiation pattern of a ULA after approximation.

FIG. 4A illustrates the original radiation pattern of the ULA and FIG. 4B illustrates the radiation pattern of the ULA (310 of FIGS. 3A and 3B) after approximation. As illustrated in FIG. 4A, $f_N(\omega)$ represents the radiation pattern of ULA. Note that the main-lobes dominate in the radiation pattern (e.g. when N=8, the power of the main-lobes occupy 91% of that in the whole radiation pattern). Hence, as illustrated in FIG. 4B, for simplicity, we use the main-lobe to approximate the radiation pattern, i.e. we use $$f'_N(\omega) = \begin{cases} f_N(\omega), & \text{if: } \omega - \omega \le \frac{1}{N} \text{ or } \ge \frac{N-1}{N} \\ 0, & \text{otherwise.} \end{cases} \quad (\text{Eq. 4})$$

to replace $f_N(\omega)$ in (Eq. 4). Hence, combining (Eq. 2), (Eq. 3) and (Eq. 4), we have:

$$\left| \frac{\sin\theta}{2} - \frac{q}{N_t} \right| \bmod 1 > \frac{1}{N_t}, \quad (\text{Eq. 5})$$

$$\forall \theta \in [\theta_{mn} - F_a(S, d_{mn}), \theta_{mn} + F_a(S, d_{mn})] \text{ where}$$

$$F_a(S, d_{mn}) = \begin{cases} \arcsin\frac{S}{d_{mn}} & \text{when: } S \le d_{mn} \\ \pi & \text{when: } S > d_{mn} \end{cases},$$

$\theta_{mn} \in (-\pi, \pi]$ is the direction from Tx n to Rx m, and $d_{mn}$ is the distance between the two nodes.

Local scattering effect causes significant spatial correlation in multiple input single output (MISO) channels. To explore the similar effect in MIMO channels and get a direct association between the MIMO fading channel correlation and the physical scattering environment, the virtual angular domain representation for MIMO channels discussed above can be employed. Specifically, the MIMO fading channels in the antenna domain $H_{mn}^{ant}$ and in the angular domain $H_{mn}^{ang}$ have a one-one correspondence given by:

$$H_{mn}^{ant} = A_R H_{mn}^{ang} A_T^H \quad (\text{Eq. 6})$$

where:

$$A_T = \left[ e_{N_t}(0), e_{N_t}\left(\frac{1}{N_t}\right) \dots , e_{N_t}\left(\frac{N_t-1}{N_t}\right) \right] \quad (\text{Eq. 7})$$

$$A_R = \left[ e_{N_r}(0), e_{N_r}\left(\frac{1}{N_r}\right) \dots , e_{N_r}\left(\frac{N_r-1}{N_r}\right) \right] \quad (\text{Eq. 8})$$

$$e_N(\omega) = \frac{1}{\sqrt{N}}[1, e^{-j2\pi(\omega)}, e^{-j2\pi(2\omega)} \dots e^{-j2\pi((N-1)\omega)}]^T \quad (\text{Eq. 9})$$

Given a local scattering environment with the parameter effective scattering radius S as illustrated in FIGS. 3A and 3B, the MIMO fading matrix $H_{mn}^{ang} = \{h_{mn}^{ang}(p, q)\}$ $p \in \{1, 2, \dots, N_r\}$, $q \in \{1, 2, \dots, N_t\}$ in the angular domain has the following property: $h_{mn}^{ang}(p, q) = 0$ with probability 1 if and only if:

$$\left| \frac{\sin\theta}{2} - \frac{q}{N_t} \right| \bmod 1 > \frac{1}{N_t}, \quad (\text{Eq. 10})$$

$$\forall \theta \in [\theta_{mn} - F_a(S, d_{mn}), \theta_{mn} + F_a(S, d_{mn})]$$

$$\text{where } F_a(S, d_{mn}) = \begin{cases} \arcsin\frac{S}{d_{mn}} & \text{when: } S \le d_{mn} \\ \pi & \text{when: } S > d_{mn} \end{cases},$$

$\theta_{mn} \in (-\pi, \pi]$ is the direction from Tx n to Rx m, and $d_{mn}$ is the distance between the two nodes. This spatially correlated MIMO model is a special case of the general partially connected MIMO interference model. For example, in FIGS. 3A and 3B, suppose $N_t = N_r = 4$ and denote $H_{mn}^{ang} = [h_{mn}(1), h_{mn}(2), h_{mn}(3), h_{mn}(4)]$. Suppose due to spatial correlation, $h_{mn}(1) = h_{mn}(4) = 0$ and $h_{mn}(2), h_{mn}(3)$ are randomly generated $\mathbb{C}^{4 \times 1}$ vectors. As a result, $$\text{span}\left( A_T^H \begin{bmatrix} 1 \\ 0 \\ 0 \\ 0 \end{bmatrix}, A_T^H \begin{bmatrix} 0 \\ 0 \\ 0 \\ 1 \end{bmatrix} \right) \text{ and}$$

$$\mathcal{N}^H(H_{mn}) = (\text{span}((A_R h_{mn}(2))^T, (A_R h_{mn}(3))^T))^\perp,$$

$$\forall n, m \in \{1, 2, \dots, K\}.$$

Figure 5:
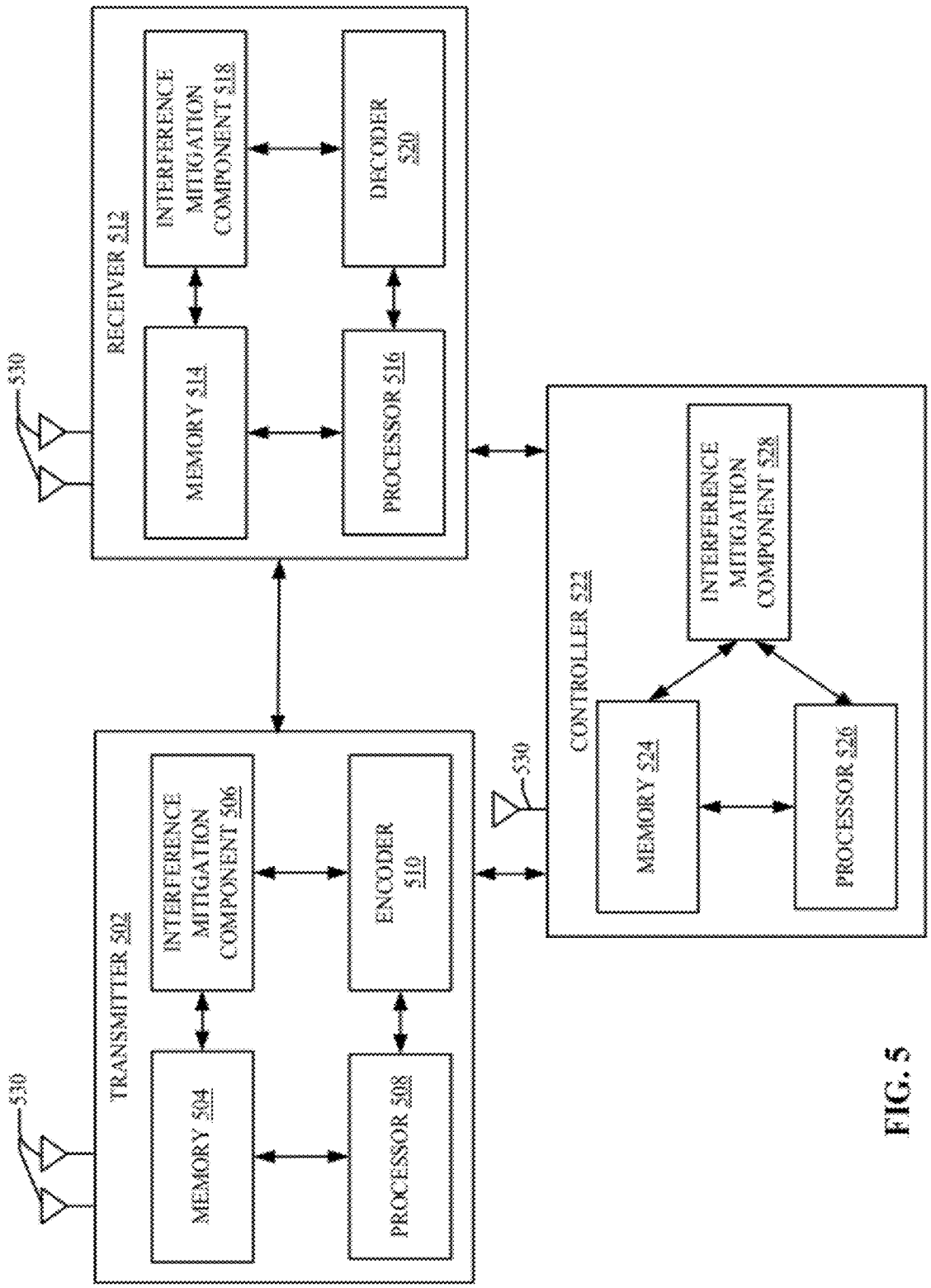
FIG. 5 presents a high level block diagram of various system elements operable in MIMO systems such as system 100 or 200 in accordance with an embodiment.

Turning now to FIG. 5, presented are high level block diagrams of various system elements operable in a MIMO system such as system 100 or 200. The various system elements include a transmitter 502, a receiver 512 and a central controller 522. In an aspect, transmitter 502 and receiver 512 constitute network nodes. In distributed network embodiments, transmitter 502 may be suitable for use as one or more of transmitters 102 (FIG. 1), receiver 512 may be suitable for use as one or more of receivers 104 (FIG. 1) and the central scheduler 522 may be suitable for use as central controller 106 (FIG. 1). Transmitter 502, receiver 512, and central controller can include mobile computing devices, or fixed computing devices capable of communicating in a MIMO network. For example, in an aspect, transmitter 502 and receiver 512 can include mobile user devices, access points, and/or base stations. Controller 522 can include a media access controller (MAC), or any type of remote controller or management platform capable of providing addressing and channel access control mechanisms that make it possible for network nodes, such as transmitter 502 and receiver 522, to communicate within a MIMO network. In another aspect, controller 522 can reside within a transmitter 502 or a receiver 522.

As seen in FIG. 5, transmitter can include a memory 504, a processor 508, an interference mitigation component 506, an encoder 510, and two or more antennas 530 for performing MIMO signaling protocol. Memory 504 holds instructions for carrying out the operations of the interference mitigation component 506 and the encoder 510, when executed by processor 508. The processor facilitates controlling and processing all onboard operations and functions of the transmitter. Memory 504 interfaces to the processor 508 for storage of data and one or more applications of the transmitter. The applications can be stored in the memory 504 and/or in a firmware, and executed by the processor 508 from either or both the memory 504 or/and the firmware (not shown).

Receiver 512 can include a memory 514, a processor 516, an interference mitigation component 518, a decoder 520, and two or more antennas 530 for performing MIMO signaling protocol. Memory 514 holds instructions for carrying out the operations of the interference mitigation component 518 and the decoder 520, when executed by processor 518. The processor facilitates controlling and processing all onboard operations and functions of the receiver 512. Memory 514 interfaces to the processor 516 for storage of data and one or more applications of the transmitter. The applications can be stored in the memory 514 and/or in a firmware, and executed by the processor 516 from either or both the memory 514 or/and the firmware (not shown).

Controller 522 can include a memory 524, a processor 526, and an interference mitigation component 528, and at least one antenna 530 for performing MIMO signaling protocol. Memory 524 holds instructions for carrying out the operations of the interference mitigation component 528 when executed by processor 528. The processor facilitates controlling and processing all onboard operations and functions of the controller 522. Memory 524 interfaces to the processor 526 for storage of data and one or more applications of the transmitter. The applications can be stored in the memory 524 and/or in a firmware, and executed by the processor 526 from either or both the memory 524 or/and the firmware (not shown).

Transmitter 502 includes encoder 510 in order to precode signals with beamforming information via beamforming vectors, in accordance with an interference mitigation technique, for transmission to an associated receiver, such as receiver 512, of a transmitter-receiver pair. Beamforming filters are designed to maximize the overlap of interference signal subspaces at each receiver while ensuring that the desired signal vectors at each receiver are linearly independent of the interference subspace. Therefore, each receiver can zeroforce all the interference signals without zero-forcing any of the desired signals. The encoder is configured to apply a beamforming filter (i.e a beamforming matrix) determined at least as a function of channel state information (CSI) and the feasibility of interference alignment. Receiver 512 includes decoder 520 to decode the precoded signals received from the transmitter 502 of a transmitter-receiver pair and generate decoded signals. The decoder is configured to apply a zero-forcing filter in order to enable the receiver to zeroforce all the interference signals without zero-forcing any of the desired signals.

In accordance with embodiments, the precoding by encoder 510 of transmitter 502 allows the decoder 520 of receiver 512 to mitigate and/or remove interference associated with transmissions of other transmitters in a MIMO network. The channel state information may represent the partially connected MIMO interference channel and/or any wireless channel between the transmitter 502 and the receiver 512 of the transmitter-receiver pair. In some embodiments, the decoder 520 may be configured to perform minimum mean-squared error (MMSE) decoding, while in other embodiments, the decoder 512 may be configured to perform zero-forcing (ZF) decoding using the channel state information. Other decoding techniques to decode precoded signals may also be used. In accordance with multicarrier embodiments, transmitter 502 may include inverse fast Fourier transform (IFFT) circuitry to convert frequency-domain subcarrier signals to the time-domain for transmission. Receiver 512 may include fast Fourier transform (FFT) circuitry to convert received multicarrier signals to the frequency domain. In some embodiments, receiver 512 may include channel estimation (not separately illustrated) to estimate a channel response, and transmitter 502 may include channel compensation circuitry (not separately illustrated) to compensate for the channel response prior to preceding.

In some embodiments, the central controller 522 is configured to employ interference mitigation component 528 in order to dynamically determine data stream assignments for signals sent between transmitter 502 and 512 as well as associated beamforming filters and zero-forcing filters so as to extend the feasibility region of existing interference alignment schemes. As discusses infra, the interference mitigation component employs a novel two-stage interference algorithm. The stage one algorithm determines the stream assignment and the subspace constraints for the beamforming filters and the zero-forcing filters for a transmitter-receiver pair based on the partial connectivity state of the MIMO interference channel. The stage II algorithm then determines the beamforming filters and the zero-forcing filters based on the stream assignment and the subspace constraints as well as the local channel state information.

In an aspect, the central controller 522 communicates the determined filter information and data stream assignment information to the transmitters and receivers respectively. For example, the central controller 522 may perform data stream assignment and filter assignment for transmitter and receiver pairs. In response to being instructed by the central controller 522, the transmitters 502 of each transmitter-receiver pair are configured to precode baseband signals with the determined beamforming filter. The associated receiver of each transmitter-receiver pair is further configured to apply the determined zero-forcing filter.

In another embodiment, the transmitter is configured to employ interference mitigation component 506 in order to dynamically determine data stream assignments for signals sent between transmitter 502 and 512 as well as associated beamforming filters and zero-forcing filters so as to extend the feasibility region of existing interference alignment schemes. According to this embodiment, the controller may not be employed. The transmitter communicates the determined filter information and data stream assignment information to the transmitters and receivers respectively. For example, transmitter 502 may perform data stream assignment and filter assignment for transmitter and receiver pairs. In response, the transmitters of each transmitter-receiver pair are configured to precode baseband signals with the determined beamforming filter. The associated receiver of each transmitter-receiver pair is further configured to apply the determined zero-forcing filter.

In yet another aspect, the receiver 512 is configured to employ interference mitigation component 518 in order to dynamically determine data stream assignments for signals sent between transmitter 502 and 512 as well as associated beamforming filters and zero-forcing filters so as to extend the feasibility region of existing interference alignment schemes. According to this embodiment, the controller may not be employed. The receiver 512 communicates the determined filter information and data stream assignment information to the transmitters and receivers respectively. For example, receiver 512 may perform data stream assignment and filter assignment for transmitter and receiver pairs. In response, the transmitters of each transmitter-receiver pair are configured to precode baseband signals with the determined beamforming filter. The associated receiver of each transmitter-receiver pair is further configured to apply the determined zero-forcing filter.

Still in yet another aspect, controller 522 is configured to perform data stream assignment for respective transmitter and receiver pairs as determined by interference mitigation component 528 while transmitter 502 is configured to determine and assign beamforming filters with interference mitigation component 506 and receiver 512 is configured to determine and assign zero-forcing filters with interference mitigation component 520. It should be appreciated that various functions of the interference mitigation component can be employed by any of the transmitter 502, receiver 512, and controller 522. Although transmitter 502, receiver 512 and the central controller 516 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 6:
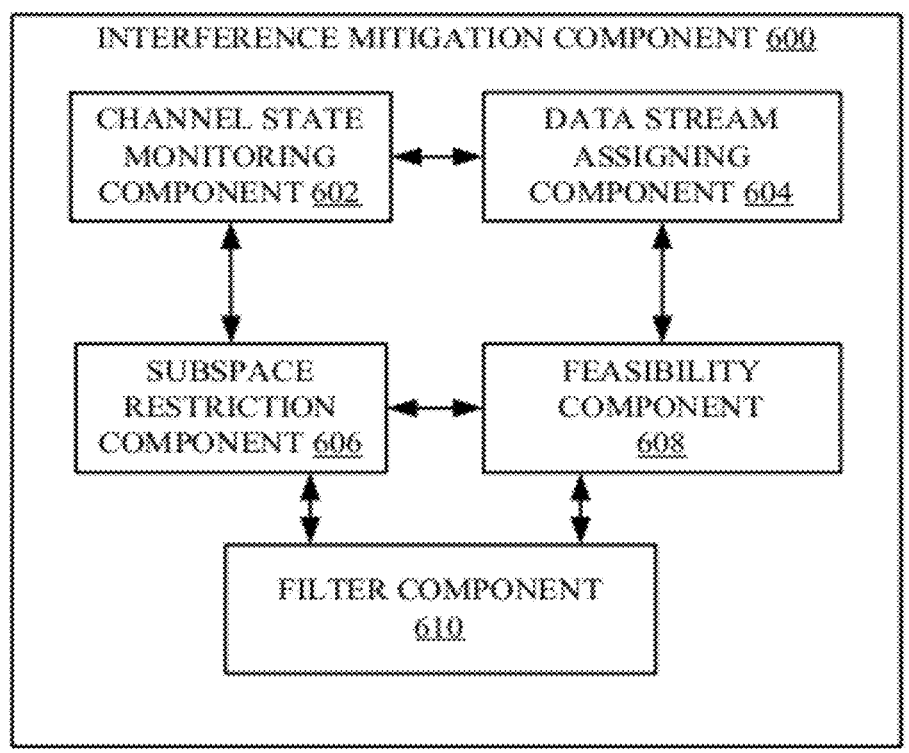
FIG. 6 presents a block diagram of an interference mitigation component accordance with an embodiment.

Referring now to FIG. 6, presented is a block diagram of an interference mitigation component 600. The interference mitigation component 510, 520 and 528 discussed with reference to FIG. 5, may include some or all of the components of interference mitigation component 600. As noted above, interference mitigation component is configured to employ novel two-stage interference mitigation scheme for a partially connected MIMO interference network. Most of the existing works on interference alignment have assumed a fully connected interference topology, e.g. $\{H_{mn}\}$ are all full rank. However, MIMO interference channels are usually partially connected due to various physical reasons discussed supra. The subject interference mitigation scheme restricts beamforming filters and zero-forcing filters to a lower rank subspace, so as to eliminate "many" independent constraints at a cost of only a few "free variables" and hence extend the conventional interference alignment feasibility region.

In addition, classical interference alignment schemes reduce interference dimension by overlapping the interferences from different transmitters. However, when partial connectivity is considered, the overlapping the interferences is no longer the only method to reduce interference dimension. In addition to overlapping interference, the subject interference mitigation scheme further utilizes channel null spaces. As discussed infra, the subject interference mitigation scheme significantly increases system degrees of freedom for symmetric partially connected MIMO interference networks. The proposed scheme is also backward compatible with existing interference alignment designs when the topology is fully connected.

Interference mitigation component 600 employs an algorithm that dynamically determines the data stream assignment $\mathbb{D}=\{d_1, d_2, \ldots, d_K\}$, $d_n \in \{0, 1, \ldots, d_n^{max}\}$ and the associated beamforming vectors $V_n \in \mathbb{C}^{N_t \times d_n}$ and zero-forcing vectors $U_n \in \mathbb{C}^{d_n \times N_r}$, where $d_n^{max}$ and $d_n$ are the number of the data streams claimed by and assigned to Tx-Rx pair n, respectively, $n \in \{1, 2, \ldots, K\}$, such that:

$$\text{rank}(U_n H_{mn} V_n) = d_n \quad \text{(Eq. 11)}$$

$$U_m H_{mn} V_n = 0, \forall n \neq m \in \{1, 2, \ldots, K\} \quad \text{(Eq. 12)}$$

Equations 11 and 12 represent interference alignment feasibilty requirements. A symmetrical MIMO interference system is feasible if the number of freedoms in transceiver design is no less than the number of independent constraints induced by interference alignment feasibility requirements. In other words, interference alignment is feasible if the number of equations resulting from equations 11 and 12 does not exceed the number of variables for equations 11 and 12. Interference alignment checking is further described in detail supra. The following example is intended to demonstrate the potential benefits of partial connectivity exploitation in conjunction with interference alignment.

Consider a 2×2, 5-pair interference network. Each Tx-Rx pair attempts to transmit 1 data stream (i.e. $d_n^{max}=1$, $\forall n \in \{1, 2, 3, 4, 5\}$). If the network is fully connected (all channel matrices are rank two), the freedoms in each beamforming vector $v_n \in \mathbb{C}^{2 \times 1}$ and zero-forcing vector $u_m \in \mathbb{C}^{1 \times 2}$ is given by $\dim(\mathcal{G}(1,2))=1$, where the Grassmannian $\mathcal{G}(x, y)$ denotes the set of all x-dimensional subspaces in $\mathbb{C}^y$, and the number of constraints induced by each cross link ($u_m H_{mn} v_n = 0, n \neq m$) is one. If we assign data streams to k Tx-Rx pairs, there are in total 2k freedoms in the beamforming vectors and the zero-forcing vectors and k(k−1) interference alignment constraints. Hence, from the interference alignment feasibility condition, we have $k(k-1) \leq 2k \Rightarrow k \leq 3$. In other words, the achievable degrees of freedom is upper bounded by three.

Now suppose the network is partially connected such that the channel matrices of all cross links are rank one with a plurality of identified null spaces. Then the interference alignment feasibility constants defined by equations 10 and 11 are satisfied under the following policy: Assign data streams to Tx-Rx pairs 1, 2, 4, 5 ($\{1, 2, \ldots, K\}=\{1, 2, 4, 5\}$), with precoding vectors $$v_1 = \frac{\sqrt{2}}{2}\begin{bmatrix} 1 \\ -1 \end{bmatrix}, v_2 = \begin{bmatrix} 1 \\ 0 \end{bmatrix}, v_4 = \frac{\sqrt{2}}{2}\begin{bmatrix} 1 \\ 1 \end{bmatrix}, v_5 = \begin{bmatrix} 0 \\ 1 \end{bmatrix},$$

and decorrelators (i.e zero-forcing vectors)

$$u_1 = \left(\begin{bmatrix} 0 & -1 \\ 1 & 0 \end{bmatrix} H_{15} v_5\right)^T,$$

$$u_2 = \left(\begin{bmatrix} 0 & -1 \\ 1 & 0 \end{bmatrix} H_{21} v_1\right)^T,$$

$$u_4 = \left(\begin{bmatrix} 0 & -1 \\ 1 & 0 \end{bmatrix} H_{42} v_2\right)^T,$$

$$u_5 = \left(\begin{bmatrix} 0 & -1 \\ 1 & 0 \end{bmatrix} H_{54} v_4\right)^T.$$

Since four Tx-Rx pairs can have data streams simultaneously, one extra degree of freedom is achieved compared to the fully connected case. The example above illustrates how partial connectivity can contribute to network performance gains.

Turning back now to FIG. 6, interference mitigation component 600 includes a channel state monitoring component 602, a data stream assigning component 604, a subspace restriction component 606, a feasibility component 608, and a filter component 610. Provided below is an overview of the functions of each of the components of the interference mitigation component 600. Each of the components of the interference mitigation component 600 is configured to perform various aspects and functions of a novel two-phase algorithm designed to perform dynamic interference mitigation.

The channel state monitoring component 602, data stream assigning component 604, subspace restriction component 606, and feasibility component 608 employ a first phase of the algorithm to determine stream assignments and channel subspaces. The first phase algorithm determines the stream assignment pattern $\mathbb{D}=\{d_1, d_2, \ldots, d_K\}$ and the subspaces for the beamforming filters $\mathbb{S}_n^t$ and zero-forcing filters $\mathbb{S}_m^r$ for n, $m \in \{1, 2, \ldots, K\}$ based on the partial connectivity channel state $\{\mathcal{N}(H_{mn}), \mathcal{N}(H_{mn})\}$, m, $n \in \{1, 2, \ldots, K\}$. Suppose the row vectors in precoder $V_n$ and the column vectors in decorrelator $U_m$ are restricted to the linear spaces $\mathbb{S}_n^t \subseteq \mathbb{C}^{N_t \times 1}$ and $\mathbb{S}_m^r \subseteq \mathbb{C}^{1 \times N_r}$, respectively. Denote $S_n^t = |\mathbb{S}_n^t|$, $S_m^r = |\mathbb{S}_m^r|$, where $|\mathbb{X}|$ denotes the rank of linear space $\mathbb{X}$. Then equations 11 and 12 can be rewritten as:

$$\text{rank}(U_n H_{mn} V_n) = \text{rank}(U'_n S_n^r H_{mn} S_n^t V'_n) = d_n \quad \text{(Eq. 13)}$$

$$U_m H_{mn} V_n = U'_m S_m^r H_{mn} S_n^t V'_n = 0 \quad \text{(Eq. 14)}$$

where the column vectors of the $N_t \times S_n^t$ matrix $S_n^t$ and the $S_m^r \times N_r$ matrix $S_m^r$ span the spaces $\mathbb{S}_n^t$ and $\mathbb{S}_m^r$, respectively.

Note that the restricted beamforming filter $V'_n$ and the restricted zero-forcing filter are $U'_m$ are $S_n^t \times d_n$ and $d_m \times S_m^r$ matrices, respectively.

The channel state monitoring component 602 and the filter component 610 employ a second phase of the algorithm to the determine beamforming filters and the zero-forcing filters based on the outputs of the first phase algorithm and the channel state. In particular, the second phase algorithm determines the precoders $\{V_n\}$ and the decorrelators $\{U_m\}$ under the subspace restrictions determined by the first stage algorithm. Specifically, since the subspace restriction can be represented by the restricted precoder and decorrelator as in equations 17 and 23 (discussed infra), the precoder and decorrelator design is given by the following optimization objective which minimizes the total interference leakage power in the network:

$$\min_{U'_m, V'_n} \sum_{n=1, d_n^* > 0}^{K} \sum_{m=1, \neq n, d_m^* > 0}^{K} \frac{P_n}{d_n^*} \qquad \text{(Eq. 15)}$$

$$\text{trace}((U'_m S_m^{r*} H_{mn} S_n^{t*} V'_n)^H (U'_m S_m^{r*} H_{mn} S_n^{t*} V'_n))$$

Channel state monitoring component 602, is configured to monitor a MIMO channel to determine the state of the channel. In an aspect, the channel monitoring component is configured to identify the partial connectivity state of a MIMO interference channel such as partial connectivity due to path loss and/or scattering at the direct link and cross link.

Data stream assigning component 604, is configured to initialize the number of streams assigned to each Tx-Rx pair to be the minimum of the rank of the direct link and the number of streams claimed by this Tx-Rx pair, i.e. $d_n = \min(\text{rank}(H_{nn}), d_n^{max})$, $\forall n \in \{1, 2, \ldots, K\}$. In an aspect, determines the data stream assignment $\mathbb{D} = \{d_1, d_2, \ldots, d_K\}$, $d_n \in \{0, 1, \ldots, d_k^{max}\}$ based on the partially connected channel state as determined by the channel state monitoring component. For example, the data stream assigning component 604 can initialize data stream assignment such so that all transmission and receiver pairs are active. Subspace restriction component 606, is configured to calculate the common null spaces. The worst case complexity of this step is $O(K2^{K'-1})$, where $K' = \max_n(\max(|\mathbb{K}_n^t|, |\mathbb{K}_n^r|))$. In practice, due to path loss, K' usually does not scale with K. Hence, the $2^{K'-1}$ term is only a moderate constant which does not scale with the size of the network in most of the interesting scenarios. In particular, for every Tx-n, $n \in \{1, 2, \ldots, K\}$, the subpace restriction component 606 calculates the common subspaces of the null spaces of the cross links from this Tx within the effective subspace of the direct link. Mathematically, the subpace restriction component calculates the common subspaces of the null spaces of the cross links from this Tx within the effective subspace of the direct link represented by $\mathcal{N}(\{H_{mn}: m \in \mathbb{K}_{sub}\}) = (\cap_{m \in \mathbb{K}_{sub}} \mathcal{N}(H_{mn})) \cap (\mathcal{N}(H_{nn}))^{\perp}$, $\mathbb{K}_{sub} \subseteq \{1, 2, \ldots, K\}$ in the following manner.

First, the subspace restriction component 606 denotes $\mathbb{K}_n^t = \{m: m \in \{1, 2, \ldots, K\}, \mathcal{N}(H_{mn}) \neq \mathbb{C}^{N_t \times 1}$ (i.e. $H_{nn} \neq 0)\}$ and initializes $\mathcal{N}(\emptyset) = (\mathcal{N}(H_{nn}))^{\perp}$, $\mathcal{N}(\{H_{mn}\}) = \mathcal{N}(H_{mn}) \cap (\mathcal{N}(H_{nn}))^{\perp}$, $\forall m \in \mathbb{K}_n^t$, and subset cardinality parameter C=2. Then, for every $\mathbb{K}_{sub} \subseteq \mathbb{K}_n^t$ with $|\mathbb{K}_{sub}| = C$, if all the subsets of $\mathbb{K}_{sub}$ with cardinality (C-1) are not $\{0\}$, the subspace restriction component 606 calculates $\mathcal{N}(\{H_{mn}: m \in \mathbb{K}_{sub}\}) = \mathcal{N}(\{H_{mn}: m \in \mathbb{K}_{sub} \setminus \{m'\}\}) \cap \mathcal{N}(H_{m'n})$, where m' is an arbitrary element in $\mathbb{K}_{sub}$, and updates C=C+1. The subspace restriction component repeat this process until $\mathcal{N}(\{H_{mn}: m \in \mathbb{K}_{sub}\}) = \{0\}$, $\forall \mathbb{K}_{sub} \subseteq \mathbb{K}_n^t$ with $|\mathbb{K}_{sub}| = C$ or $C = |\mathbb{K}_n^t|$. Lastly, for every $\mathbb{K}_{sub} \subseteq \mathbb{K}_n^t$ with $\mathcal{N}(\{H_{mn}: m \in \mathbb{K}_{sub}\}) \neq \{0\}$, the subspace restriction component sets $\mathcal{N}(\{H_{mn}: m \in \mathbb{K}_{sub} \cup (\{1, 2, \ldots, K\} \setminus \mathbb{K}_n^t)\}) = \mathcal{N}(\{H_{mn}: m \in \mathbb{K}_{sub}\})$, and for every Rx-m, $m \in \{1, 2, \ldots, K\}$, calculates $\mathcal{N}^H(\{H_{mn}: n \in \mathbb{K}_{sub}\}) = (\cap_{n \in \mathbb{K}_{sub}} \mathcal{N}^H(H_{mn})) \cap (\mathcal{N}^H(H_{mm}))^{\perp}$, $\mathbb{K}_{sub} \subseteq \{1, 2, \ldots, K\}$ using a similar process.

In addition to determining the common null spaces, the subpace restriction component 606 is further configured to design subspace restrictions $\mathbb{S}_n^t$ and $\mathbb{S}_m^r$. In particular, for every Tx n, $n \in \{1, 2, \ldots, K\}$, the subspace restriction component 606 generates a series of potential subspace restrictions $\mathbb{S}_n^t(d)$, $d \in \{d_n, d_n+1, \ldots, N_t\}$ with $|\mathbb{S}_n^t(d)| = d$, based on the principle that a subspace which has higher null space weight is selected with higher priority. The weight of $\mathcal{N}(\{H_{mn}: m \in \mathbb{K}_{sub}\})$ is $\Sigma_{m \in \mathbb{K}_{sub}} d_m$. From the left hand side of equation 18 (presented infra), null space weight is the maximum number of interference alignment constraints that can be mitigated by selecting a one dimensional subspace in $\mathcal{N}(\{H_{mn}: m \in \mathbb{K}_{sub}\})$.

The subspace restriction component 606 chooses the subspace restriction $\mathbb{S}_n^t$ from the potential subspace restrictions: $\mathbb{S}_n^t = \mathbb{S}_n^t(d^*)$, where:

$$d^* = \arg\max_{d \in \{d_n, d_n+1, \ldots, N_t - |N(H_{nn})|\}} d_n(d - d_n) - \qquad \text{(Eq. 16)}$$

$$\sum_{m \neq n}^{\{1,2,\ldots,K\}} \min(d_m, |(\mathcal{N}^H(H_{mn}))^{\perp}|) \min(|\mathbb{S}_n^t(d) \cap \mathcal{N}(H_{mn})^{\perp}|, d_n).$$

For every Rx m, $m \in \{1, 2, \ldots, K\}$, the substrate restriction component 606 employs a similar process to generate $\mathbb{S}_m^r(d)$, $d \in \{d_m, d_m+1, \ldots, N_r\}$ and set $\mathbb{S}_m^r = \mathbb{S}_m^r(d^*)$, where:

$$d^* = \arg\max_{d \in \{d_m, d_m+1, \ldots, N_r - |\mathcal{N}^H(H_{mm})|\}} d_m(d - d_m) - \qquad \text{(Eq. 17)}$$

$$\sum_{n \neq m}^{\{1,2,\ldots,K\}} \min(d_m, |\mathbb{S}_m^r(d) \cap (\mathcal{N}^H(H_{mn}))^{\perp}|)$$

$$\min(|\mathbb{S}_n^t \cap (\mathcal{N}(H_{mn}))^{\perp}|, d_n).$$

Feasibility component 608 is configured to determine the feasibility of interference mitigation in light of stream assignments and subspace restriction determinations. In order to enhance the network DoF performance, subspace constraints $\{\mathbb{S}_n^{t*}, \mathbb{S}_m^{r*}\}$ and stream assignment $\mathbb{D}_n^*$ are designed to alleviate the interference alignment feasibility condition as much as possible. In particular the interference alignment feasibility condition is the major limitation of the DoF performance achieved by MIMO interference networks. A MIMO interference system is proper or feasible if the total number of constraints is no more than the number of free variables. Thus the feasibility component is configured to determine whether the number of constraints required to eliminate interference from the tranmsitter to the receiver is no more than the number of free variables.

Mathematically, the system is proper if, $$\Sigma_{(n,m) \in \mathbb{G}_I} \min(d_m, |\mathbb{S}_m^r \cap (\mathcal{N}^H(H_{mn}))^{\perp}|).$$

$$\min(|\mathbb{S}_n^t \cap \mathcal{N}(H_{mn})^{\perp}|, d_n)$$

$$\leq \Sigma_{n \in \mathbb{G}_T} d_n(S_n^t - d_n) + \Sigma_{m \in \mathbb{G}_R} d_m(S_m^r - d_m) \qquad \text{(Eq. 18)}$$

$\forall \mathbb{G}_R, \mathbb{G}_R \subseteq \{1, 2, \ldots, K\}$, $\mathbb{G} = (\mathbb{G}_R \times \mathbb{G}_T) \setminus \{(n, n), n \in \mathbb{G}_R \cap \mathbb{G}_T\}$, where "×" denotes Cartesian product. The left hand side of equation 18 represents the total number of interference alignment constraints of the links from a Tx in set $\mathbb{G}_n$ to a Rx in set $\mathbb{G}_m$, and the first and second terms on the right hand side of equation 18 represent the sum of the free variables in $V'_n$, $n \in \mathbb{G}_n$ and $U'_m$, $m \in \mathbb{G}_m$, respectively. Hence, equation 18 means that for any subset of Tx-Rx combination $\mathbb{G}_n \oplus \mathbb{G}_m \subseteq \{1, 2, \ldots, K\} \oplus \{1, 2, \ldots, K\}$, the number of constraints is no more than the number of free variables.

Equation 18 is proved as follows: The freedoms in $V'_n$ and $U'_m$ of equations 13 and 14 are given by:

$$\dim(\mathcal{G}(d_n, S_n^t)) = d_n(S_n^t - d_f), \text{ and } \dim(\mathcal{G}(d_m, S_m^r)) = d_m(S_m^r - d_m), \text{ respectively.} \quad \text{(Eq. 19)}$$

The Grassmannian $\mathcal{G}(x, y)$ denotes the set of all x-dimensional subspaces in $\mathbb{C}^y$.

Then consider the number of independent constraints in equation 14. Consider the singular value decomposition of $H_{mn} = U_{mn} \text{diag}(s_1, s_2, \ldots, s_N) V_{mn}^H$, where $U_{mn}$, $V_{mn}$ are $N_r \times N_r$ and $N_t \times N_t$ unitary matrices, respectively, $N = \min(N_t, N_r)$, $s_1:s_N$ are the singular values of $H_{mn}$ in descending order. Suppose $\text{rank}(H_{mn}) = r$, then we have: $H_{mn} = [U_{mn}^1, U_{mn}^2]$ $$\begin{bmatrix} \text{diag}(s_1, s_2, \ldots, s_r) & 0 \\ 0 & 0 \end{bmatrix} [V_{mn}^1, V_{mn}^2]^H,$$

where $U_{mn}^1$ and $V_{mn}^1$ are $N_r \times r$ and $N_t \times r$ matrices, respectively. Note that $$U'_m S_m^r H_{mn} S_n^t V'_n = 0 \Leftrightarrow U'_m S_m^r U_{mn}^1 \text{diag}(s_1, s_2, \ldots, s_r)(V_{mn}^1)^H S_n^t V'_n = 0 \quad \text{(Eq. 20)}$$

and $\text{span}(V_{mn}^1) = (\text{span}(V_{mn}^2))^\perp = (\mathcal{N}(H_{mn}))^\perp$
$\text{span}^H(U_{mn}^1) = (\text{span}^H(U_{mn}^2))^\perp = \mathcal{N}^H(H_{mn})^\perp$, where span (X), $\text{span}^H(X)$ denote the linear space spanned by the columns of X and the rows of $X^H$, respectively. Hence, the number of independent constraints in equation 14 is given by:

$$\text{rank}(U'_m S_m^r U_{mn}^1) \cdot \text{rank}(V_{mn}^1 S_n^t V'_n) = \min(d_m, |S_m^r \cap (\mathcal{N}^H(H_{mn}))^\perp|) \min(S_n^t \cap \mathcal{N}(H_{mn})^\perp, d_n) \quad \text{(Eq. 21)}$$

In order to determine whether the system is feasible or proper in light of the subspace restrictions determined by the subpace restriction component, the feasibilty component performs a low complexity feasibility algorithm. The feasibility component 608 denotes $v_2^t$, $v_m^r$, n, $m \in \{1, 2, \ldots, K\}$ as the number of the freedoms at Tx n and Rx m, respectively. The feasibility component sets $v_n^t = d_n(|S_n^t| - d_n)$, $v_m^r = d_m(|S_m^r| - d_m)$, and denotes $c_{mn}$, $n \neq m \in \{1, 2, \ldots, K\}$ as the number of constraints required to eliminate the interference from the Tx n to the Rx m. Set $c_{mn} = \min(d_m, |S_m^r \cap (\mathcal{N}^H(H_{mn}))^\perp|) \min(d_n, |S_n^t \cap \mathcal{N}(H_{mn})^\perp|)$ and $c_{mm} = 0$, $\forall n \neq m \in \{1, 2, \ldots, K\}$. The feasibility component then employs the following freedom/constraint assignment to check if the system is proper.

The feasiblitly component 608 initializes the constraint assignment by randomly generalizing a constraint assignment policy, i.e. $\{c_{mn}^t, c_{mn}^r\}$ such that: $c_{nm}^t, c_{mn}^r \in \mathbb{N} \cup \{0\}$, $c_{nm}^t + c_{mn}^r = c_{mn}$, $m, n \in \{1, 2, \ldots, K\}$ (Note that in the subscripts of $\{c_{mn}^r\}$, transmitter indexes come first), and calculates the variable minus assigned constraint pressure, i.e. $\{P_n^t, P_m^r\}$, where $$P_n^t = v_n^t - \Sigma_{m \in \{1, 2, \ldots, K\}} c_{nm}^t, \text{ and } P_m^r = v_m^r - \Sigma_{n \in \{1, 2, \ldots, K\}} c_{mn}^r. \quad \text{(Eq. 22)}$$

After initializing the contraint assignment, the feasibility component 608 updates the constraint assignment, where there exists "overloaded nodes", i.e. $P_n^t < 0$ or $P_m^r < 0$, $m, n \in \{1, 2, \ldots, K\}$, by performinge an update constraint assignment $\{c_{mn}^t, c_{mn}^r\}$ procedure discussed next.

FIGS. 7A-7C presents an examples of a pressure transfer tree in various stages employed by the feasibility component 608 to update the constraint assignment. FIG. 7A presents a tree generated after initialization and adding leaf nodes to the pressure transfer tree, FIG. 7B presents a tree after transferring pressure from root to leaf nodes, and FIG. 7C presents a tree after removing depleted links and neutralizing roots. During the updates the constraint assignment procedure, first, the feasibility component 608 selects an "overloaded node" with negative pressure, without losing generality, assume this node is Tx-n, $P_n^t < 0$. Then, the feasibility component 608 sets $P_n^t$ to be the root node of the pressure transfer tree 710 of FIG. 7A, which is variation of the tree data structure, with its nodes storing the pressures at the Txs and Rxs, its link strengths storing the maximum number of constraints that can be reallocated between the parent nodes and the child nodes.

Second, the feasiblity component 608 adds leaf nodes to the pressure transfer tree. In particular for every leaf nodes (i.e. nodes without child nodes) $P_n^x$ ($x \in \{t, r\}$, $n \in \{1, 2, \ldots, K\}$) with depths equal to the height of the tree, the feasibility component 608 adds $P_m^{\bar{x}}$ as a child node of $P_n^x$ with link strength $c_{nk}^{\bar{x}}$, where $\bar{x}$ is the element in $\{t, r\}$ other than x. For example, as seen in FIG. 7A, the leaf nodes at the bottom of tree 710 are leaf nodes without child nodes.

Third, as seen in FIG. 7B the feasibility component 608 transfers pressure from root to leaf nodes. In particular, ror every leaf node just added to the tree in the previous step with positive pressure, the feasiblity component transfers pressure from root to these leafs by updating the constraint assignment policy $\{c_{mn}^t, c_{mn}^r\}$. For instance, as illustrated in FIG. 7B, $$P_{n_1}^t \xrightarrow{c_{n_1 m_1}^t} P_{m_1}^r \xrightarrow{c_{m_1 n_2}^r} P_{n_2}^t$$

is a root-to-leaf branch of the tree (red lines). The feasility component transfers pressure from $P_{n_1}^t$ to $P_{n_2}^t$ by updating: $(c_{n_1 m_1}^t)' = c_{n_1 m_1}^t - \epsilon$, $(c_{m_1 n_1}^r)' = c_{m_1 n_1}^r + \epsilon$, $(c_{m_1 n_2}^r)' = c_{m_1 n_2}^r - \epsilon$, $(c_{n_2 m_1}^t)' = c_{n_2 m_1}^t + \epsilon$. Hence we have $(P_{n_1}^t)' = P_{n_1}^t - \epsilon$ and $(P_{n_2}^t)' = P_{n_2}^t + \epsilon$, where $\epsilon$ is the minimum of the absolute value of the root pressure, leaf pressure, and all the strengths of the links, i.e. $\epsilon = \min(-P_{n_1}^t, P_{n_2}^t, c_{n_1 m_1}^t, c_{m_1 n_2}^r)$, A' denotes the value of A after update.

Fourth, as seen in FIG. 7C the feasibility component 608 removes the 'depleted" links and "neutralized" roots. For example, if the strength of a link become 0 after transferring pressure from the root to the leaf nodes, the feasibility component separates the subtree rooted from the child node of this link from the original pressure transfer tree. If the root of a pressure transfer tree 730 (including the subtrees just separated from the original tree) is nonnegative after transferring pressure from the root to the leaf nodes, the feasibility component 608 removes the root and hence the subtrees rooted from each child node of the root become new trees 740. The feasibility component further repeats this process until all roots are negative. For each newly generated pressure transfer tree, the feasibility component repeats the second and third steps, including, adding leaf nodes to the pressure transfer tree and transferring pressure from root to leaf nodes.

Lastly, the feasibility component repeats steps one through four above until all trees become empty (hence the network is interference alignment feasible) or until no new leaf nodes can be added for any of the non-empty trees in the second step, (hence the network is IA infeasible).

Once the feasibility component 608 has performed the above feasibility checking assignment and determined that the network is proper, the first phase of the subject interference mitigation algorithm is complete. The stream assignments are $\mathbb{D}^* = \{d_1^*, d_2^*, \ldots, d_K^*\} = \mathbb{D}$, and the subspace restrictions are $\mathbb{S}_n^{t*} = \mathbb{S}_n^t$, $\mathbb{S}_m^{r*} = \mathbb{S}_m^r$, $\forall n, m \in \{1, 2, \ldots, K\}$. However, if after performing feasibility checking the feasibility component determines that the network is not proper, the stream assignment component 604 is directed to update stream assignments, and new subpaces restrictions are designed. The feasiblity component 608 the repeats the feasibility checking procedure under the new subspace restrictions and stream assignments. The process of updating stream assignments and subspace restrictions is repeated until the network is found feasible.

When updating stream assignments the stream assignment component 604 updates $\mathbb{D} = \{d_1, d_2, \ldots d_{\tilde{n}} - 1, \ldots, d_K\}$ and the subpace restriction component redesigns subspace restrictions, where ñ is given by:

$$\tilde{n} = \arg\max_{n \in \{1,2,\ldots,K\}} \left( \sum_{m=1}^{K} (c_{mn} + c_{nm} - c'_{mn} - c'_{nm}) - (v_n^t + v_n^r - v_n^{t\prime} - v_n^{r\prime}) \right) \quad \text{(Eq. 23)}$$

where $\{v_n^n, v_n^{rn}\}$ and $\{c'_{mn}, c'_{nm}\}$, $m \{1, 2, \ldots, K\}$ are the number of freedoms and interference alignment constraints under updated subspace constraints $\mathbb{S}_n^n$ and $\mathbb{S}_n^n$ given by equations 16 and 17 with $d'_n = d_n - 1$, respectively.

Recall that via equations 16 and 17 the subspace restriction component 606 chooses the dimension of subspace constraints d* to maximize the difference between the number of freedoms in precoder (or decorrelator) design minus the number of IA constraints endued by the Tx (or Rx). The right hand side of equation 23 represents the number of interference alignment constraints minus the number of freedoms in transceiver design saved by removing one stream from Tx-Rx pair n. The higher this number, the more "constraint demanding" this stream is. According to an embodiment, when updating stream assignments, the stream assignment component 604 removes the most constraint demanding stream from Tx-Rx pair n having the highest number of constraints.

As noted above, filter component 610 is associated with a second phase of the subject interference mitigation scheme. Filter component 610 is configured to employ the stream assignments determined by the stream assignment component 604 and the subspace restrictions determined by the subspace restriction component 606, and design the appropriate beamforming filters (precoders) and zero-forcing filters (decorrelators) for each Tx-Rx pair. In particular, the second phase algorithm determines the precoders $\{V_n\}$ and the decorrelators $\{U_m\}$ under the subspace restrictions determined by the first stage algorithm. Specifically, since the subspace restriction can be represented by the restricted precoder and decorrelator as in equations 17 and 23, the precoder and decorrelator design is given by the following optimization objective defined by equation 15 below, which minimizes the total interference leakage power in the network. Equation 15 is guaranteed to converge to a local optimum.

$$\min_{U'_m, V'_n} \sum_{n=1, d_n^* > 0}^{K} \sum_{m=1, \neq n d_m^* > 0}^{K} \frac{P_n}{d_n^*} \quad \text{(Eq. 15)}$$

$$\text{trace}\left( (U'_m S_m^{r*} H_{mn} S_n^{t*} V'_n)^H (U'_m S_m^{r*} H_{mn} S_n^{t*} V'_n) \right)$$

According to an embodiment, the filter component 610 first performs initialization given $\{\mathbb{D}^*, \mathbb{S}_n^{t*}, \mathbb{S}_m^{r*}\}$, as determined by the subspace restriction component 606. The filter component can denote $S_m^r$ and $S_n^t$ as the structure matrices for decorrelators and precoders: $U_m = U'_m S_m^r$, $V_n = S_n^t V'_n$. Set $S_n^{t*}$ and $S_m^{r*}$ to be the aggregation of the basis vectors in $\mathbb{S}_n^t$ and $\mathbb{S}_m^r$, respectively. In another aspect, to filter component can randomly generate $V'_m$.

The filter component 610 then determines the zero-forcing filters for each Rx which minimize interference leakage at the receiver side based on the stream assignments, subspace restrictions, and channel state. In particular, at each Rx m, such that $d_m^{**} > 0$, the filter component 610 updates $U'_m$:

$$u'_m(d) = \left( v_d \left[ \sum_{n=1, \neq m d_n^* > 0}^{K} \frac{P_n}{d_n^*} (S_m^{r*} H_{mn} S_n^{t*} V'_n)(S_m^{r*} H_{mn} S_n^{t*} V'_n)^H \right] \right)^H,$$

where $u'_m(d)$ is the d-th row of $U'_m$, $v_d[A]$ is the eigenvector corresponding to the d-th smallest eigenvalue of A, $d \in \{1, 2, \ldots, d_m^*\}$.

The filter component 610 is further configured to determine the beamforming filters for each Rx which minimize interference leakage at the receiver side based on the stream assignments, subspace restrictions, and channel state. In particular, at each Tx n such that $d_n^* > 0$, the filter component updates $V'_n$:

$$v'_n(d) = v_d \left[ \sum_{m=1, \neq n d_m^* > 0}^{K} \frac{P_n}{d_n^*} (U'_m S_m^{r*} H_{mn} S_n^{t*})^H (U'_m S_m^{r*} H_{mn} S_n^{t*}) \right],$$

where $v'_m(d)$ is the d-th column of $V'_m$, $d \in \{1, 2, \ldots, d_n^*\}$.

The filter component 610 then repeats the above procedures for minimizing interference leakage at the receiver side and the transmitter side until $V'_n$ and $U'_m$ converges. As a result, the filter component sets $V_n^* = S_n^t V'_n$ and $U_m^* = U'_m S_m^r$, $\forall n, m \in \{1, 2, \ldots, K\}$.

As a result the filter component determines the beamforming filters for each Tx and zero-forcing filters for each Rx pair based on subpace restrictions and stream assignments. It should be appreciated that the subpace restrictions and stream assignments further account for the partial connectivity of the channel state as discussed supra.

The subject interference alignment scheme as performed by the interference mitigation component 600 is backward compatibility with existing interference alignment schemes when MIMO system is fully connected. When the system is fully connected (i.e. $\mathcal{N}(H_{mn}) = \mathcal{N}^H(H_{mn}) = \{0\}$, $\forall n, m \in \{1, 2, \ldots, K\}$), it is easy to check in the first phase algorithm, $\mathbb{S}_n^{t*} = \mathbb{S}^{N_t \times 1}$ and $\mathbb{C}_m^{r*} = \mathbb{C}^{1 \times N_r}$; this means that in fully connected quasi-static MIMO interference networks, the proposed scheme reduces to the conventional interference alignment schemes proposed. When $N_t > N_r$, the algorithm shall first utilize the null spaces on the Tx side and design $\mathbb{S}_n^{t*}$ to null off part of the interference. However, given a general partial connectivity topology $\{\mathcal{N}(H_{mn}), \mathcal{N}^H(H_{mn})\}$, the subject interference mitigation scheme generalizes the conventional interference alignment by dynamically combining interference alignment and interference nulling approaches.

Figure 8:
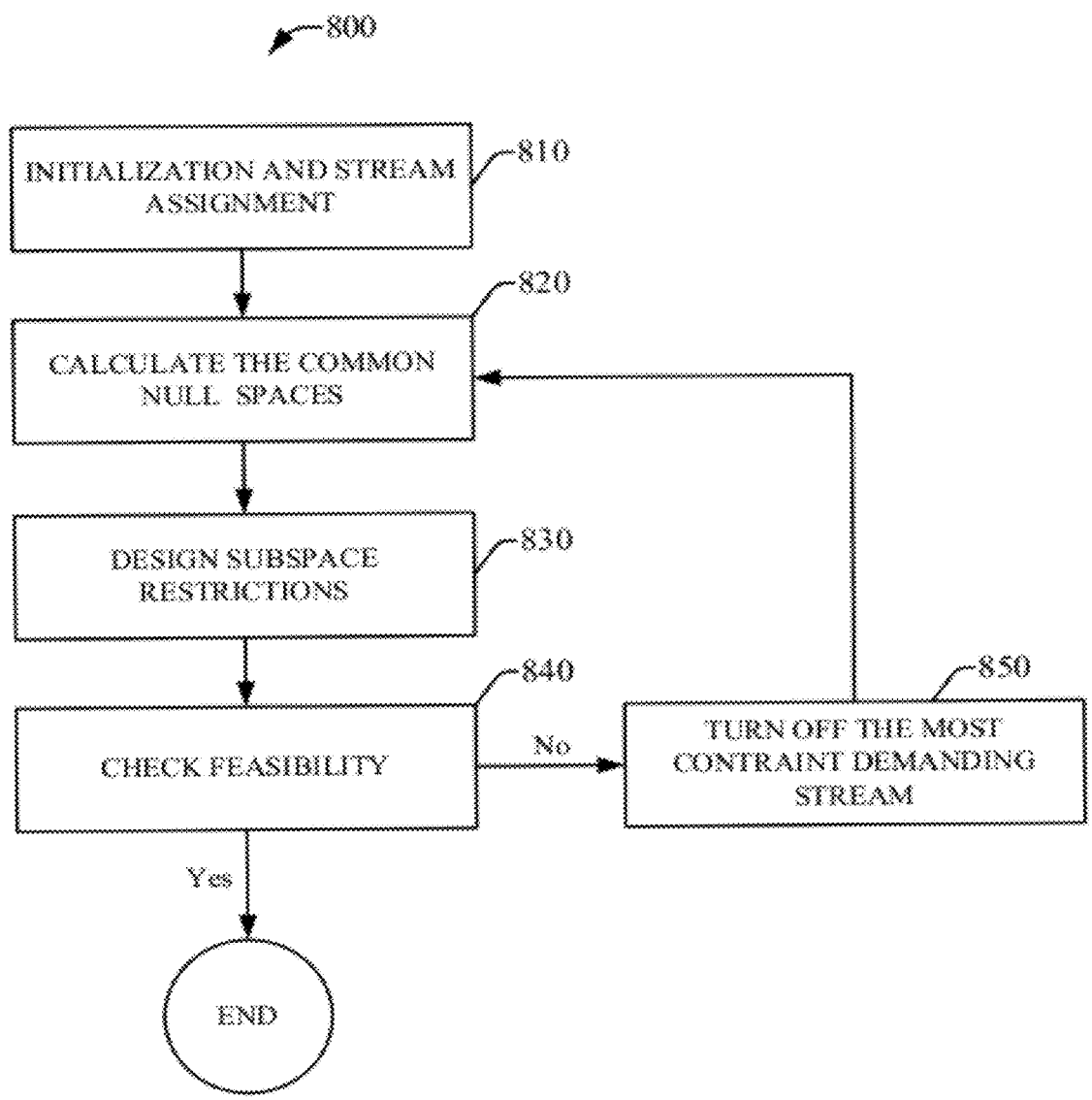
FIG. 8 illustrates a flow diagram of a first phase algorithm in accordance with an embodiment.

FIG. 8 presents a flowchart of an example algorithm 800 for determining stream assignments and subspace constraints for precoders and decorrelators based on the partial connectivity state in accordance with the first stage of the subject interference mitigation scheme. At 810, the number of streams assigned to each Tx-Rx pair is initialized to be the minimum of the rank of the direct link and the number of streams claimed by each Tx-Rx pair is determined. At 820, for every Tx-Rx pair, the common subspaces of the null spaces of the cross links from the Tx's within the effective subspace of the direct links, are calculated. At 830, a series of subspace restrictions are designed and the subspaces which can mitigate the highest number of interference alignment constraints in a one dimensional subspace in $\mathcal{N}(\{H_{mn}:m \in \mathbb{K}_{sub}\})$ are selected. At 840, the feasibility of interference alignment under the determined stream assignments and subspace restrictions is checked. If the system is feasible, then the process 800 ends. If the system is not feasible, then the method 800 proceeds to step 850 and turns off the most constraint demanding stream and repeats steps 820-840 until the system is feasible.

Figure 9:
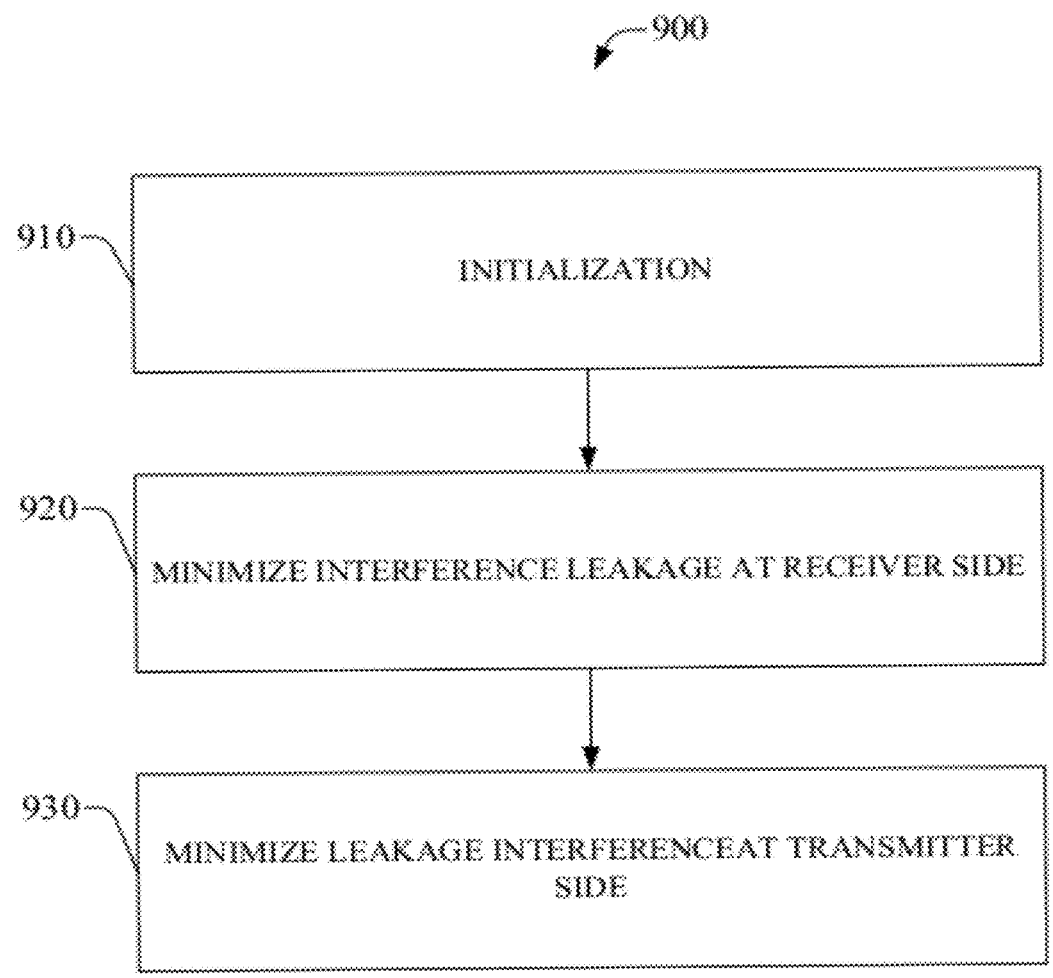
FIG. 9 illustrates a flow diagram of a second phase algorithm in accordance with an embodiment.

FIG. 9 presents a flowchart of an example algorithm 900 for determining the precoders and decorrelators based on the stream assignments and subspace constraints as well as the channel state information (determined in the first stage) in accordance the second stage of the subject interference mitigation scheme. At step 910, initialization is performed wherein $S_m^r$ and $S_n^t$ are denoted as the structure matrices for decorrelators and precoders: $U_m = U'_m S_m^r$, $V_n = S_n^t V'_n$. In addition $S_n^{t*}$ and $S_m^{r*}$ are set to be the aggregation of the basis vectors in $\mathcal{S}_n^t$ and $\mathcal{S}_m^r$, respectively. Then $V'_n$ is randomly generated. At 920, the decorrelators are choosen which minimize interference leakage at the receiver side. At 930, the precoders are choosen which minimize interference at the transmitter side.

To better illustrate the subject interference mitigation scheme, processes 800 and 900, will now be described with reference to a five pair 2×2 partially connected interference network. In a partially connected MIMO interference network, by properly restricting precoders $V_m$ and decorrelators $U_n$ to a lower rank subspace, we can eliminate "many" independent constraints at a cost of only a few "free variables" and hence extend the interference alignment feasibility region.

Looking back to FIG. 8, with reference to a five pair 2×2 partically connected MIMO interference network, at 810 when initialization is performed the five direct links have sufficient rank (rank($H_{nm}$)=2>1, n∈{1, 2 . . . , 5}). During initialization, $\mathbb{D} = \{1, 1, 1, 1, 1\}$ to see if the network is feasible with all Tx-Rx pairs active.

Figures 10A, 10B, 10C:
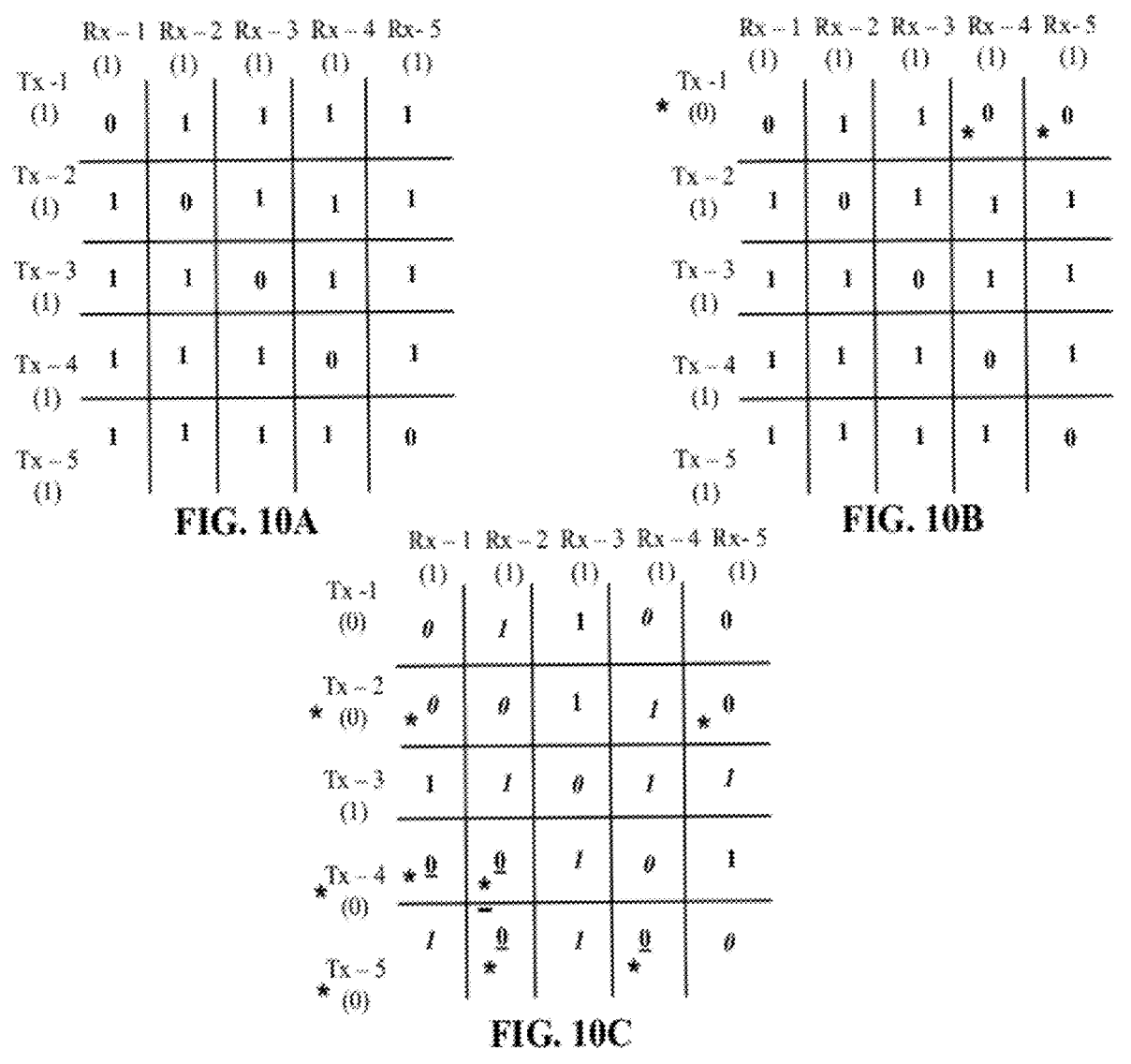

FIG. 10A-10C illustrate the number of freedoms in the precoder and decorrelator design verse the number of remaining constraints in the five pair 2×2 interference network before and after subspace design. The numbers along the columns in parenthesis under each Tx-n represent the number of the freedoms remaining in the corresponding precoders, and the numbers along the rows in parenthesis under each Rx-n represent the number of freedoms remaining in the corresponding decoders. The numbers in bold within the graphs represent the number of interference alignment constraints. FIG. 10A illustrates the number of freedoms in the transceiver design and the number of interference alignment constraints after initialization.

Figure 11:
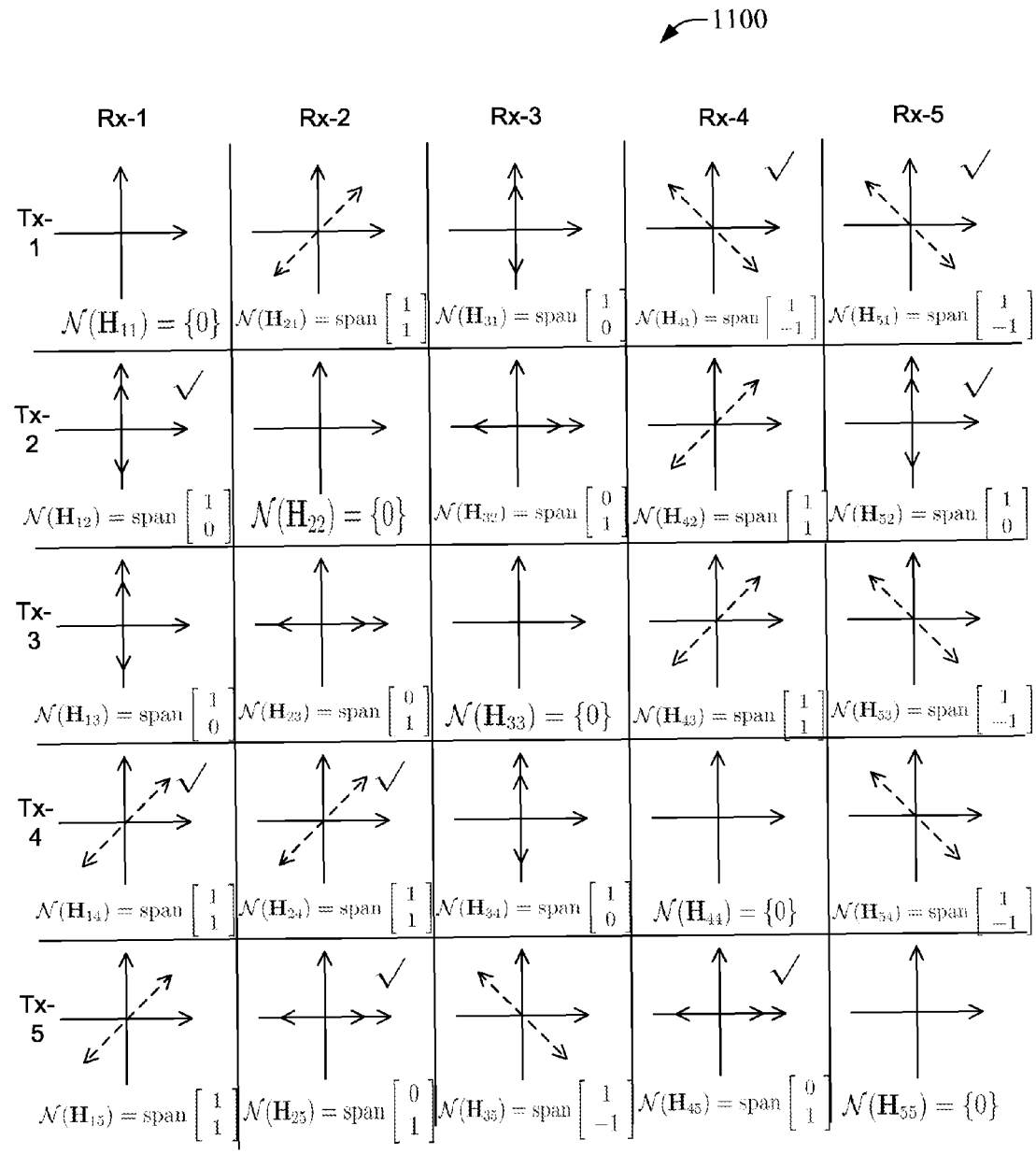
FIG. 11 presents the partial connectivity state at the transmitter side of the 2×2 five pair interference channel.

FIG. 11 presents the partial connectivity state at the transmitter side of the 2×2 five pair interference channel. Turning back to FIG. 8, at step 820, the number of common subspaces in partial connectivity are determined. As indicated by the "√" signs in FIG. 11, from Tx 1 to Rx 4 and 5, there is a one dimensional common subspace in partial connectivity state:

$$\mathcal{N}(H_{41}) = \mathcal{N}(H_{51}) = \text{span}\begin{bmatrix} 1 \\ -1 \end{bmatrix}.$$

Similarly, from Tx 2 to Rx 1 and 5, from Tx 4 to Rx 1 and 2, from Tx 5 to Rx 2 and 4, there are common null spaces as ss indicated by the "√" signs.

Again, with reference to FIG. 8, at 830 the subpaces are selected to reduce the number of interference alignment constraints. Set $$v_1 = \begin{bmatrix} \frac{\sqrt{2}}{2} \\ -\frac{\sqrt{2}}{2} \end{bmatrix},$$

we have $H_{m1}v_1=0$, $m \in \{4, 5\}$. Hence, as indicated by the highlight parts in FIG. 10B, we reduce 2 constraints at a cost of 1 freedom. Similarly, as indicated by the parts noted by an asterisk symbol (*) in FIG. 10C, since Tx 2,4,5 each has two cross links with overlapping null spaces, we can reduce 2 constraints at a cost of 1 freedom by setting the precoder vectors to be the basis vectors of the corresponding null spaces.

FIGS. 12A-12D present charts representing the number of freedoms minus the variable pressure at each node (i.e. $P_n^t$, $P_m^r$, n, m∈{1, 2, 3, 4, 5}) before and after adjusting constraint assignments. The overloaded nodes and the nodes are marked by an asterisk symbol and the nodes with extra freedoms are marked by the "√" signs. The reassignment processes are highlighted by the dashed boxes.

Figures 12A, 12B, 12C, 12D:
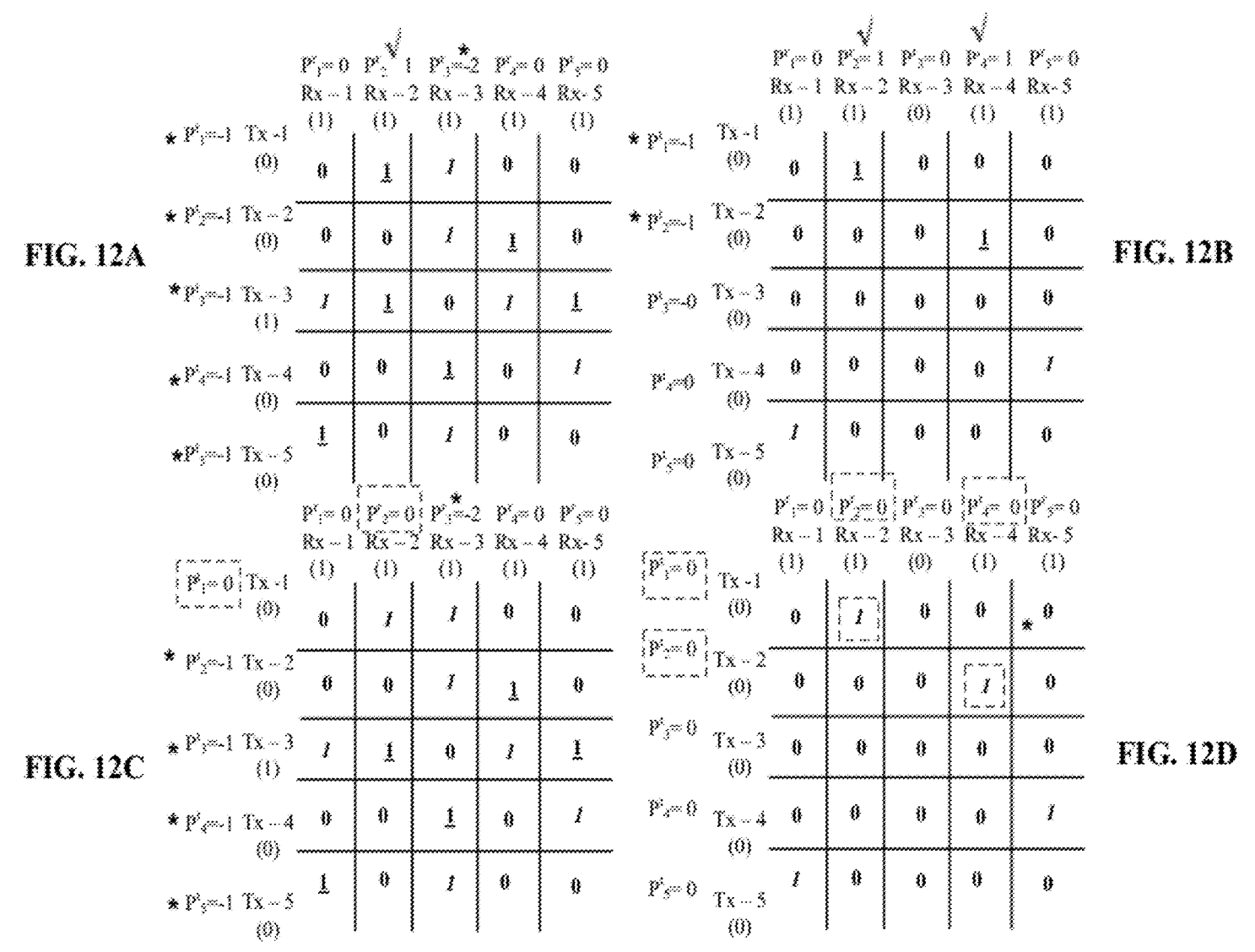

In FIG. 8 at 840, the feasibility conditions are checked. The number of the remaining freedoms and constraints after step 830 is illustrated in FIG. 10C. The constraints are randomly assigned to the corresponding Txs or Rxs (as indicated by the bolded numbers, the underlined number indicate the number is assigned to the Tx while the italicized numbers are assigned to the Rx). As a result, as seen in FIG. 12A some nodes are 'overloaded" in the sense that the number of freedoms at this node minus the number of constraints assigned to this node is negative while some nodes still have extra freedoms. Hence, as illustrated in FIG. 12B, the constraints are reassigned to have less overloaded nodes. However, as seen FIG. 12, there are still some overloaded nodes while no nodes have extra freedoms, hence the network is not feasible.

Accordingly, at 850 of FIG. 8, the most contraing demanding stream is turned off. As illustrated in FIG. 12B, if we remove Tx-Rx pair 1 from the active set {1, 2, . . . , K}, we reduce 1 freedom (the freedom in $v_1$) and 4 constraints (link Tx 1 to Rx 2,3 and Tx 3,5 to Rx 1). Hence, the freedom-constraint gain by removing Tx-Rx pair 1 is (−1)−(−4)=3. Similarly, the freedom-constraint gains by removing Tx-Rx pair 2, 4, 5 are also 3, whereas the gain by removing Tx-Rx pair 3 is (−2)−(−8)=6. Since 6>3, we remove the stream of Tx-Rx pair 3, i.e. let $\mathbb{D} = \{1, 1, 0, 1, 1\}$ and return to step 830 if feasibility is not achieved.

After removing the stream of Tx-Rx pair 3, steps 830 and 840 are repeated until feasibility is achieved. The number of the remaining freedoms and constraints after subspace selection is illustrated in FIG. 12C. As revealed by FIG. 12D the interference alignment constraints can be assigned properly so that no node is overloaded and the network is feasible. Once feasibility is achieved with defined subspace constraints, process 900 of FIG. 9 is performed. In particular, based on the results of process 800 a minimum interference leakage iteration is performed to determine the precoders and decorrelators.

Figure 13:
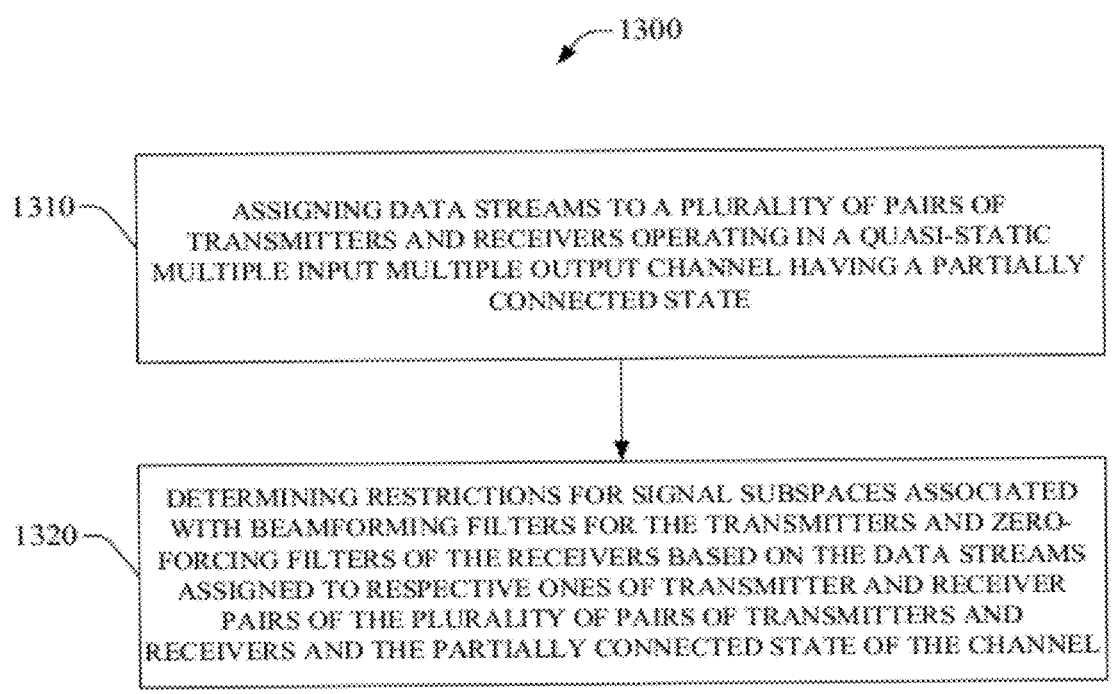
FIG. 13 presents a flow diagram of a process 1300 involved with the first phase of the subject interference mitigation scheme in accordance with an embodiment.
Figure 14:
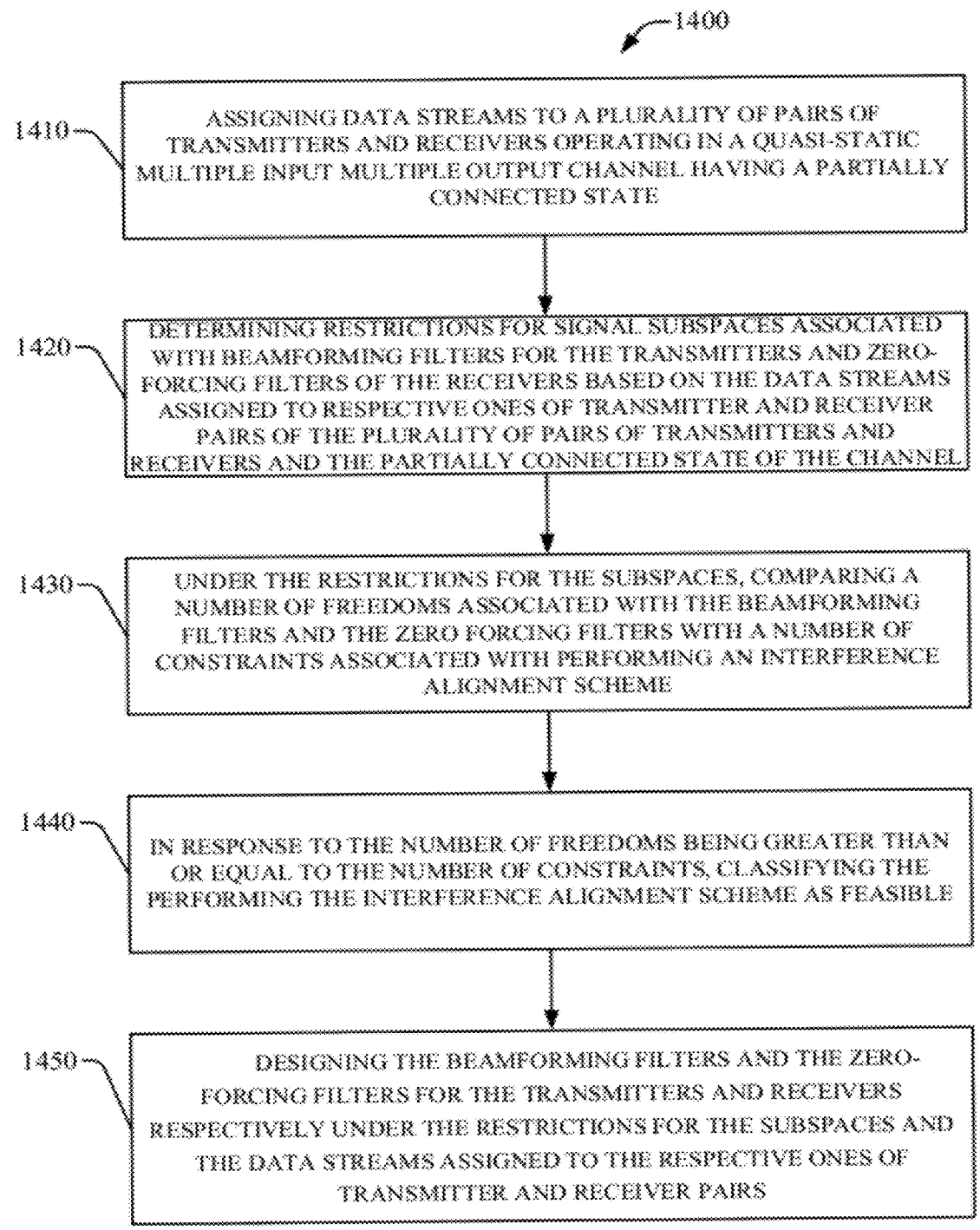
FIG. 14 presents a flow diagram of a process involved with the first and secon phase of the subject interference mitigation scheme in accordance with an embodiment.

In view of the example system(s) and apparatuses described above, example method(s) that can be implemented in accordance with the disclosed subject matter can be better appreciated with reference to flowcharts of FIGS. 13-15. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

FIG. 13 presents a flow diagram of a process 1300 involved with the first phase of the subject interference mitigation scheme. At 1310, data streams are assigned to a plurality of pairs of transmitters and receivers operating in a quasi-static multiple input multiple output channel having a partially connected state. At 1320 restrictions are determined for signal subspaces associated with beamforming filters for the transmitters and zero-forcing filters of the receivers based on the data streams assigned to respective ones of transmitter and receiver pairs and the partially connected state of the channel. In an aspect, the restrictions can be designed to reduce a number of constraints associated with performing an interference alignment scheme. In another aspect, in order to determine the restrictions, a plurality of potential restrictions can be formed and the restrictions can be selected from the plurality of restrictions that decrease a number of constraints associated with performing an interference alignment scheme. In another aspect, the restrictions can be deigned based on common null spaces of the subspaces. Still in yet another aspect, the restrictions can be designed to maximize a number of freedoms associated with the beamforming filters and/or the zero-forcing filters minus a number of constraints associated with performing an interference alignment scheme.

FIG. 14 presents a flow diagram of a process 1400 involved with the first and secon phase of the subject interference mitigation scheme. At 1410, data streams are assigned to a plurality of pairs of transmitters and receivers operating in a quasi-static multiple input multiple output channel having a partially connected state. At 1420 restrictions are determined for signal subspaces associated with beamforming filters for the transmitters and zero-forcing filters of the receivers based on the data streams assigned to respective ones of transmitter and receiver pairs and the partially connected state of the channel. At 1430 under the restrictions for the subspaces, a number of freedoms associated with the beamforming filters and the zero forcing filters are compared with a number of constraints associated with performing an interference alignment scheme. Then at 1440, if the number of freedoms is greater than or equal to the number of constraints, the performing the interference alignment scheme is classified as feasible. Lastly, at 1450, the beamforming filters and the zero-forcing filters for the transmitters and receivers respectively are designed under the restrictions for the subspaces and the data streams assigned to the respective ones of transmitter and receiver pairs.

Figure 15A:
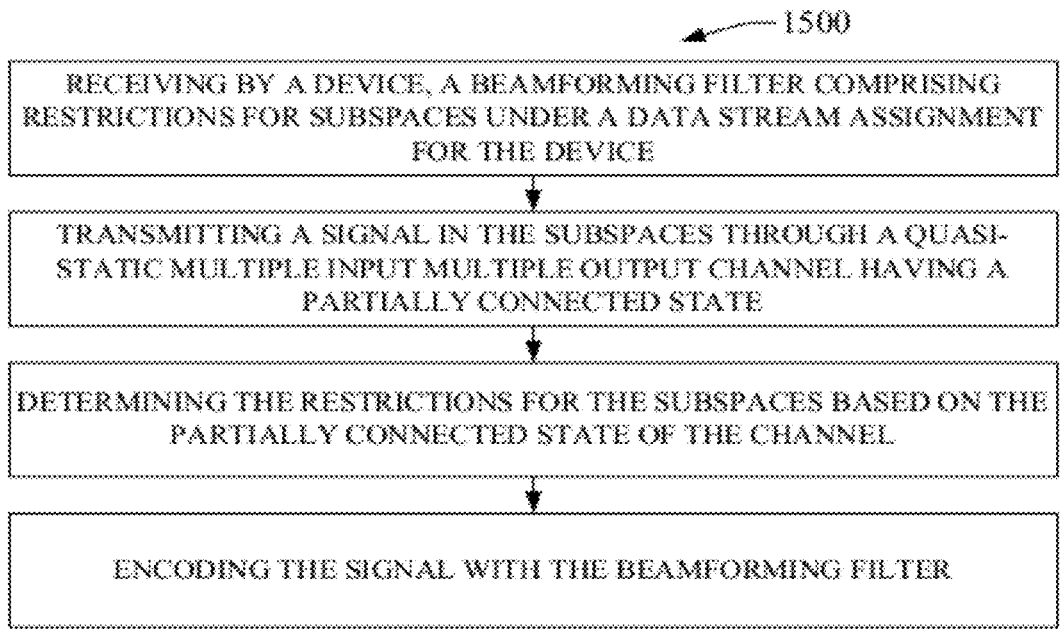
FIG. 15A presents a flow diagram of a process at a transmitting node in accordance with the subject interference mitigation scheme
Figure 15B:
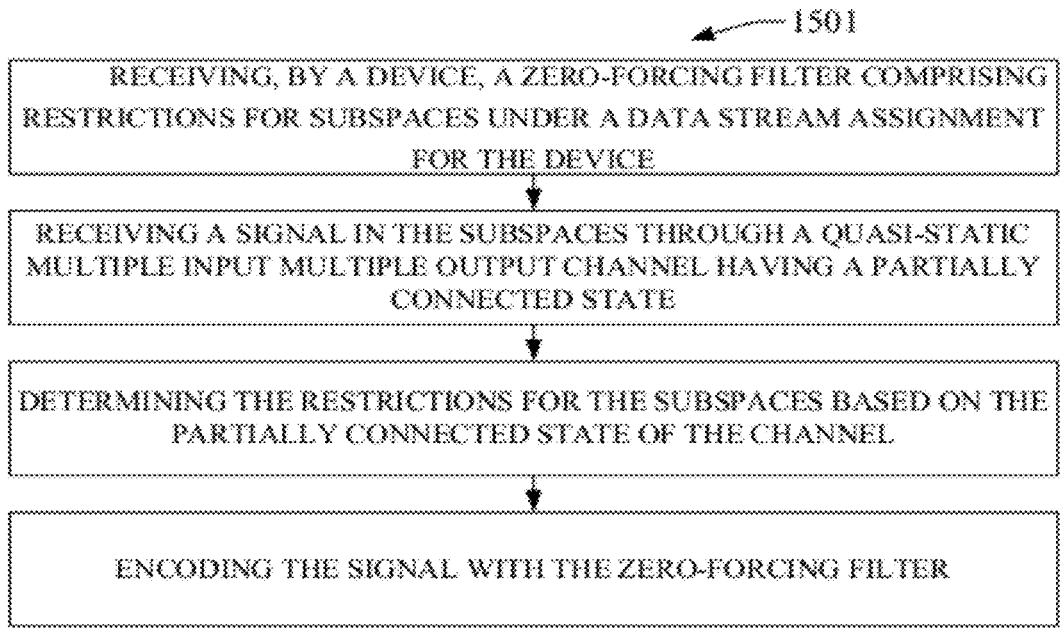
FIG. 15B presents a flow diagram of a process at a receiving node in accordance with the subject interference mitigation scheme

FIG. 15A presents a flow diagram of a process 1500 at a transmitting node in accordance with the subject interference mitigation scheme. At 1510 a beamforming filter is received by a receiving device comprising restrictions for subspaces under a data stream assignment for the device. At 1520, a signal is transmitted in the subspaces through a quasi-static multiple input multiple output channel having a partially connected state. At 1530 the restrictions for the subspaces are determined based on the partially connected state of the channel. At 1540, the signal is encoded with the beamforming filter FIG. 15B presents a flow diagram of a process 1501 at a receiving node in accordance with the subject interference mitigation scheme. At 1550 a zero-forcing filter is received by a device comprising restrictions for subspaces under a data stream assignment for the device. At 1560, a signal is received in the subspaces through a quasi-static multiple input multiple output channel having a partially connected state. At 1570, the restrictions for the subspaces are determined based on the partially connected state of the channel. At 1580, encoding the signal with the zero-forcing filter.

The two phased interference mitigation scheme described herein has proved to be an effective tool for increasing throughput of MIMO systems. As presented below, performance of the proposed scheme was examined in a symmetrical partially connected MIMO interference network. Analysis showed the proposed algorithm can significantly increase system DoF in symmetric partially connected MIMO interference networks. Performance of the proposed scheme was also compared with various baselines via simulations and demonstrated that the proposed algorithms could achieve significant gains in system performance of randomly connected interference networks. Although the subject interference mitigation scheme applies to general typologies, due to the complexity of analysis stemming from the numerous partial connectivity parameters, the experimentation below was restricted to a symmetrical K-pair partially connected MIMO interference network in which the partial connectivity was induced by path loss and local scattering.

The symmetrical partially connected MIMO interference channels employed in analysis are embodied in the following model. Provided was a K-pair partially connected MIMO interference network wherein each Tx has $N_t$ antennas and each Rx has $N_r$ antennas. Each Tx-Rx claims $d_n^{max} = d_f$ data streams, $\forall n \in \{1, 2, \ldots, K\}$. The partial connectivity states were expressed in terms of three key parameters L, $E_1$ and $E_2$, which characterize the connection density, the rank of the direct links and the rank of the cross links, respectively.

Partial connectivity due to path loss can mathematically be expressed as follows. if $L < |n-m| < K-L$ assume $H_{mn} = 0$.

Partial connectivity due to local scattering at the direct link can mathematically be expressed as follows. If $=m$, assume due to local scattering, $h_{mn}^{ang}(p) = 0$ if: $p \notin \mathbb{E}_1$, otherwise $h_{mn}^{ang}(p): \mathcal{CN}^{1 \times N_t}$, where $h_{mn}^{ang}(p)$ is the p-th column of the angular representation of the channel state $H_{mn}^{ang}$ (defined in (2)), $p \in \{0, 1, \ldots, N_t-1\}$, $\mathbb{E}_1 \subseteq \{0, 1, \ldots, N_t-1\}$ are the indices of the "good" angles. Denote $|\mathbb{E}_1|=E_1$.

Partial connectivity due to local scattering at the cross link can mathematically be express as follows. If $0<|n-m|\leq L$ or $|n-m|\geq K-L$ and $n \neq m$, assume due to local scattering: $h_m^{ang}(p)=0$ if: $p \notin \mathbb{E}_2^{\Delta n}$, otherwise $h_{mn}^{ang}(p): \mathcal{CN}^{1 \times N_t}$, where $\Delta n = n-m \in \{-L, -L+1, \ldots L\}$, $\mathbb{E}_2^{\Delta n}$ are random subsets of $\{0, 1, \ldots, N_t-1\}$ which satisfy $|\mathbb{E}_2^{\Delta n}|=E_2$, $\forall \Delta n$. $0 \leq E_2 \leq N_t$.

In view of the above, the partial connectivity of the channel state can be mathematically expressed as follows:

$$N(H_{mn}) = \begin{cases} (\text{span}(e_{N_t}(q)))^\perp, q \in \mathbb{E}_1 & \text{if: } m=n \\ (\text{span}(e_{N_t}(q)))^\perp, q \in \mathbb{E}_2(n-m) & \text{if: } 0 < |n-m| \leq L \text{ or} \\ & |n-m| \geq K-L \\ \mathbb{C}^{N_t \times 1} & \text{otherwise} \end{cases}$$ (Eq. 24)

$$N^H(H_{mn}) = \begin{cases} (\text{span}((A_R h_{mn}^{ang}(q))^H))^\perp, q \in \mathbb{E}_1 & \text{if: } m=n \\ (\text{span}((A_R h_{mn}^{ang}(q))^H))^\perp, q \in \mathbb{E}_2(n-m) & \text{if: } 0 < |n-m| \leq L \text{ or} \\ & |n-m| \geq K-L \\ \mathbb{C}^{1 \times N_r} & \text{otherwise} \end{cases}$$ (Eq. 25)

where $H_{mn}^{ang}$, $A_R$ and $e_{N_t}(q)$ are defined in (Eq. 6), (Eq. 8) and (Eq. 9), respectively. $h_{mn}^{ang}(s) \in \mathbb{C}^{N_t \times 1}$ is the s-th column of $H_{mn}^{ang}$. $\mathbb{E}_1$ and $\mathbb{E}_2(n-m)$ are subsets of $\{1, 2, \ldots, N_t\}$, with $|\mathbb{E}_1|=E_1$, $|\mathbb{E}_2(n-m)|=E_2$, $\forall n, m$.

The proposed algorithm can achieve $\mathbb{D}^* = \{d_f, d_f, \ldots, d_f\}$ if $$d_f \leq \max\left( \frac{E_1 + \min(E_1, N_r)}{\min(K-1, 2L)+2}, \frac{\min(E_1, N_r)}{\min(K-1, 2L)\frac{E_2}{N_t}+1} \right).$$ (Eq. 26)

Proof of equation 26 is a follows. Due to the symmetry property of the system, when $\mathbb{D}^* = \{d_f, d_f, \ldots, d_f\}$: $\mathbb{S}_n^{t*} = \mathbb{S}_m^{t*}$, $\mathbb{S}_n^{r*} = \mathbb{S}_m^{r*}$, $\forall n, m \in \{1, 2, \ldots, K\}$ and hence the system satisfies equation 18 if and only if:

$$\sum_{n=1}^{K} \sum_{m \neq n}^{K} \min(|\mathbb{S}_m^{r*} \cap (N^H(H_{mn}))^\perp|, d_f) \min(|\mathbb{S}_n^{t*} \cap N(H_{mn})^\perp|, d_f) \leq$$ (Eq. 27)

$$\sum_{n=1}^{K} d_f(S_n^{t*} - d_f) + \sum_{m=1}^{K} d_f(S_m^{r*} - d_f) \Leftrightarrow$$

$$\sum_{m=2}^{K} \min(S^{r*} - |\mathbb{S}^{r*} \cap N^H(H_{m1})|, d_f)$$

$$\min(S^{t*} - |\mathbb{S}^{t*} - \bigcap N(H_{m1})|, d_f) \leq d_f(S^{t*} + S^{r*} - 2d_f)$$

where $\mathbb{S}^{t*} = \mathbb{S}_n^{t*}$, $\mathbb{S}^{r*} = \mathbb{S}_n^{r*}$, $\forall n \in \{1, 2, \ldots, K\}$, $$S^{t*} = |\mathbb{S}^{t*}|, S^{r*} = |\mathbb{S}^{r*}|.$$

In general, due to the randomness in $\mathcal{N}^H(H_{m1})$ and $\mathcal{N}(H_{m1})$ it is hard to obtain optimal $S^{t*}$ and $S^{r*}$. To obtain a fundamental insight, we shall consider two extreme policies:

$S^{t*}=d_f$, $S_r^*=\min(N_r, E_1)$ (smallest subspace dimension on the Tx side and largest subspace dimension on the Rx side) and $S^{t*}=E_1$, $S^{r*}=\min(N_r, E_1)$ (largest subspace dimension on both the Tx and the Rx side). On the receiver side, when $S^{r*}=\min(N_r, E_1)$, $\mathbb{S}^{r*}=(\mathcal{N}^H(H_{11}))^\perp$. On the transmitter side, from equation 24, the $\mathbb{S}_n^{t}(d)$ obtained in the first phase of the subject interference mitigation scheme, (i.e the determining subspace constraints), shall have the following form:

$$\mathbb{S}_n^t(d) = \text{span}\left(e_{N_t}\left(\frac{p_1}{N_t}\right), e_{N_t}\left(\frac{p_2}{N_t}\right), \ldots e_{N_t}\left(\frac{p_d}{N_t}\right)\right),$$

where $p_d$ is the p-th index in $\mathbb{P} = \{0, 1, \ldots, N_t-1\}$, in which the elements are ordered w.r.t to the metric $$\sum_{m=2}^{K} 1\left(e_{N_t}\left(\frac{p}{N_t}\right) \in N(H_{1m})\right)$$

in descending order. When $S^{t*}=d_f$, (32) become:

$$\sum_{m=2}^{K} d_f - |\mathbb{S}^{r*} \cap N^H(H_{m1})| \leq \min(N_r, E_1) - d_f \Leftrightarrow$$ (Eq. 28)

$$d_f(K-1) - \sum_{d=1}^{d_f} \sum_{m=2}^{K} 1\left(e_{N_t}\left(\frac{p_d}{N_t}\right) \in N(H_{1m})\right) \leq \min(N_r, E_1) -$$

$$d_f \Longleftarrow d_f(K-1) - \frac{d_f}{N_t} \sum_{d=1}^{N_t} \sum_{m=2}^{K} 1\left(e_{N_t}\left(\frac{p_d}{N_t}\right) \in N(H_{1m})\right) \leq$$

$$\min(N_r, E_1) - d_f \Longleftarrow d_f\left(\min(K-1, 2L)\frac{E_2}{N_t}\right) \leq$$

$$\min(E_1, N_r) - d_f$$

When $d^*=E_1$, (32) is simplified to:

$$\min(K-1, 2L) \cdot \min(E_2, d_f) \leq E_1 + \min(E_1, N_r) - 2d_f \Rightarrow \min$$
$$(K-1, 2L) \cdot d_f \leq E_1 + \min(E_1, N_r) - 2d_f$$ (Eq. 29)

From equations 28 and 29, equation is obtained equation 26 is obtained. Note that the total DoF of the system is given by $Kd_f$, using (Eq. 26), the system can achieve a total DoF up to:

$$K\left[\max\left(\frac{E_1 + \min(E_1, N_r)}{\min(K-1, 2L)+2}, \frac{\min(E_1, N_r)}{\min(K-1, 2L)\frac{E_2}{N_t}+1}\right)\right]$$ (Eq. 30)

where the first term and second term in the "max" operation are contributed by restricting the precoders and decorrelators in the subspaces $\mathbb{S}_n^{t*}$ and $\mathbb{S}_n^{r*}$ obtained in the stage I algorithm. In the following, various insights regarding how the partial connectivity affects the gain of the system are elaborated.

With respect to the gain due to partial connection, in a K-pair fully connected quasi-static MIMO interference channel, the system sum DoF is upper bounded by $$\frac{K(N_t + N_r)}{K+1}.$$

The partial connectivity improves this bound in two aspects: 1) Gain due to path loss: As path loss limits the maximum number of Rxs that each Tx may interfere, the total DoF of the system can grow on O(K); 2) Gain due to spatial correlation: When the spatial correlation in the cross link is strong (i.e. small $E_2$), $$a\frac{N_t}{E_2}$$

factor gain can De runner observed.

With respect to connection density versus system performance, for large K, the DoF of the system, equation 30 scales with:

$$O\left(\frac{1}{L}\right),$$

which shows that the network density is always a first order constraint on the system DoF.

With respect to rank of the cross links versus system performance, the system sum DoF of equation 30 is a (non-strictly) decreasing function of $E_2$, which means system sum DoF grows when the rank of the cross links decrease. When $E_2=0$, the achievable DoF in equation 30 is reduced to: K min($E_1$, $N_r$)=K rank($H_{nn}$), which means that all Tx-Rx pairs are using all the dimensions of the direct link for transmission.

With respect to rank of the direct links versus system performance, the system sum DoF equation 30 is a (non-strictly) increasing function of $E_1$, which means that the system sum DoF increases when the rank of the direct links increase. High rank direct links help to increase system performance from two aspects: 1) They increase the DoF upper bound that Tx-Rx pairs may achieve. 2) They increase the maximum number of free variables in the precoders and the decorrelators.

With respect to backward compatibility with previous interference alignment schemes, when the network is fully connected, i.e.

$$E_1 = E_2 = N_t \text{ and } L \geq \left[\frac{K}{2}\right],$$

the inequality in equation 26 is reduced to:

$$d_f \leq \frac{N_t + N_r}{K+1}.$$

With preface above, performance of the proposed interference mitigation scheme was analyzed via simulation. To better illustrate how physical parameters such as the path loss and the scattering environment affect system performance, we considered the following simulation setup based on a randomized MIMO interference channel.

Figure 16:
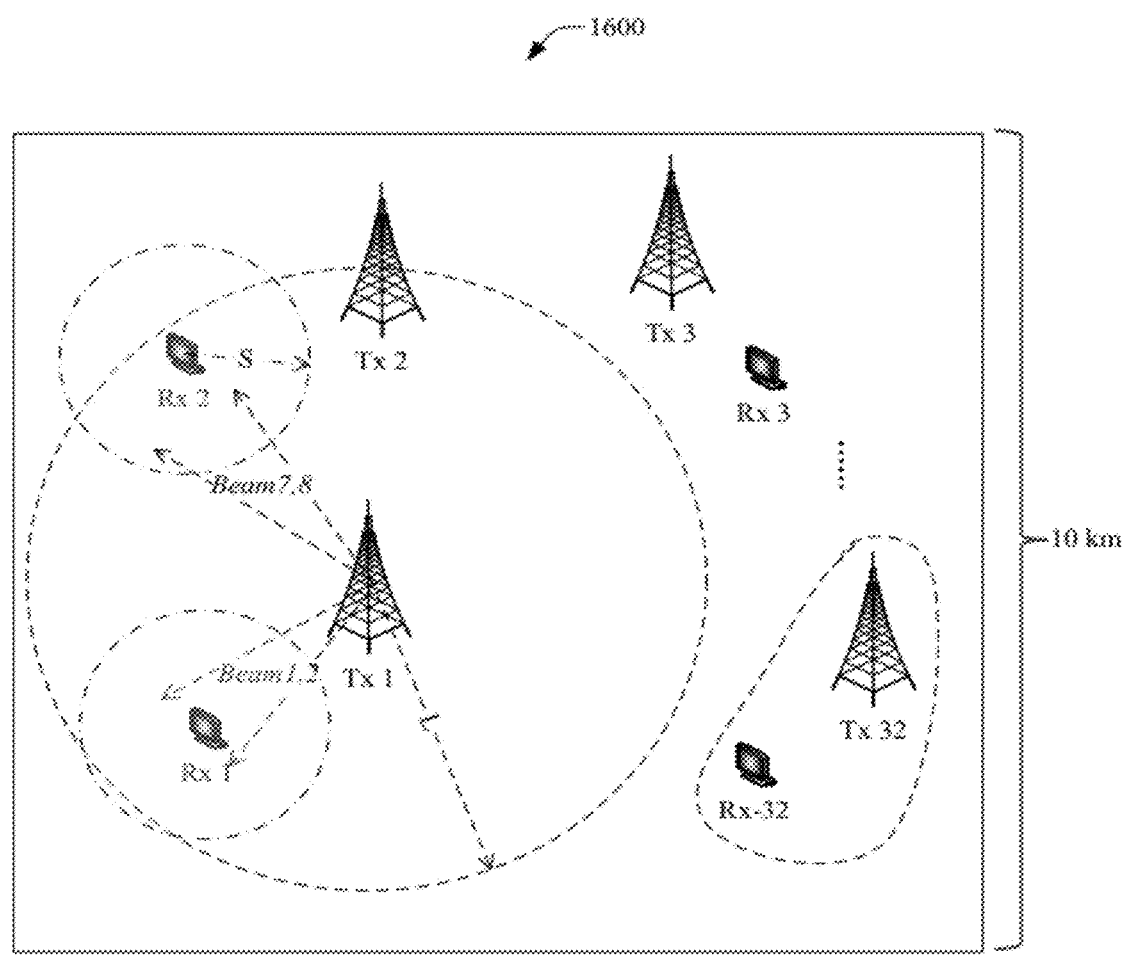
FIG. 16 presents a MIMO network model in accordance with an embodiment.

As illustrated in FIG. 16 provided were 32 Tx-Rx pairs distributed uniformly in a 10 km×10 km square. Each node had 12 antennas. Large numbers of Tx-Rx pairs and antennas were chosen so that a smooth system performance variation to partial connectivity parameters of the network such as L and S was achieved. When looking at FIG. 16, each Tx-Rx pair was trying to deliver 2 data streams. Each Tx was transmitting with power P and we denote $D_{mn}$ as the distance between the Tx n and Rx m. The partial connectivity existing contributed the following factors:

1. Path loss effect: If $D_{mn}>L$, we assumed the channel from the Tx n to the Rx m is not connected ($H_{mn}=0$); and 2. Local scattering effect: If $D_{mn}\leq L$, then due to local scattering, the angular domain channel states $H_{mn}^{ang}=\{h_{mn}(p,q)\}, p,q\in\{1,2,\ldots,12\}$, had the following property: $h_{mn}(p,q)=0$ if q satisfies (6), where S is the radius of the local scattering otherwise $h_{mn}(p,q): \mathcal{CN}(0,1)$.

As a result, the partial connectivity parameters for the randomized model was given by $$N(H_{mn}) = \begin{cases} \text{span}(e_{N_t}(q)), q \in \mathbb{Q}_{mn} & \text{if: } D_{mn} \leq L \\ \mathbb{C}^{12\times 1} & \text{otherwise.} \end{cases} \quad \text{(Eq. 31)}$$

$$N^H(H_{mn}) = \begin{cases} (\text{span}((A_R h_{mn}^{ang}(q))^H))^\perp, q \notin \mathbb{Q}_{mn} & \text{if: } D_{mn} \leq L \\ \mathbb{C}^{1\times 12} & \text{otherwise.} \end{cases} \quad \text{(Eq. 32)}$$

where $H_{mn}^{ang}$, $A_R$ and $e_{N_t}(q)$ are defined in (2), (4) and (5), respectively. $h_{mn}^{ang}(s)\in\mathbb{C}^{N_r\times 1}$ is the s-th column of $H_{mn}^{ang}$, and $\mathbb{Q}_{mn}$ is the set of all the column indices $q\in\{1,2,\ldots,12\}$ that satisfies (6). Note that $\mathbb{Q}_{mn}$ is a random set with randomness induced by the random positions of the Tx n and Rx m.

In the system model employed in simulation above, there are two parameters L and S. As as illustrated in FIG. 7, L is the maximum distance that a Tx can interfere (e.g. the big circle centered at Tx 1 in the figure) and hence reflects the connection density of the network. S is the radius of the local scattering, if the direction of a beam from the Tx does not overlap with the local scattering area of a Rx, it cannot be received by the Rx. (e.g. The local scattering area for Rx 1 is the small circles centered at Rx 1. Beams 7, 8 cannot be received by Rx 1 as their direction does not overlap with this circle.) Hence, S controls the rank(spatial correlation level) of the non-zero channels matrices. Larger S corresponds to higher rank channel matrices.

Next, the proposed interference mitigation scheme was compared with five reference baselines. The first baseline was the conventional interference alignment in which the system directly adapts the precoder-decorrelator iteration proposed in Krishna Gomadam, Cadambe V.R.; Jafar S. A.; "Approaching the capacity of wireless networks through distributed interference alignment" IEEE GLOBECOM 2008 Nov. 30 2008-Dec. 4, 2008." The second baseline was the maximum rank signal subspace, wherein each node selects a maximum rank subspace constraint, i.e. set d* to be $N_t-\mathcal{N}(H_{mn})|$ and $N_r-\mathcal{N}^H(H_{mn})|$ in equations 16 and 17 respectively in the first stage and then uses the second stage to determine the precoders and decorrelators. The third baseline was the minimum rank signal subspace, wherein each ach node selects a minimum rank subspace constraint, i.e. set d* to be $d_n$ and $d_m$ in equations 16 and 17 respectively in the first stage and then uses the second stage to determine the precoders and decorrelators. The fourth baseline employed was time division multiple access (TDMA), which refers to the case where the Tx-Rx pairs use time division multiple access to avoid all interference. Lastly, the fifth baseline was isotropic transmission which refers to the case where the Tx and Rx sends and receives the data streams with random precoders and decorrelators without regard of the channel information.

Figure 17:
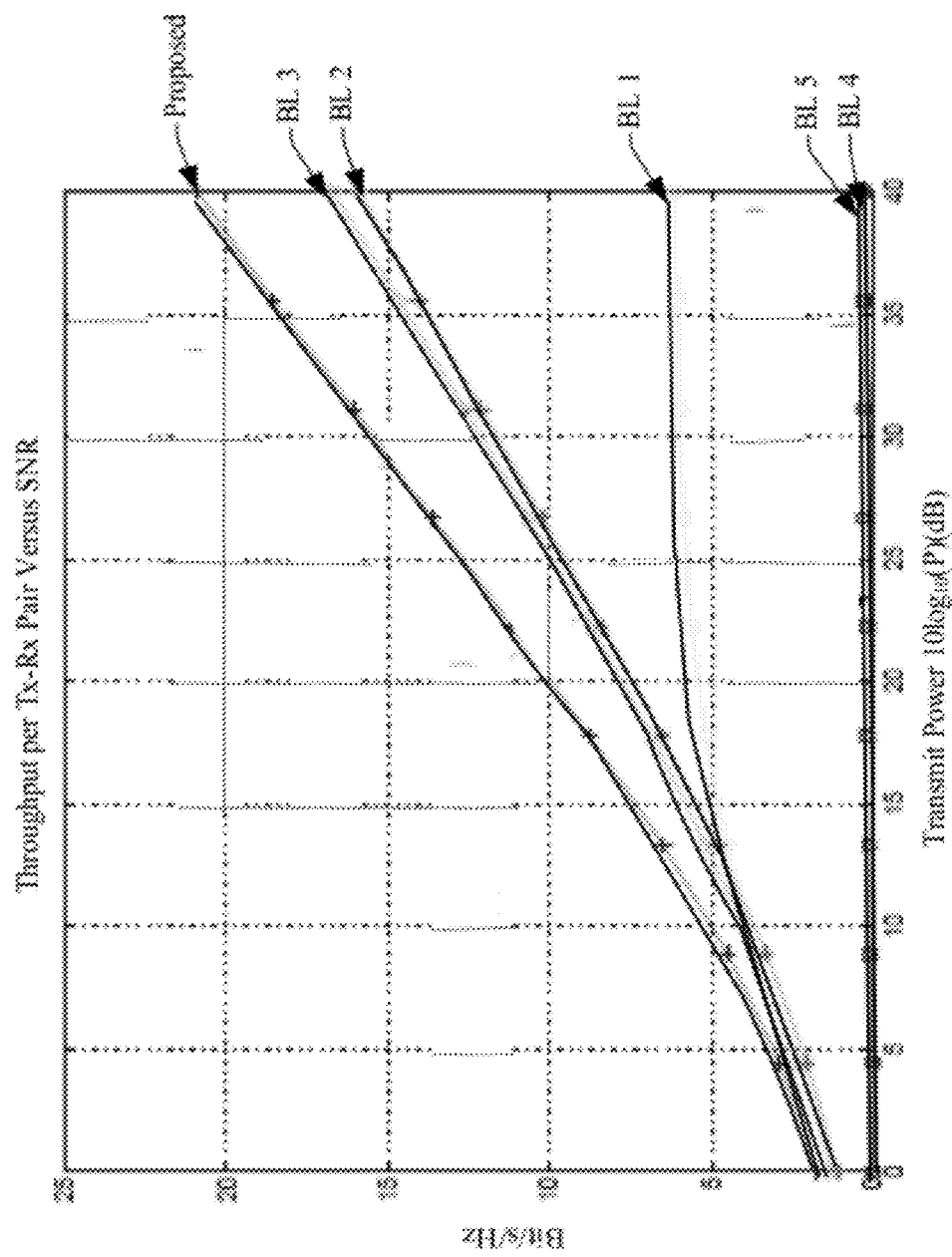
FIG. 17 presents a graphical representation of throughput per transmitter and receiver (Tx-Rx) pair versus SNR (10 $\log_{10}(P)$) for a MIMO network in accordance with an embodiment.

FIG. 17 illustrates the throughput per Tx-Rx pair versus SNR ($10 \log_{10}(P)$). Here L=5 km and S=3 km. Conventional interference alignment (first baseline) saturates in the high SNR region as traditional interference alignment was infeasible in this dense network. Both the proposed scheme and the Maximum/Minimum signal subspace methods (third and second baselines respectively) could achieve throughputs that grew linearly with SNR since the on/off selection in the stage I algorithm guarantees that the system is feasible for interference alignment. However, the proposed scheme achieved much higher DoF (Proposed—approximately 57) than the second baseline (BL2—approximately 44) and the third baseline (BL3—approximately 46), illustrating the importance of carefully designing the signal subspaces. Further for the fourth baseline (BL4) the DoF was negative two, and for the fifth baseline (BL5) the DoF was less than 1.

Comparison of the proposed scheme and the first baseline shows that introducing subspace constraints can indeed enlarge the interference alignment feasible region and enhance the system performance in both DoF and throughput sense. Moreover, note that for a 12×12, 2 stream per Tx-Rx pair and fully connected interference network, at most total network 22 DoF can be achieved, the performance of the proposed scheme ((approximately 50 DoF)) shows that partial connectivity can indeed be exploited to significantly increase network total DoF.

Figure 18:
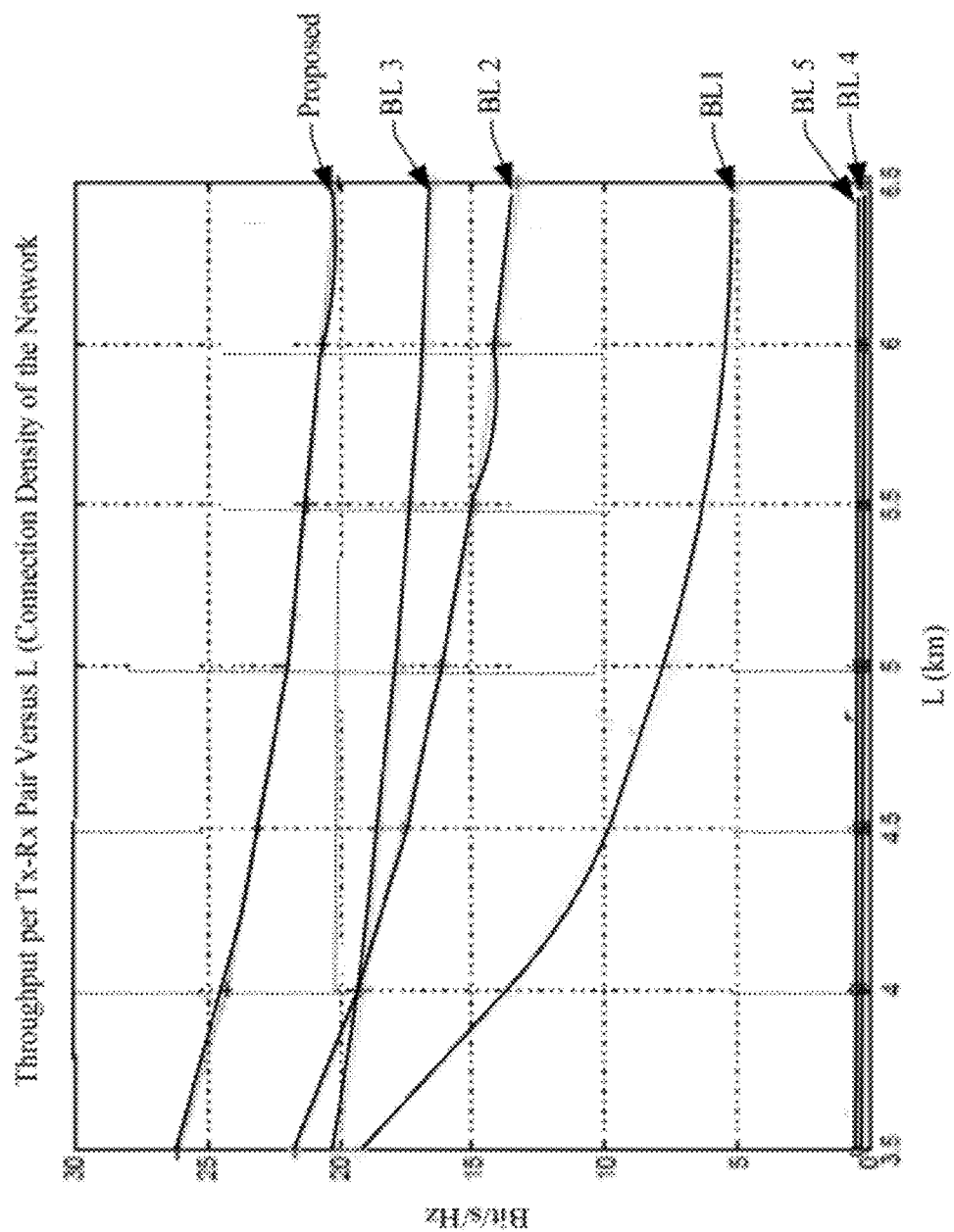
FIG. 18 presents a graphical representation of the sum throughput versus the maximum distance that a Tx can interfere a Rx under a fixed SNR.
Figure 19:
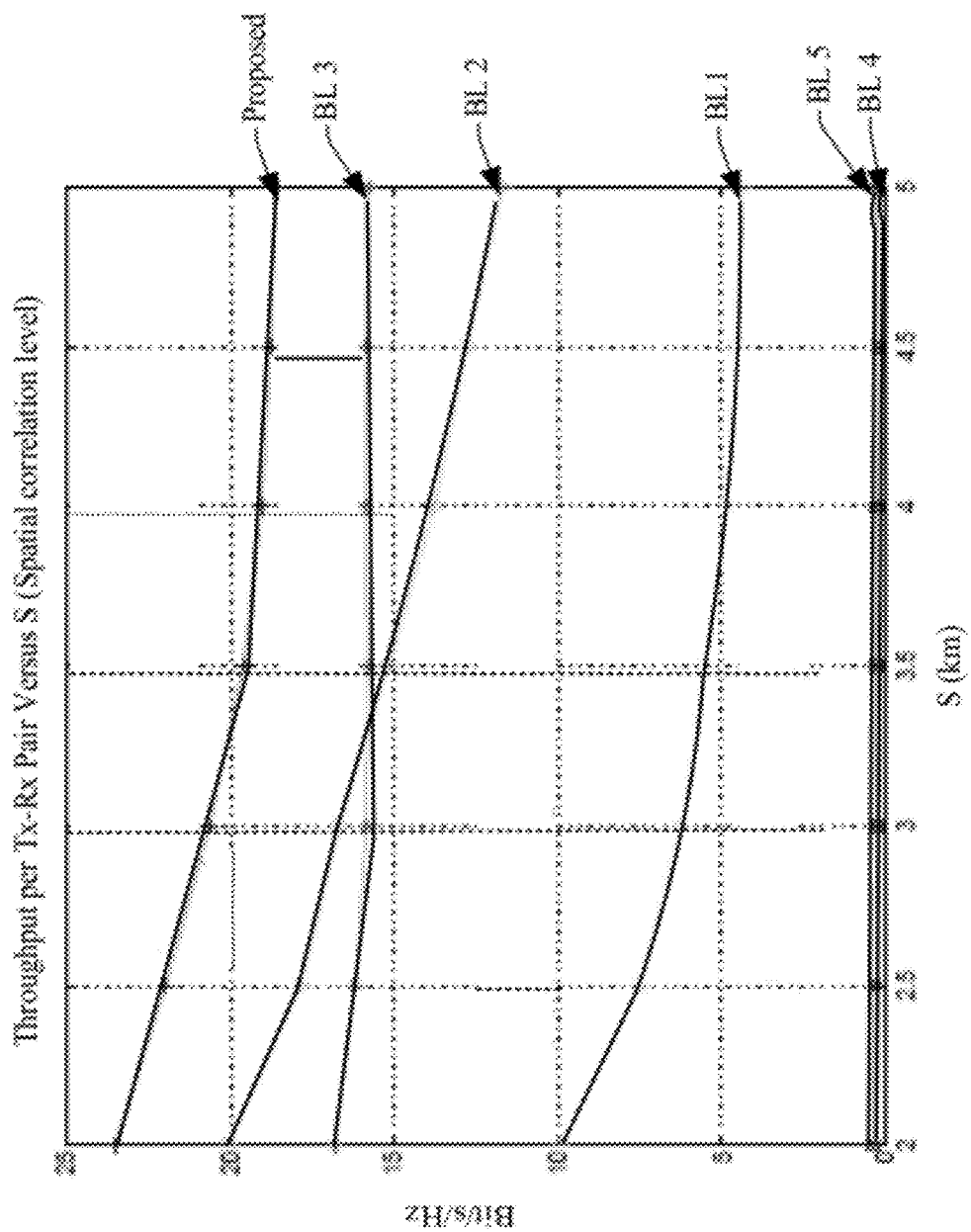
FIG. 19 presents a graphical representation of the sum throughput versus the radius of the local scattering under a fixed SNR.

To better illustrate how different partial connectivity factors such as path loss and spatial correlation affect system performance, the sum throughput versus L (the maximum distance that a Tx can interfere a Rx) under a fixed SNR (40 dB) is illustrated in FIG. 18 and the sum throughput versus S (the radius of the local scattering) under a fixed SNR (40 dB) is illustrated in FIG. 19. As can be seen in FIG. 18, under the proposed scheme, system throughput was much higher than BL1, BL4 and BL5. As can be seen in FIG. 19 under the proposed scheme, system throughput was much higher than BL1, BL4 and BL5

By comparing the performance of the proposed scheme with different partial connectivity parameters, the performance of the proposed scheme scales $$o\left(\frac{1}{LS}\right),$$

which illustrates a consistent observation that weaker partial connectivity can indeed contribute to higher system performance. Moreover, comparison of the proposed algorithm with BL 2 and BL3 illustrates how we should select signal subspaces $\underline{s}_n^{t*}$ and $\underline{s}_m^{r*}$ under different partial connectivity regions. For example, low rank subspace is more effective at high spatial correlation (small S) while high rank subspace is more effective at low spatial correlation (large S). A Low rank subspace is also more effective compared to high rank subspace in dense networks (large L) and vice versa. By dynamically selecting signal subspace according to the partial connectivity state of the network, the proposed scheme obtains significant performance gain over a wide range of partial connectivity levels.

Figure 20:
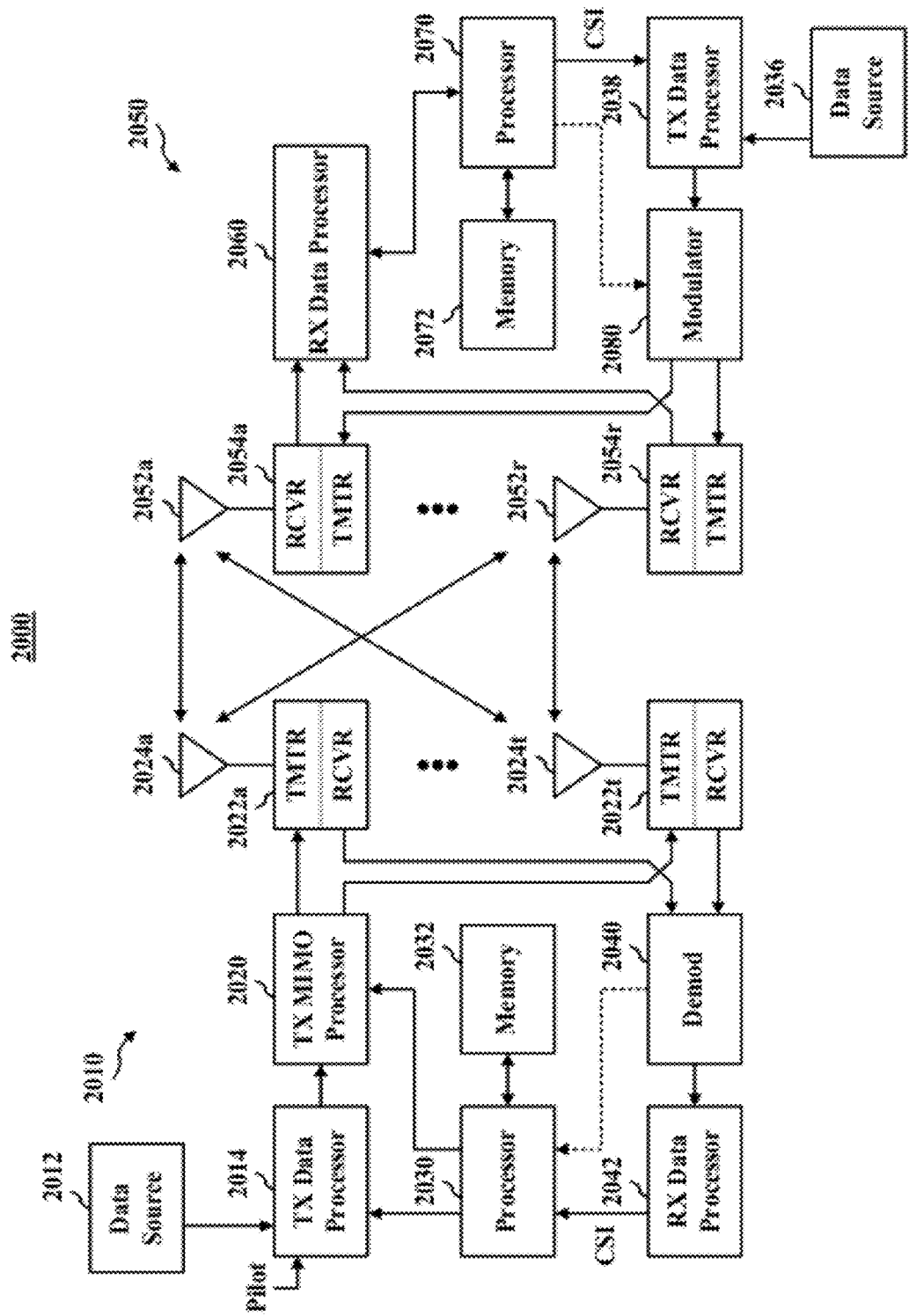
FIG. 20 is an illustration of an exemplary wireless network environment that can be employed in conjunction with the various systems and methods described herein.

Referring now to FIG. 20 a multiple access wireless communication system 2000 according to one or more aspects is illustrated. A wireless communication system 2000 can include one or more base stations in contact with one or more user devices. Each base station provides coverage for a plurality of sectors. A three-sector base station 2002 is illustrated that includes multiple antenna groups, one including antennas 2004 and 2006, another including antennas 20020 and 2010, and a third including antennas 2012 and 2014. According to the figure, only two antennas are shown for each antenna group, however, more or fewer antennas may be utilized for each antenna group. Mobile device 2016 is in communication with antennas 2012 and 2014, where antennas 2012 and 2014 transmit information to mobile device 2016 over forward link 2018 and receive information from mobile device 2016 over reverse link 2020. Forward link (or downlink) refers to communication link from base stations to mobile devices, and reverse link (or uplink) refers to communication link from mobile devices to base stations. Mobile device 2022 is in communication with antennas 2004 and 2006, where antennas 2004 and 2006 transmit information to mobile device 2022 over forward link 2024 and receive information from mobile device 2022 over reverse link 2026. In a FDD system, for example, communication links 2018, 2020, 2024, and 2026 might utilize different frequencies for communication. For example, forward link 2018 might use a different frequency than the frequency utilized by reverse link 2020.

Each group of antennas and/or the area in which they are designated to communicate may be referred to as a sector of base station 2002. In one or more aspects, antenna groups each are designed to communicate to mobile devices in a sector or the areas covered by base station 2002. A base station may be a fixed station used for communicating with mobile devices.

In communication over forward links 2018 and 2024, transmitting antennas of base station 2002 can utilize beamforming in order to improve a signal-to-noise ratio of forward links for different mobile devices 2016 and 2022. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 21:
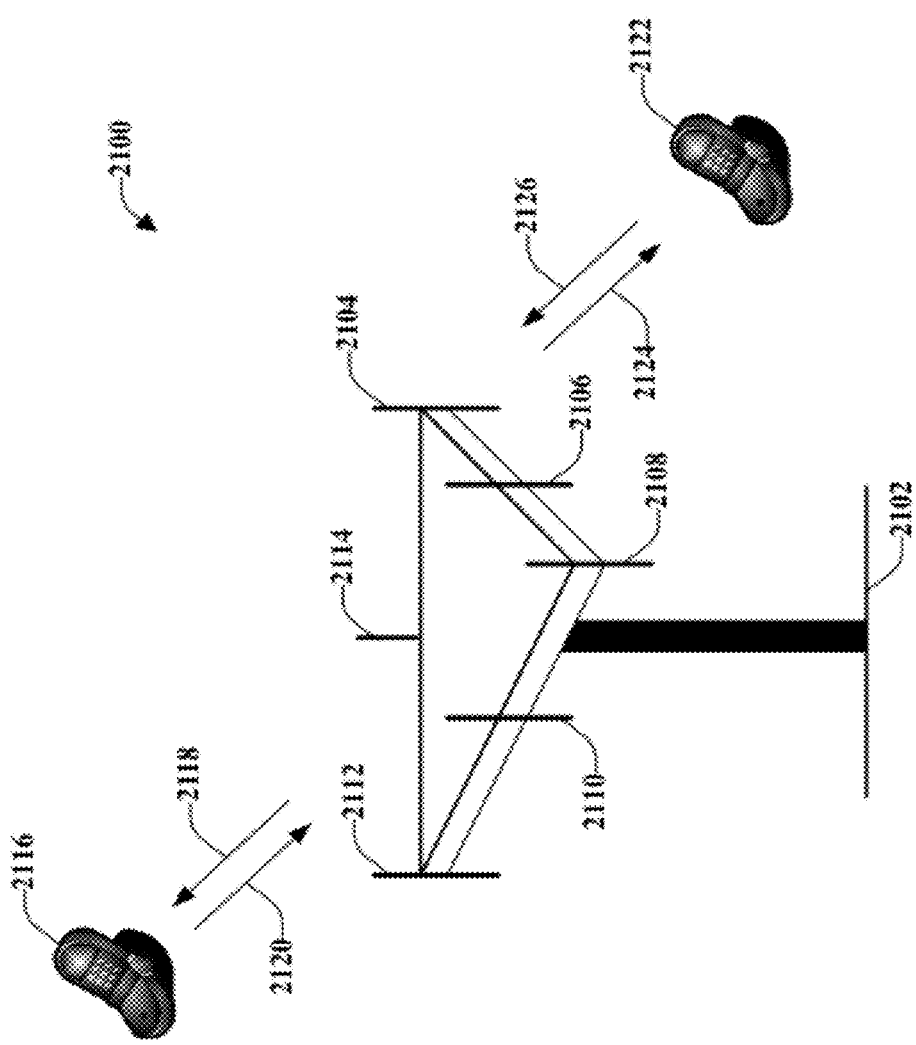
FIG. 21 illustrates a block diagram of an exemplary embodiment of an access point to implement and exploit one or more features or aspects of the disclosed subject matter.

FIG. 21 shows an example wireless communication system 2100. The wireless communication system 2100 depicts one base station 2110 and one access terminal 2150 for sake of brevity. However, it is to be appreciated that system 2100 can include more than one base station and/or more than one access terminal, wherein additional base stations and/or access terminals can be substantially similar or different from example base station 2110 and access terminal 2150 described below. In addition, it is to be appreciated that base station 2110 and/or access terminal 2150 can employ the systems and/or methods described herein to facilitate wireless communication there between.

At base station 2110, traffic data for a number of data streams is provided from a data source 2112 to a transmit (TX) data processor 2114. According to an example, each data stream can be transmitted over a respective antenna. TX data processor 2114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 2150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 2130.

The modulation symbols for the data streams can be provided to a TX MIMO processor 2120, which can further process the modulation symbols (e.g., for OFDM). TX MIMO processor 2120 then provides $N_T$ modulation symbol streams to $N_T$ transmitters (TMTR) 2122a through 2122t. In various embodiments, TX MIMO processor 2120 applies beamforming weights to the symbols of the data streams and to the antenna from which the symbol is being transmitted.

Each transmitter 2122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 2122a through 2122t are transmitted from $N_T$ antennas 2124a through 2124t, respectively.

At access terminal 2150, the transmitted modulated signals are received by $N_R$ antennas 2152a through 2152r and the received signal from each antenna 2152 is provided to a respective receiver (RCVR) 2154a through 2154r. Each receiver 2154 conditions (e.g., filters, amplifies, and downconverts) a respective signal, digitizes the conditioned signal to provide samples, and further processes the samples to provide a corresponding "received" symbol stream.

An RX data processor 2160 can receive and process the $N_R$ received symbol streams from $N_R$ receivers 2154 based on a particular receiver processing technique to provide $N_T$ "detected" symbol streams. RX data processor 2160 can demodulate, deinterleave, and decode each detected symbol stream to recover the traffic data for the data stream. The processing by RX data processor 2160 is complementary to that performed by TX MIMO processor 2120 and TX data processor 2114 at base station 2110.

A processor 2170 can periodically determine which available technology to utilize as discussed above. Further, processor 2170 can formulate a reverse link message comprising a matrix index portion and a rank value portion.

The reverse link message can comprise various types of information regarding the communication link and/or the received data stream. The reverse link message can be processed by a TX data processor 2138, which also receives traffic data for a number of data streams from a data source 2136, modulated by a modulator 2180, conditioned by transmitters 2154a through 2154r, and transmitted back to base station 2110.

At base station 2110, the modulated signals from access terminal 2150 are received by antennas 21214, conditioned by receivers 2122, demodulated by a demodulator 2140, and processed by a RX data processor 21421 to extract the reverse link message transmitted by access terminal 2150. Further, processor 2130 can process the extracted message to determine which precoding matrix to use for determining the beamforming weights.

Processors 2130 and 2170 can direct (e.g., control, coordinate, manage, etc.) operation at base station 2110 and access terminal 2150, respectively. Respective processors 2130 and 2170 can be associated with memory 2132 and 2172 that store program codes and data. Processors 2130 and 2170 can also perform computations to derive frequency and impulse response estimates for the uplink and downlink, respectively.

Figure 22:
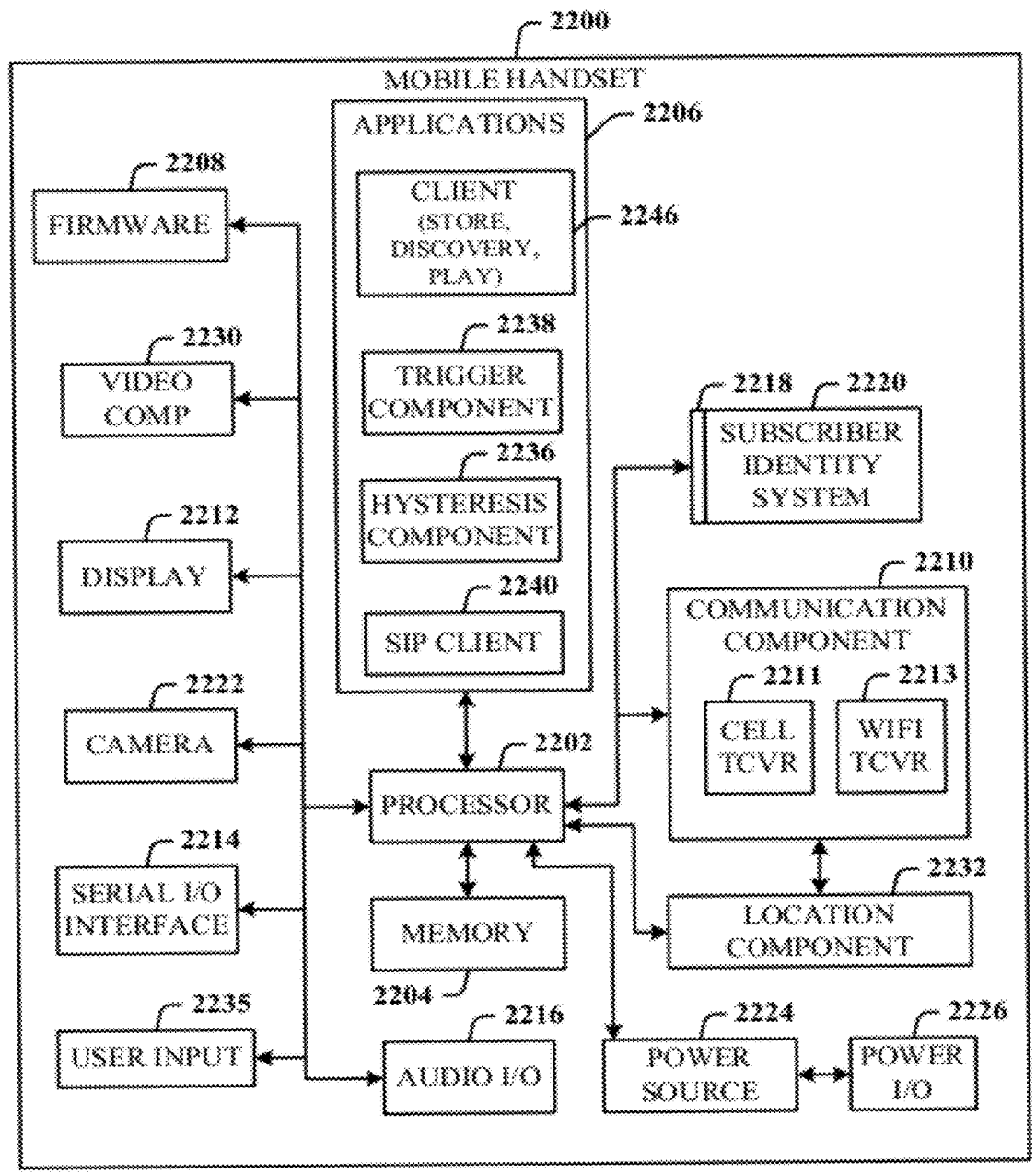
FIG. 22 illustrates an example of a device, a client device in accordance with the embodiments disclosed herein.

FIG. 22 illustrates a schematic block diagram of an exemplary device 2200 capable of employing the subject system in accordance with some embodiments of the invention. The device is a mobile handset 2200 In order to provide additional context for various aspects thereof, FIG. 22 and the following discussion are intended to provide a brief, general description of a suitable environment 2200 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2200 includes a processor 2202 for controlling and processing all onboard operations and functions. A memory 2204 interfaces to the processor 2202 for storage of data and one or more applications 2206 (e.g., a video player software, user feedback component software, . . . ). Other applications can include voice recognition of predetermined voice commands that facilitate initiation of the user feedback signals. The applications 2206 can be stored in the memory 2204 and/or in a firmware 2208, and executed by the processor 2202 from either or both the memory 2204 or/and the firmware 2208. The firmware 2208 can also store startup code for execution in initializing the handset 2200. A communications component 2210 interfaces to the processor 2202 to facilitate wired/wireless communication with external systems, e.g., cellular networks, VoIP networks, and so on. Here, the communications component 2210 can also include a suitable cellular transceiver 2211 (e.g., a GSM transceiver) and an unlicensed transceiver 2213 (e.g., WiFi, WiMax) for corresponding signal communications. The handset 2200 can be a device such as a cellular telephone, a PDA with mobile communications capabilities, and messaging-centric devices. The communications component 2210 also facilitates communications reception from terrestrial radio networks (e.g., broadcast), digital satellite radio networks, and Internet-based radio services networks.

The handset 2200 includes a display 2212 for displaying text, images, video, telephony functions (e.g., a Caller ID function), setup functions, and for user input. The display 2212 can also accommodate the presentation of multimedia content (e.g., music metadata, messages, wallpaper, graphics, ...). A serial I/O interface 2214 is provided in communication with the processor 2202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2200, for example. Audio capabilities are provided with an audio I/O component 2216, which can include a speaker for the output of audio signals related to, for example, indication that the user pressed the proper key or key combination to initiate the user feedback signal. The audio I/O component 2216 also facilitates the input of audio signals through a microphone to record data and/or telephony voice data, and for inputting voice signals for telephone conversations.

The handset 2200 can include a slot interface 2218 for accommodating a SIC (Subscriber Identity Component) in the form factor of a card Subscriber Identity Module (SIM) or universal SIM 2220, and interfacing the SIM card 2220 with the processor 2202. However, it is to be appreciated that the SIM card 920 can be manufactured into the handset 2200, and updated by downloading data and software thereinto.

The handset 2200 can process IP data traffic through the communication component 2210 to accommodate IP traffic from an IP network such as, for example, the Internet, a corporate intranet, a home network, a person area network, etc., through an ISP or broadband cable provider. Thus, VoIP traffic can be utilized by the handset 2200 and IP-based multimedia content can be received in either an encoded or decoded format.

A video processing component 2222 (e.g., a camera) can be provided for decoding encoded multimedia content. The handset 2200 also includes a power source 2224 in the form of batteries and/or an AC power subsystem, which power source 2224 can interface to an external power system or charging equipment (not shown) by a power I/O component 2226.

The handset 2200 can also include a video component 2230 for processing video content received and, for recording and transmitting video content. A location tracking component 932 facilitates geographically locating the handset 2200. As described hereinabove, this can occur when the user initiates the feedback signal automatically or manually. A user input component 2234 facilitates the user initiating the quality feedback signal. The input component can include such conventional input device technologies such as a keypad, keyboard, mouse, stylus pen, and touch screen, for example.

Referring again to the applications 2206, a hysteresis component 2236 facilitates the analysis and processing of hysteresis data, which is utilized to determine when to associate with the access point. A software trigger component 2238 can be provided that facilitates triggering of the hysteresis component 2238 when the WiFi transceiver 2213 detects the beacon of the access point. A SIP client 940 enables the handset 2200 to support SIP protocols and register the subscriber with the SIP registrar server. The applications 2206 can also include a client 2242 that provides at least the capability of discovery, play and store of multimedia content, for example, music.

The handset 2200, as indicated above related to the communications component 910, includes an indoor network radio transceiver 2213 (e.g., WiFi transceiver). This function supports the indoor radio link, such as IEEE 802.11, for the dual-mode GSM handset 2200. The handset 2200 can accommodate at least satellite radio services through a handset that can combine wireless voice and digital radio chipsets into a single handheld device.

Figure 23:
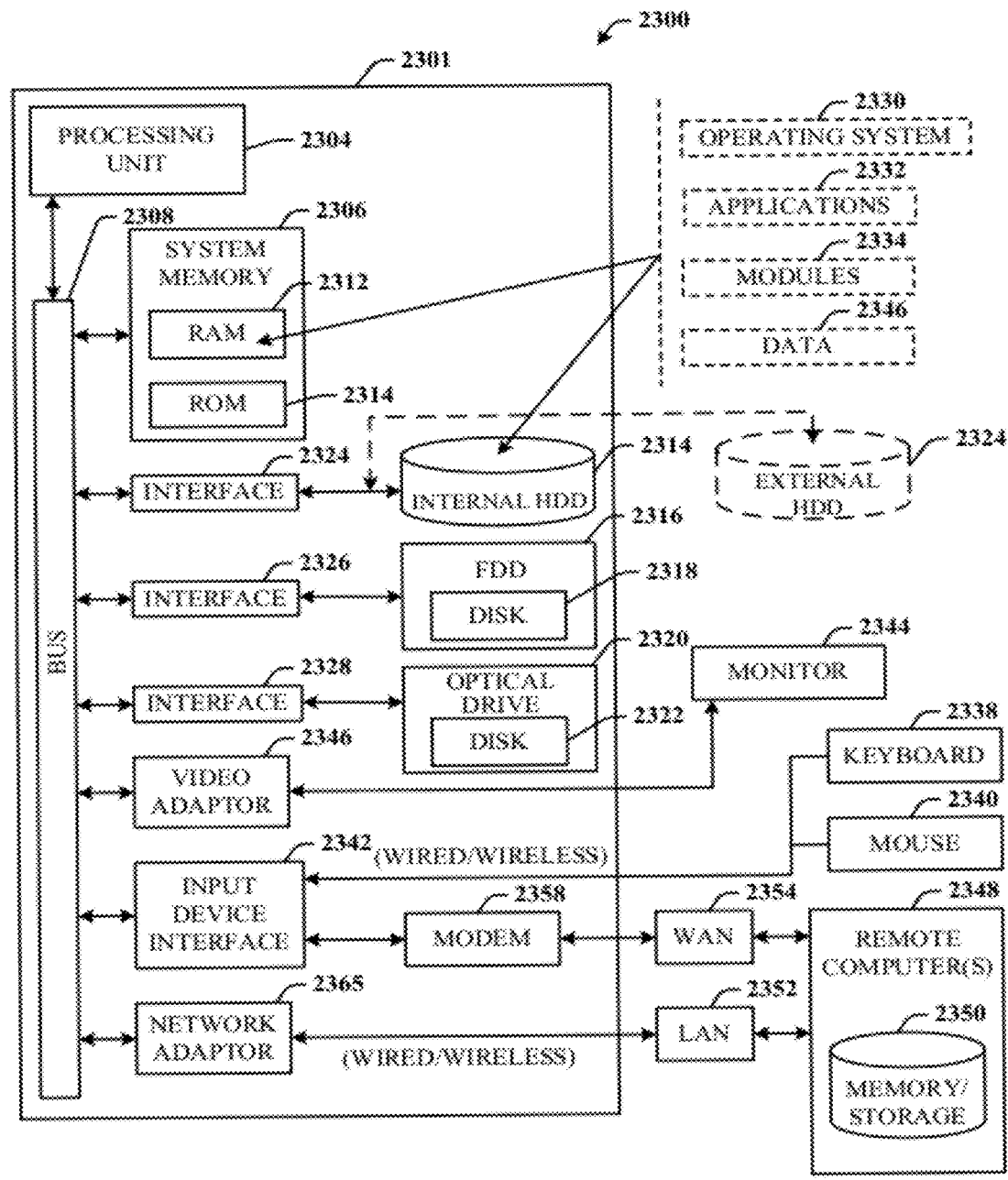
FIG. 23 illustrates a block diagram of a computer operable to execute the disclosed interference adaption platform and MAC adaptation platform.

Referring now to FIG. 23, there is illustrated a block diagram of a computer operable to provide networking and communication capabilities between a wired or wireless communication network and a server and/or communication device. In order to provide additional context for various aspects thereof, FIG. 23 and the following discussion are intended to provide a brief, general description of a suitable computing environment 2300 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 23, the exemplary environment 2300 for implementing various aspects includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes read-only memory (ROM) 2310 and random access memory (RAM) 2312. A basic input/output system (BIOS) is stored in a non-volatile memory 2310 such as ROM, EPROM, EEPROM, which BIOS contains the basic routines that help to transfer information between elements within the computer 2302, such as during start-up. The RAM 2312 can also include a high-speed RAM such as static RAM for caching data.

The computer 2302 further includes an internal hard disk drive (HDD) 2314 (e.g., EIDE, SATA), which internal hard disk drive 2314 can also be configured for external use in a suitable chassis (not shown), a magnetic floppy disk drive (FDD) 2316, (e.g., to read from or write to a removable diskette 2318) and an optical disk drive 2320, (e.g., reading a CD-ROM disk 1022 or, to read from or write to other high capacity optical media such as the DVD). The hard disk drive 2314, magnetic disk drive 2316 and optical disk drive 2320 can be connected to the system bus 2308 by a hard disk drive interface 2324, a magnetic disk drive interface 2326 and an optical drive interface 2328, respectively. The interface 2324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. It is to be appreciated that the innovation can be implemented with various commercially available operating systems or combinations of operating systems.

A user can enter commands and information into the computer 2302 through one or more wired/wireless input devices, e.g., a keyboard 2338 and a pointing device, such as a mouse 2340. Other input devices (not shown) may include a microphone, an IR remote control, a joystick, a game pad, a stylus pen, touch screen, or the like. These and other input devices are often connected to the processing unit 2304 through an input device interface 2342 that is coupled to the system bus 2308, but can be connected by other interfaces, such as a parallel port, an IEEE 2394 serial port, a game port, a USB port, an IR interface, etc.

A monitor 2344 or other type of display device is also connected to the system bus 2308 through an interface, such as a video adapter 2346. In addition to the monitor 2344, a computer typically includes other peripheral output devices (not shown), such as speakers, printers, etc.

The computer 2302 can operate in a networked environment using logical connections by wired and/or wireless communications to one or more remote computers, such as a remote computer(s) 2348. The remote computer(s) 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices and companies, and facilitate enterprise-wide computer networks, such as intranets, all of which may connect to a global communications network, e.g., the Internet.

When used in a LAN networking environment, the computer 2302 is connected to the local network 2352 through a wired and/or wireless communication network interface or adapter 2356. The adaptor 2356 may facilitate wired or wireless communication to the LAN 2352, which may also include a wireless access point disposed thereon for communicating with the wireless adaptor 2356.

When used in a WAN networking environment, the computer 2302 can include a modem 2358, or is connected to a communications server on the WAN 2354, or has other means for establishing communications over the WAN 2354, such as by way of the Internet. The modem 2358, which can be internal or external and a wired or wireless device, is connected to the system bus 2308 through the serial port interface 2342. In a networked environment, program modules depicted relative to the computer 2302, or portions thereof, can be stored in the remote memory/storage device 2350. It will be appreciated that the network connections shown are exemplary and other means of establishing a communications link between the computers can be used.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2300, etc. UTRA includes Wideband-CDMA (W-CDMA) and other variants of CDMA. Further, CDMA2300 covers IS-2300, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.23, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2300 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the s and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a processor, coupled to a memory that stores executable components, that executes or facilitates execution of the executable components, the executable components comprising:
an assignment component configured to assign data streams to pairs of transmitters and receivers for signaling between respective pairs of transmitters and receivers based on a partially connected state of a multiple input multiple output channel via which the signaling is performed;
a subspace restriction component configured to determine restrictions for signal subspaces associated with beamforming filters for transmitters of the pairs of transmitters and receivers and zero-forcing filters for receivers of the pairs of transmitters and receivers based on the partially connected state of the multiple input multiple output channel; and
a feasibility component configured to determine whether an interference alignment is feasible based on the restrictions for the signal subspaces based on a comparison of a number of freedoms in the beamforming filters and the zero-forcing filters with a number of constraints associated with the interference alignment, wherein the interference alignment is determined to be feasible in response to the number of freedoms being determined to satisfy a condition relative to the number of constraints.

2. The device of claim 1, wherein the subspace restriction component is further configured to determine the restrictions to reduce the number of constraints associated with the interference alignment while the multiple input multiple output channel is in the partially connected state.

3. The device of claim 1, wherein the subspace restriction component is configured to generate a plurality of potential restrictions and select the restrictions from the plurality of potential restrictions that decrease the number of constraints associated with performing the interference alignment while the multiple input multiple output channel is in the partially connected state.

4. The device of claim 1, wherein the subspace restriction component is configured to determine common null spaces of the signal subspaces and determine the restrictions based on the common null spaces, and wherein the common null spaces are based on the partially connected state of the multiple input multiple output channel.

5. The device of claim 1, wherein the subspace restriction component is configured to determine the restrictions of the signal subspaces that maximize the number of freedoms associated with the beamforming filters minus the number of constraints associated with the interference alignment while the multiple input multiple output channel is in the partially connected state.

6. The device of claim 1, wherein the subspace restriction component is configured to determine the restrictions of the signal subspaces that maximize the number of freedoms associated with the zero-forcing filters minus the number of constraints associated with the interference alignment while the multiple input multiple output channel is in the partially connected state.

7. The device of claim 1, wherein, in response to the interference alignment being determined not to be feasible, the assignment component is further configured to remove a transmitter and receiver pair of the pairs of transmitters and receivers that contributes to a greatest number of the constraints in comparison to other ones of the transmitter and receiver pairs, and wherein the subspace restriction component is further configured to determine new restrictions for other signal subspaces associated with other beamforming filters for other transmitters of remaining pairs of transmitters and receivers and other zero-forcing filters for other receivers of the remaining pairs of transmitters and receivers based on the partially connected state of the multiple input multiple output channel.

8. The device of claim 1, wherein the executable components further comprise a filter component configured to generate the beamforming filters and the zero-forcing filters for the transmitters and the receivers respectively under the restrictions for the signal subspaces.

9. The device of claim 1, wherein the assignment component is configured to assign the data streams to the pairs of transmitters and receivers based on a degree of contribution of communication of the data streams between respective pairs of the transmitters and receivers to interference in the multiple input multiple output channel.

10. A device, comprising:
an antenna configured to transmit a signal via a multiple input multiple output channel having a partially connected state in accordance with an interference alignment that alleviates interference associated with transmission of the signal via the multiple input multiple output channel in connection with other signals communicated between transmitter and receiver pairs operating via the multiple input multiple output channel; and
an encoder configured to encode the signal with a beamforming filter to effectuate the interference alignment, wherein the beamforming filter is configured based on restrictions for subspaces of the multiple input multiple output channel determined based on the partially connected state of the multiple input multiple output channel, wherein the restrictions for the subspaces are based on a determination of feasibility of the interference alignment, and wherein the determination of the feasibility of the interference alignment is based on a number of freedoms associated with the beamforming filter being determined to satisfy a defined function with respect to a number of constraints associated with performance of the interference alignment.

11. The device of claim 10, wherein the restrictions for the subspaces reduce the number of constraints associated with the performance of the interference alignment.

12. The device of claim 10, wherein the restrictions for the subspaces are determined based on common null spaces of the subspaces.

13. The device of claim 10, wherein the restrictions for the subspaces maximize the number of freedoms in the beamforming filter minus the number of constraints associated with the performance of the interference alignment.

14. The device of claim 10, wherein the partially connected state of the multiple input multiple output channel is attributed to at least one of path loss, shadowing, or spatial correlation.

15. A device, comprising:
an antenna configured to receive a signal in multiple input multiple output channel having a partially connected state in accordance with an interference alignment that alleviates interference associated with reception of the signal in the multiple input multiple output channel in association with other signals being communicated between transmitter and receiver pairs operating in the multiple input multiple output channel; and
a decoder configured to decode the signal with a decoding filter to effectuate the interference alignment, wherein the decoding filter is adapted to effectuate the interference alignment based on restrictions for subspaces of the multiple input multiple output channel determined based on the partially connected state of the multiple input multiple output channel, wherein the restrictions for the subspaces are based on a determination of feasibility of the interference alignment, and wherein the determination of the feasibility of the interference alignment is based on a number of freedoms associated with the decoding filter being determined to outweigh a number of constraints associated with performance of the interference alignment.

16. The device of claim 15, wherein the restrictions for the subspaces reduce the number of constraints associated with the performance of the interference alignment.

17. The device of claim 15, wherein the restrictions for the subspaces are determined based on common null spaces of the subspaces.

18. The device of claim 15, wherein the restrictions for the subspaces maximize the number of freedoms in the decoding filter minus the number of constraints associated with the performance of the interference alignment.

19. The device of claim 15, wherein the partially connected state of the multiple input multiple output channel is attributed to at least one of path loss, shadowing, or spatial correlation.

20. A method, comprising:
assigning data streams, by a system comprising a processor, to pairs of transmitters and receivers for communication of signals in a multiple input multiple output channel based on a partially connected state of the multiple input multiple output channel;
determining, by the system, restrictions for signal subspaces associated with beamforming filters for transmitters of the pairs of transmitters and receivers and zero-forcing filters of the receivers of the pairs of transmitters and receivers based on the partially connected state of the multiple input multiple output channel;
under the restrictions for the subspaces, comparing, by the system, a number of freedoms associated with the beamforming filters and the zero-forcing filters with a number of constraints associated with performing an interference alignment; and
classifying by the system, the interference alignment as feasible in response to an output of the comparing indicating that the number of freedoms outweigh the number of constraints.

21. The method of claim 20, wherein the determining the restrictions further comprises determining the restrictions to reduce the number of constraints associated with performing the interference alignment while the multiple input multiple output channel is in the partially connected state.

22. The method of claim 20, wherein the determining the restrictions further comprises generating a plurality of potential restrictions and selecting the restrictions from the plurality of potential restrictions that decrease the number of constraints associated with performing the interference alignment while the multiple input multiple output channel is in the partially connected state.

23. The method of claim 20, wherein the determining the restrictions further comprises determining common null spaces of the signal subspaces and determining the restrictions based on the common null spaces, and wherein the common null spaces are based on the partially connected state of the multiple input multiple output channel.

24. The method of claim 20, wherein the determining the restrictions further comprises determining the restrictions that maximize the number of freedoms associated with the beamforming filters minus the number of constraints associated with performing an interference alignment while the multiple input multiple output channel is in the partially connected state.

25. The method of claim 20, wherein the determining the restrictions further comprises determining the restrictions that maximize the number of freedoms associated with the zero-forcing filters minus the number of constraints associated with performing the interference alignment while the multiple input multiple output channel is in the partially connected state.

26. The method of claim 20, further comprising, in response to the number of freedoms being determined to be greater than or equal to the number of constraints,
removing, by the system, a transmitter and receiver pair of the pairs of transmitters and receivers that contributes to a greatest number of the constraints in comparison to other transmitter and receiver pairs included; and
determining, by the system, new restrictions for other signal subspaces associated with other beamforming filters for other transmitters of remaining pairs of transmitters and receivers and other zero-forcing filters for other receivers of the remaining pairs of transmitters and receivers based on the partially connected state of the multiple input multiple output channel.

27. The method of claim 20, further comprising:
creating, by the system, the beamforming filters and the zero-forcing filters for the transmitters and the receivers respectively under the restrictions for the signal subspaces.

28. The method of claim 20, further comprising:
communicating, by the system, the beamforming filters to the transmitters; and
communicating, by the system, the zero-forcing filters to the receivers.

29. A method, comprising:
transmitting, by a device comprising a processor, a signal in a multiple input multiple output channel having a partially connected state in accordance with an interference alignment that alleviates interference associated with transmission of the signal in the multiple input multiple output channel concurrently with other signals communicated between transmitter and receiver pairs operating in the multiple input multiple output channel; and
encoding, by the device, the signal using a precoder to effectuate the interference alignment, wherein the precoder is configured based on restrictions for subspaces of the multiple input multiple output channel determined based on the partially connected state of the multiple input multiple output channel, wherein the restrictions for the subspaces are based on a determination of feasibility of the interference alignment, and wherein the determination of the feasibility of the interference alignment is based on a number of freedoms associated with a beamforming filter being determined to be greater than or equal to a number of constraints associated with performance of the interference alignment.

30. The method of claim 29, wherein the restrictions for the subspaces are based on the determination that reduces the number of constraints associated with performing the interference alignment.

31. The method of claim 29, wherein the restrictions for the subspaces are determined based on common null spaces of the subspaces.

32. The method of claim 29, wherein the restrictions for the subspaces are based on the determination that maximizes the number of freedoms in the precoder minus the number of constraints associated with performing the interference alignment.

33. A method, comprising:
receiving, by a device comprising a processor, a signal through a multiple input multiple output channel having a partially connected state in accordance with an interference alignment that alleviates interference associated with reception of the signal in the multiple input multiple output channel in association with other signals communicated between transmitter and receiver pairs operating in the multiple input multiple output channel; and
decoding, by the device, the signal using a decorrrelator to effectuate the interference alignment, wherein the decorrelator effectuates the interference alignment based on restrictions for subspaces of the multiple input multiple output channel determined based on the partially connected state of the multiple input multiple output channel, and wherein the restrictions for the subspaces are based on a determination of feasibility of the interference alignment, and wherein the determination of the feasibility of the interference alignment is based on a number of freedoms associated with a beamforming filter being determined to be greater than or equal to a number of constraints associated with performance of the interference alignment.

34. The method of claim 33, wherein the restrictions for the subspaces are based on a determination that reduces the number of constraints associated with performing the interference alignment.

35. The method of claim 33, wherein the restrictions for the subspaces are determined based on common null spaces of the subspaces.

36. The method of claim 33, wherein the restrictions for the subspaces are based on a determination that maximizes the number of freedoms in the decorrelator minus the number of constraints associated with performing the interference alignment.

37. The method of claim 33, wherein the partially connected state of the multiple input multiple output channel is attributed to at least one of path loss, shadowing, or spatial correlation.

38. A non-transitory computer readable storage medium comprising computer executable instructions that, in response to execution, cause a computing system to perform operations, comprising:
assigning data streams to pairs of transmitters and receivers for communication of signals in a multiple input multiple output channel based on a partially connected state of the multiple input multiple output channel;
determining restrictions for signal subspaces associated with beamforming filters for transmitters of the pairs of transmitters and receivers and zero-forcing filters of the receivers of the pairs of transmitters and receivers based on the partially connected state of the multiple input multiple output channel;
under the restrictions for the subspaces, comparing a number of freedoms associated with the beamforming filters and the zero-forcing filters with a number of constraints associated with performing an interference alignment; and
based on a result of the comparing, classifying the performing the interference alignment as feasible in response to the number of freedoms being determined to be greater than or equal to the number of constraints.

39. The non-transitory computer readable storage medium of clam 38, wherein the determining the restrictions further comprises determining the restrictions to reduce the number of constraints associated with performing the interference alignment while the multiple input multiple output channel is in the partially connected state.

40. The non-transitory computer readable storage medium of clam 38, wherein the determining the restrictions further comprises generating a plurality of potential restrictions and selecting the restrictions from the plurality of potential restrictions that decrease the number of constraints associated with performing the interference alignment while the multiple input multiple output channel is in the partially connected state.

41. The non-transitory computer readable storage medium of clam 38, wherein the determining the restrictions further comprises determining common null spaces of the signal subspaces and determining the restrictions based on the common null spaces, and wherein the common null spaces are based on the partially connected state of the multiple input multiple output channel.

42. The non-transitory computer readable storage medium of clam 38, wherein the determining the restrictions further comprises determining the restrictions that maximize the number of freedoms associated with the beamforming filters minus the number of constraints associated with performing the interference alignment while the multiple input multiple output channel is in the partially connected state.

43. The non-transitory computer readable storage medium of clam 38, wherein the determining the restrictions further comprises determining the restrictions that maximize the number of freedoms associated with the zero-forcing filters minus the number of constraints associated with performing the interference alignment while the multiple input multiple output channel is in the partially connected state.

44. The non-transitory computer readable storage medium of claim 38, the operations further comprising:
determining new restrictions for other signal subspaces associated with other beamforming filters for other transmitters of remaining pairs of transmitters and receivers and other zero-forcing filters for other receivers of the remaining pairs of transmitters and receivers based on the partially connected state of the multiple input multiple output channel.

45. The non-transitory computer readable storage medium of claim 38, the operations further comprising:
designing the beamforming filters and the zero-forcing filters for the transmitters and the receivers respectively under the restrictions for the signal subspaces.

* * * * *